United States Patent
Oh et al.

(10) Patent No.: US 12,380,605 B2
(45) Date of Patent: Aug. 5, 2025

(54) POINT CLOUD DATA TRANSMISSION DEVICE, TRANSMISSION METHOD, PROCESSING DEVICE, AND PROCESSING METHOD

(71) Applicant: LG ELECTRONICS INC., Seoul (KR)

(72) Inventors: Hyunmook Oh, Seoul (KR); Sejin Oh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 98 days.

(21) Appl. No.: 18/013,407

(22) PCT Filed: Jun. 29, 2021

(86) PCT No.: PCT/KR2021/008168
§ 371 (c)(1),
(2) Date: Dec. 28, 2022

(87) PCT Pub. No.: WO2022/005159
PCT Pub. Date: Jan. 6, 2022

(65) Prior Publication Data
US 2023/0334711 A1   Oct. 19, 2023

Related U.S. Application Data

(60) Provisional application No. 63/045,820, filed on Jun. 29, 2020.

(51) Int. Cl.
*G06T 9/00* (2006.01)

(52) U.S. Cl.
CPC .................... *G06T 9/001* (2013.01)

(58) Field of Classification Search
None
See application file for complete search history.

(56) References Cited

U.S. PATENT DOCUMENTS 11,503,367 B2 * 11/2022 Yea ........................ H04N 19/50
2014/0132723 A1 * 5/2014 More ...................... G01S 7/497
348/46

(Continued)

FOREIGN PATENT DOCUMENTS

KR    10-2017-0135914 A    12/2017
KR    10-2018-0035816 A    4/2018

(Continued)

OTHER PUBLICATIONS

Mammou, Khaled et al., "G-PCC codec description v2", International Organisation for Standardisation Organisation Internationale De Normalisation ISO/IEC JTC1/SC29/WG11 Coding of Moving Pictures and Audio. N18189. Jan. 2019, Marrakech, MA.

*Primary Examiner* — Mohammad J Rahman
(74) *Attorney, Agent, or Firm* — Bryan Cave Leighton Paisner LLP

(57) ABSTRACT

A point cloud data transmission method according embodiments comprises a step for encoding point cloud data including the geometry and attributes, the geometry being information indicating the positions of the points of the point cloud data, and the attributes including one or more among the color and reflectance of the points, wherein the encoding step comprises: a step for converting the coordinates representing the positions of the points; and a step for transmitting a bitstream including the encoded point cloud data. The point cloud data transmission method can encode and transmit the point cloud data.

16 Claims, 39 Drawing Sheets

(56) References Cited

U.S. PATENT DOCUMENTS

| | | | | |
|---|---|---|---|---|
| 2020/0013215 A1* | 1/2020 | Vosoughi | ............... | G06T 17/005 |
| 2020/0294271 A1* | 9/2020 | Ilola | ........................ | G06T 17/20 |
| 2020/0394822 A1* | 12/2020 | Gao | ........................ | G06T 9/001 |
| 2021/0092430 A1* | 3/2021 | Schwarz | ............... | H04N 19/597 |
| 2021/0116914 A1* | 4/2021 | Ren | ........................ | G06V 20/58 |
| 2021/0124901 A1* | 4/2021 | Liu | ........................ | G06V 10/764 |
| 2021/0203989 A1* | 7/2021 | Wang | ........................ | G06T 9/00 |
| 2021/0306664 A1* | 9/2021 | Gao | ........................ | H04N 19/70 |
| 2021/0326734 A1* | 10/2021 | Van der Auwera | .... | H04N 19/70 |
| 2021/0327095 A1* | 10/2021 | Van der Auwera | .... | H04N 19/70 |
| 2021/0327097 A1* | 10/2021 | Ramasubramonian | ...................... H04N 19/90 | |
| 2021/0327098 A1* | 10/2021 | Ray | ........................ | G01S 17/89 |
| 2021/0327099 A1* | 10/2021 | Van der Auwera | .. | H04N 19/597 |
| 2022/0057194 A1* | 2/2022 | Zhang | ................... | G01B 11/002 |
| 2022/0194413 A1* | 6/2022 | Westman | ............... | G01S 17/931 |
| 2023/0129875 A1* | 4/2023 | Kondrad | ................ | H04N 19/70 375/240.26 |

FOREIGN PATENT DOCUMENTS

| | | | |
|---|---|---|---|
| KR | 10-2018-0117230 A | 10/2018 | |
| KR | 10-2019-0082065 A | 7/2019 | |

\* cited by examiner

FIG. 6
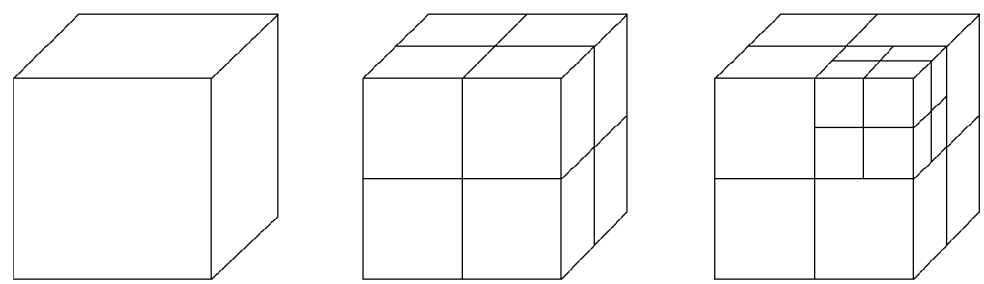
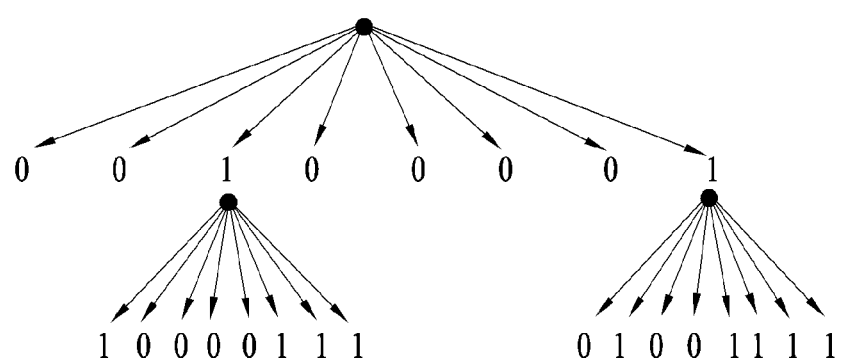

FIG. 7
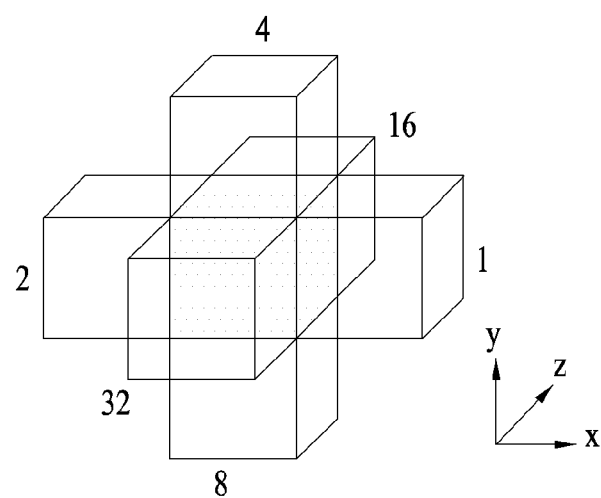
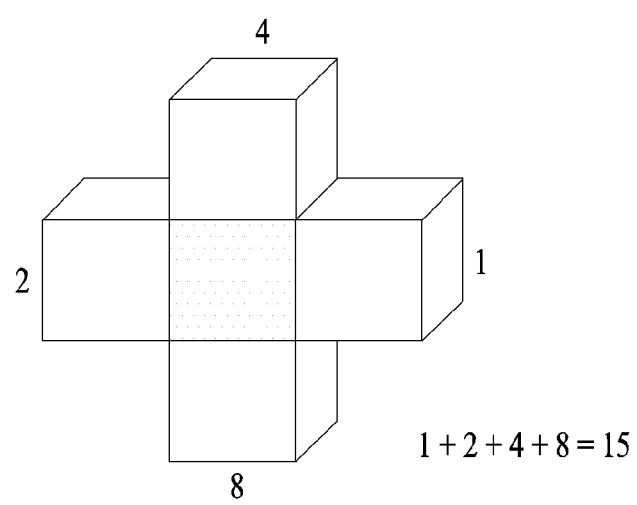
1 + 2 + 4 + 8 = 15

FIG. 22
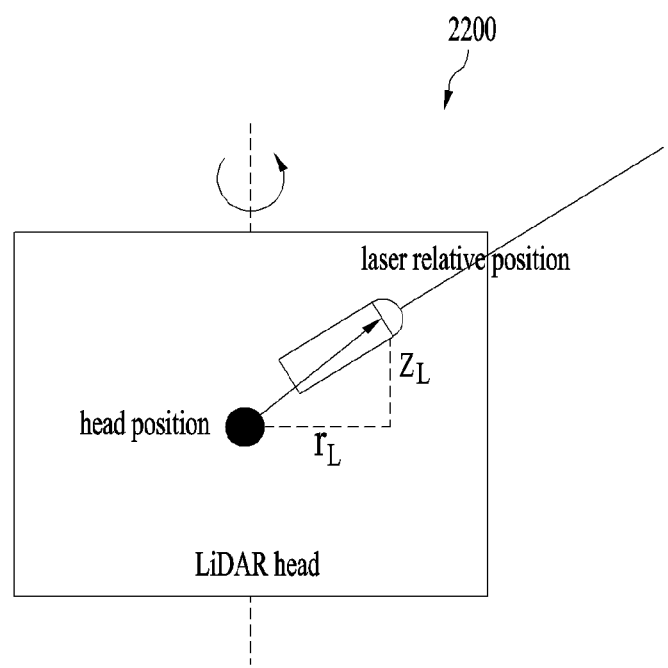
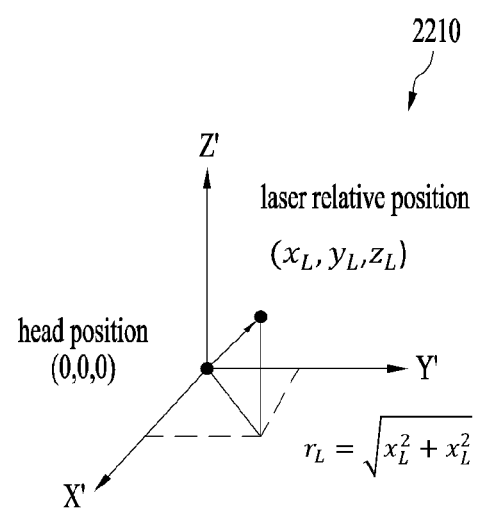

FIG. 24

| | Descriptor | | |
|---|---|---|---|
| projection_info () { | | orig_bounding_box_y_offset | ue(v) |
| projection_info_id | ue(v) | orig_bounding_box_z_offset | ue(v) |
| coord_conversion_type | u(4) | rotation_yaw | ue(v) |
| projection_type | u(4) | rotation_pitch | ue(v) |
| laser_position_adjustment_flag | u(1) | rotation_roll | ue(v) |
| if(laser_position_adjustment_flag) { | | if (coord_conversion_type == 0 \|\| coord_ conversion_type == 2) { | |
| num_laser | u(8) | cylinder_center_x | ue(v) |
| for( i=0; i<num_laser; i++) { | | cylinder_center_y | ue(v) |
| z_laser[i] | ue(v) | cylinder_center_z | ue(v) |
| z_laser[i] | ue(v) | cylinder_radius_max | ue(v) |
| theta_laser[i] | | cylinder_degree_max | ue(v) |
| } | | cylinder_z_max | ue(v) |
| } | | ref_vector_x | ue(v) |
| sampling_adjustment_cubic_flag | u(1) | ref_vector_y | ue(v) |
| sampling_adjustment_spread_bbox_flag | u(1) | ref_vector_z | ue(v) |
| sampling_adjustment_type | u(4) | normal_vector_x | ue(v) |
| geo_projection_enable_flag | u(1) | normal_vector_y | ue(v) |
| attr_projection_enable_flag | u(1) | normal_vector_z | ue(v) |
| bounding_box_x_offset | ue(v) | clockwise_degree_flag | u(1) |
| bounding_box_y_offset | ue(v) | granurality_radius | ue(v) |
| bounding_box_z_offset | ue(v) | granurality_angular | ue(v) |
| bounding_box_x_length | ue(v) | granurality_normal | ue(v) |
| bounding_box_y_length | ue(v) | } | |
| orig_bounding_box_x_offset | ue(v) | else if (coord_conversion_type == 1 \|\| coord_ d_conversion_type == 3) | |
| | | { | |
| | | cylinder_center_x | ue(v) |
| | | cylinder_center_y | ue(v) |
| | | cylinder_center_z | |
| | | cylinder_radius_max1 | ue(v) |
| | | cylinder_radius_max2 | ue(v) |
| | | cylinder_degree_max1 | ue(v) |
| | | cylinder_degree_max2 | ue(v) |
| | | cylinder_z_max | ue(v) |
| | | ref_vector_x | ue(v) |
| | | ref_vector_y | ue(v) |
| | | ref_vector_z | ue(v) |
| | | normal_vector_x | u(1) |
| | | normal_vector_y | ue(v) |
| | | normal_vector_z | ue(v) |
| | | granurality_radius | ue(v) |
| | | granurality_angular | ue(v) |
| | | granurality_normal | ue(v) |
| | | } | |
| | | } | |

FIG. 25

| | Descriptor |
|---|---|
| seq_parameter_set() { | |
| profile_compatibility_flags | u(24) |
| level_idc | u(8) |
| sps_bounding_box_present_flag | u(1) |
| if( sps_bounding_box_present_flag ) { | |
| sps_bounding_box_offset_x | se(v) |
| sps_bounding_box_offset_y | se(v) |
| sps_bounding_box_offset_z | se(v) |
| sps_bounding_box_scale_factor | ue(v) |
| sps_bounding_box_size_width | ue(v) |
| sps_bounding_box_size_height | ue(v) |
| sps_bounding_box_size_depth | ue(v) |
| } | |
| sps_source_scale_factor | u(32) |
| sps_seq_parameter_set_id | ue(v) |
| sps_num_attribute_sets | ue(v) |
| for( i = 0; i< sps_num_attribute_sets; i++) { | |
| attribute_dimension[ i ] | ue(v) |
| attribute_instance_id[ i ] | ue(v) |
| attribute_bitdepth[ i ] | ue(v) |
| attribute_cicp_colour_primaries[ i ] | ue(v) |
| attribute_cicp_transfer_characteristics[ i ] | ue(v) |
| attribute_cicp_matrix_coeffs[ i ] | ue(v) |
| attribute_cicp_video_full_range_flag[ i ] | u(1) |
| known_attribute_label_flag[ i ] | u(1) |
| if( known_attribute_label_flag[ i ] ) | |
| known_attribute_label[ i ] | ue(v) |
| else | |
| attribute_label_four_bytes[ i ] | u(32) |
| } | |
| projection_flag | u(1) |
| if(projection_flag) | |
| projection_info ( ) | |
| sps_extension_present_flag | u(1) |
| if( sps_extension_present_flag ) | |
| while( more_data_in_byte_stream( ) ) | |
| sps_extension_data_flag | u(1) |
| byte_alignment() | |
| } | |

FIG. 26

| tile_inventory( ) { | Descriptor |
|---|---|
| num_tiles | ue(v) |
| for( i = 0; i < num_tiles; i++ ) { | |
| tile_bounding_box_offset_x[ i ] | se(v) |
| tile_bounding_box_offset_y[ i ] | se(v) |
| tile_bounding_box_offset_z[ i ] | se(v) |
| tile_bounding_box_size_width[ i ] | ue(v) |
| tile_bounding_box_size_height[ i ] | ue(v) |
| tile_bounding_box_size_depth[ i ] | ue(v) |
| projection_flag | u(1) |
| if(projection_flag) | |
| projection_info ( ) | |
| } | |
| byte_alignment( ) | |
| } | |

FIG. 27

| attribute_slice_header( ) { | Descriptor |
|---|---|
| ash_attr_parameter_set_id | ue(v) |
| ash_attr_sps_attr_idx | ue(v) |
| ash_attr_geom_slice_id | ue(v) |
| if ( aps_slice_qp_delta_present_flag ) { | |
| ash_qp_delta_luma | se(v) |
| ash_qp_delta_chroma | se(v) |
| } | |
| projection_flag | u(1) |
| if(projection_flag) | |
| projection_info ( ) | |
| byte_alignment( ) | |
| } | |

FIG. 28

| attribute_parameter_set( ) { | Descriptor |
|---|---|
| ...... | |
| attr_coord_conv_enable_flag | u(1) |
| if(attr_coor_conv_enable_flag){ | |
| for ( i=0; i<3; i++) | |
| attr_coord_conv_scale[i] | ue(v) |
| } | |
| ...... | |
| } | |

# POINT CLOUD DATA TRANSMISSION DEVICE, TRANSMISSION METHOD, PROCESSING DEVICE, AND PROCESSING METHOD

CROSS-REFERENCE TO RELATED APPLICATIONS

This application is the National Stage filing under 35 U.S.C. of International Application No. PCT/KR2021/008168, filed on Jun. 29, 2021, which claims the benefit of U.S. Provisional Application No. 63/045,820, filed on Jun. 29, 2020, the contents of which are all hereby incorporated by reference herein in their entirety.

TECHNICAL FIELD

Embodiments provide a method for providing point cloud contents to provide a user with various services such as virtual reality (VR), augmented reality (AR), mixed reality (MR), and self-driving services.

BACKGROUND

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

SUMMARY

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Therefore, to efficiently process point cloud data, embodiments provide a method of transmitting point cloud data, including encoding point cloud data including a geometry and an attribute, and transmitting a bitstream containing the encoded point cloud data. The geometry is information about positions of points of the point cloud data, and the attribute includes at least one of color or reflectance of the points. The encoding of the point cloud data may include converting coordinates representing the positions of the points.

Embodiments provide a device for transmitting point cloud data, including an encoder configured to encode point cloud data including a geometry and an attribute, and a transmitter configured to transmit a bitstream containing the encoded point cloud data. According to the embodiments, the geometry is information about positions of points of the point cloud data, and the attribute includes at least one of color or reflectance of the points. The encoder converts coordinates representing the positions of the points.

Embodiments provide a method of processing point cloud data, including receiving a bitstream containing point cloud data and decoding the point cloud data. The bitstream may contain signaling information. The geometry may be information about positions of points in the point cloud data, and the attribute may include at least one of color or reflectance of the points. The decoding of the point cloud data may include converting coordinates representing the positions of the points based on the signaling information.

Embodiments provide a device for processing point cloud data, including a receiver configured to receive a bitstream containing point cloud data and a decoder configured to decode the point cloud data. The bitstream may contain signaling information. The geometry may be information about positions of points in the point cloud data, and the attribute may include at least one of a color or reflectance of the points. The decoder may convert coordinates representing the positions of the points based on the signaling information.

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. For a better understanding of various embodiments described below, reference should be made to the description of the following embodiments in connection with the accompanying drawings. The same reference numbers will be used throughout the drawings to refer to the same or like parts. In the drawings:

FIG. 6 shows an example of an octree and occupancy code according to embodiments;

FIG. 7 shows an example of a neighbor node pattern according to embodiments;

FIG. 22 illustrates an example of laser position adjustment;

FIG. 24 shows an exemplary syntax structure of signaling information related to projection;

FIG. 25 shows an example of signaling information according to embodiments;

FIG. 26 shows an example of signaling information according to embodiments;

FIG. 27 shows an example of signaling information according to embodiments;

FIG. 28 shows signaling information according to embodiments;

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
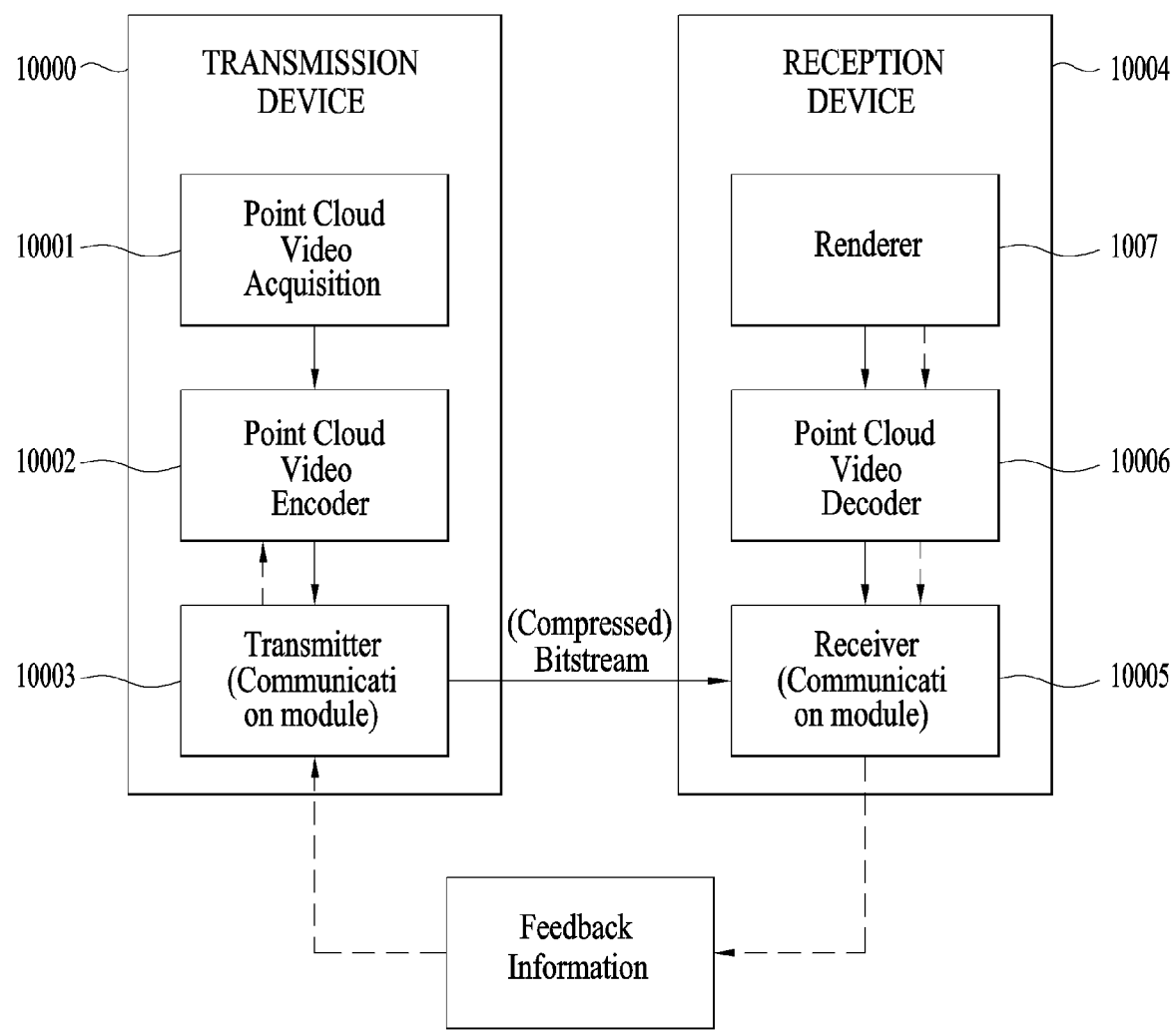
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (e.g., a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (e.g., a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in a reverse process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
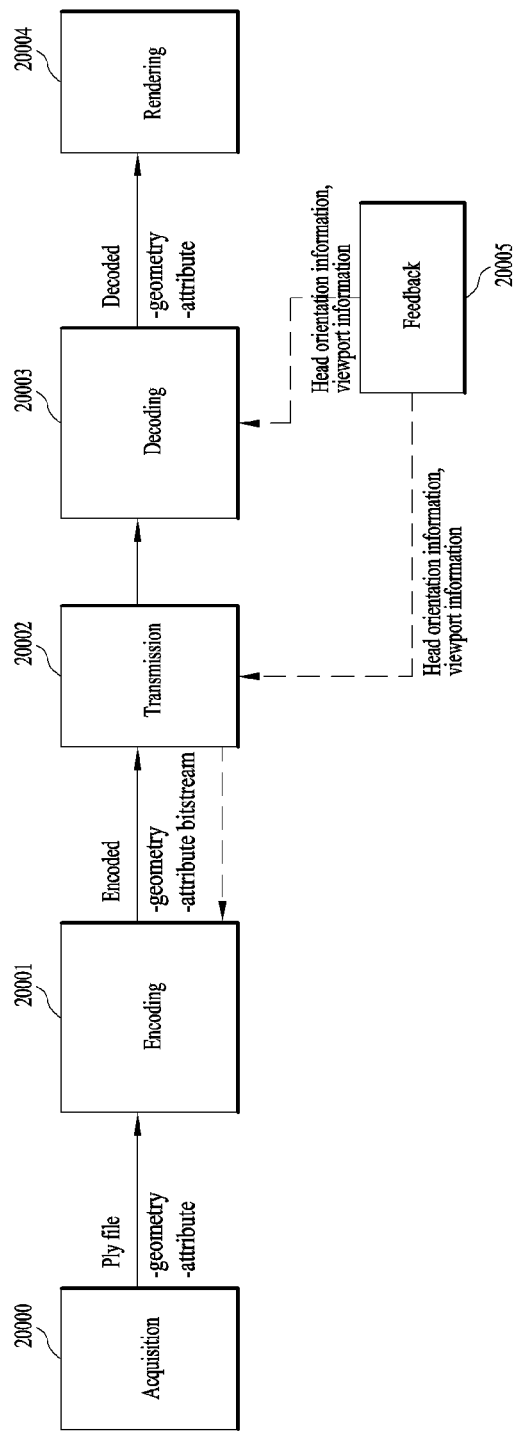
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (e.g., the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (e.g., values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (e.g., the point cloud transmission device 10000 or the point cloud video acquirer 10001) may secure point cloud data from information (e.g., depth information, color information, etc.) related to the acquisition process of the point cloud video.

The point cloud content providing system (e.g., the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (e.g., the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (e.g., signaling information related to the geometry encoding and the attribute encoding). The point cloud content providing system may encapsulate a bitstream that carries the encoded point cloud data and transmit the same in the form of a file or segment.

The point cloud content providing system (e.g., the reception device 10004 or the receiver 10005) according to the embodiments may receive the bitstream containing the encoded point cloud data. In addition, the point cloud content providing system (e.g., the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (e.g., the reception device 10004 or the point cloud video decoder 10005) may decode the point cloud video data based on the signaling information related to encoding of the point cloud video data contained in the bitstream. The point cloud content providing system (e.g., the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (e.g., the reception device 10004 or the point cloud video decoder 10005) may reconstruct the point cloud video based on the positions according to the reconstructed geometry and the decoded attributes.

The point cloud content providing system according to the embodiments (e.g., the reception device 10004 or the renderer 10007) may render the decoded point cloud data (20004). The point cloud content providing system (e.g., the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (e.g., the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
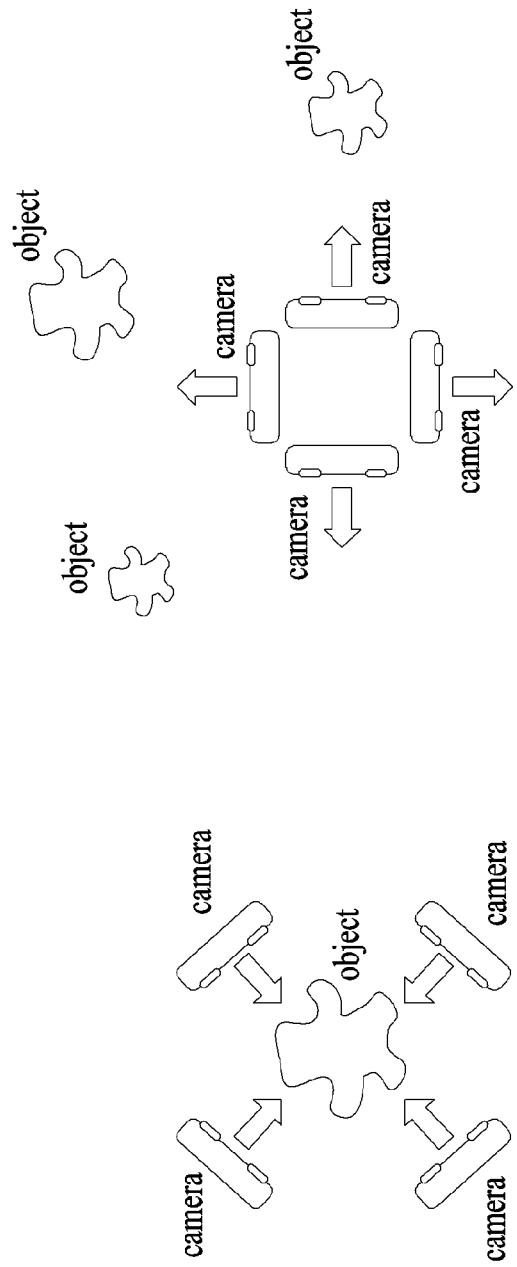
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (e.g., a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
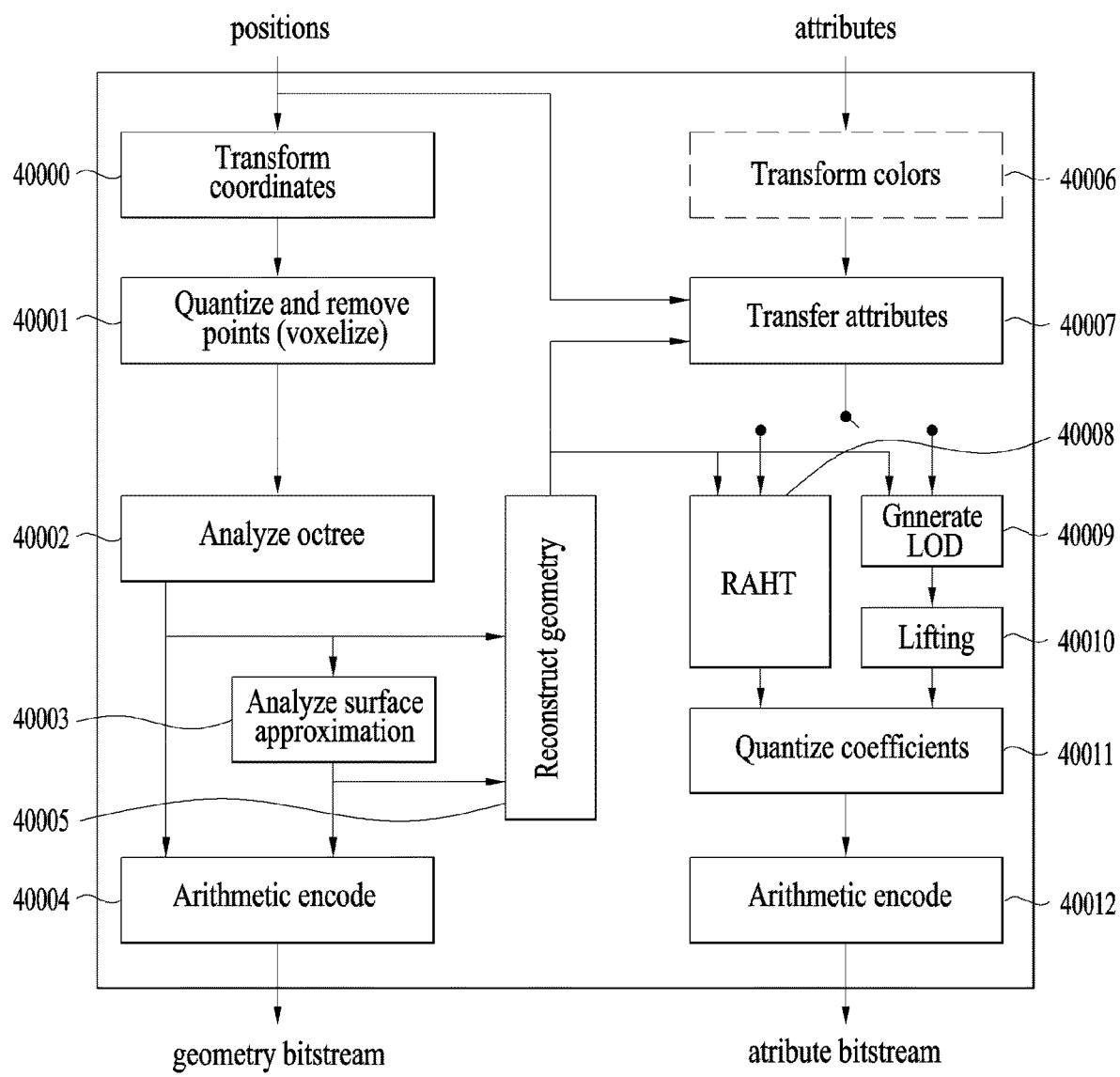
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (e.g., a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (e.g., a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighboring points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighboring points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
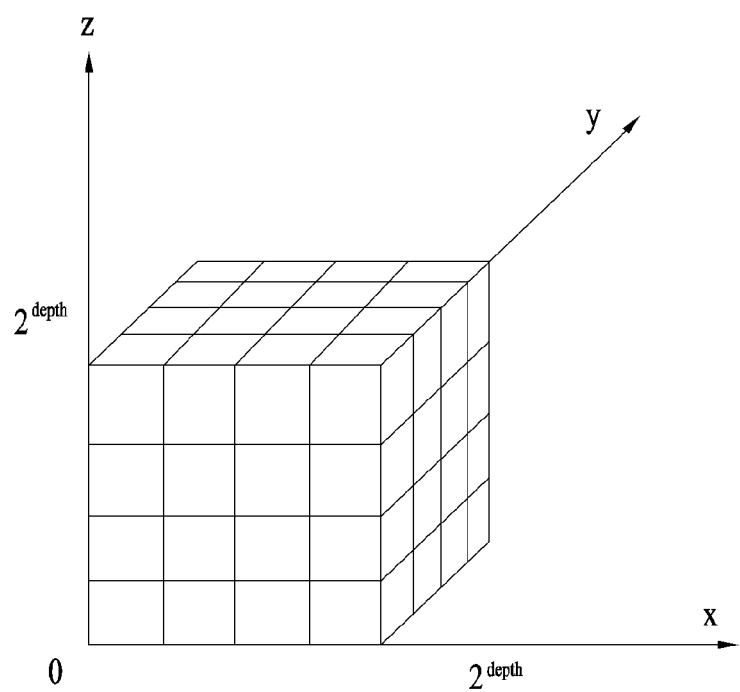
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and ($2^d$, $2^d$, $2^d$) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (e.g., the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and ($2^d$, $2^d$, $2^d$) Here, 2d may be set to a value constituting the smallest bounding box surrounding all points of the point cloud content (or point cloud video). Here, d denotes the depth of the octree. The value of d is determined in the following equation. In the following equation, ($x^{int}_n$, $y^{int}_n$, $z^{int}_n$) denotes the positions (or position values) of quantized points.

$$d=\text{Ceil}(\text{Log }2(\text{Max}(x_n^{int},y_n^{int},z_n^{int},n=1,\ldots,N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (e.g., the arithmetic encoder 40004) according to the embodiments may perform entropy encoding on the occupancy codes. In order to increase the compression efficiency, the point cloud encoder may perform intra/inter-coding on the occupancy codes. The reception device (e.g., the reception device 10004 or the point cloud video decoder 10006) according to the embodiments reconstructs the octree based on the occupancy codes.

The point cloud encoder (e.g., the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (e.g., the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

Once the vertex is detected, the point cloud encoder according to the embodiments may perform entropy encoding on the starting point (x, y, z) of the edge, the direction vector ($\Delta x, \Delta y, \Delta z$) of the edge, and the vertex position value (relative position value within the edge). When the trisoup geometry encoding is applied, the point cloud encoder according to the embodiments (e.g., the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: i) calculating the centroid value of each vertex, ii) subtracting the center value from each vertex value, and iii) estimating the sum of the squares of the values obtained by the subtraction.

$$i) \begin{bmatrix} \mu_x \\ \mu_y \\ \mu_z \end{bmatrix} = \frac{1}{n} \sum_{i=1}^{n} \begin{bmatrix} x_i \\ y_i \\ z_i \end{bmatrix}; \quad ii) \begin{bmatrix} \overline{x}_i \\ \overline{y}_i \\ \overline{z}_i \end{bmatrix} = \begin{bmatrix} x_i \\ y_i \\ z_i \end{bmatrix} - \begin{bmatrix} \mu_x \\ \mu_y \\ \mu_z \end{bmatrix}; \quad iii) \begin{bmatrix} \sigma_x^2 \\ \sigma_y^2 \\ \sigma_z^2 \end{bmatrix} = \sum_{i=1}^{n} \begin{bmatrix} \overline{x}_i^2 \\ \overline{y}_i^2 \\ \overline{z}_i^2 \end{bmatrix}$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through atan2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

TABLE 2-1

Triangles formed from vertices ordered 1, . . . , n

| n | triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (e.g., the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The upper part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The lower part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (based on, for example, a table by which 64 is changed to 10 or 6).

Figure 8:
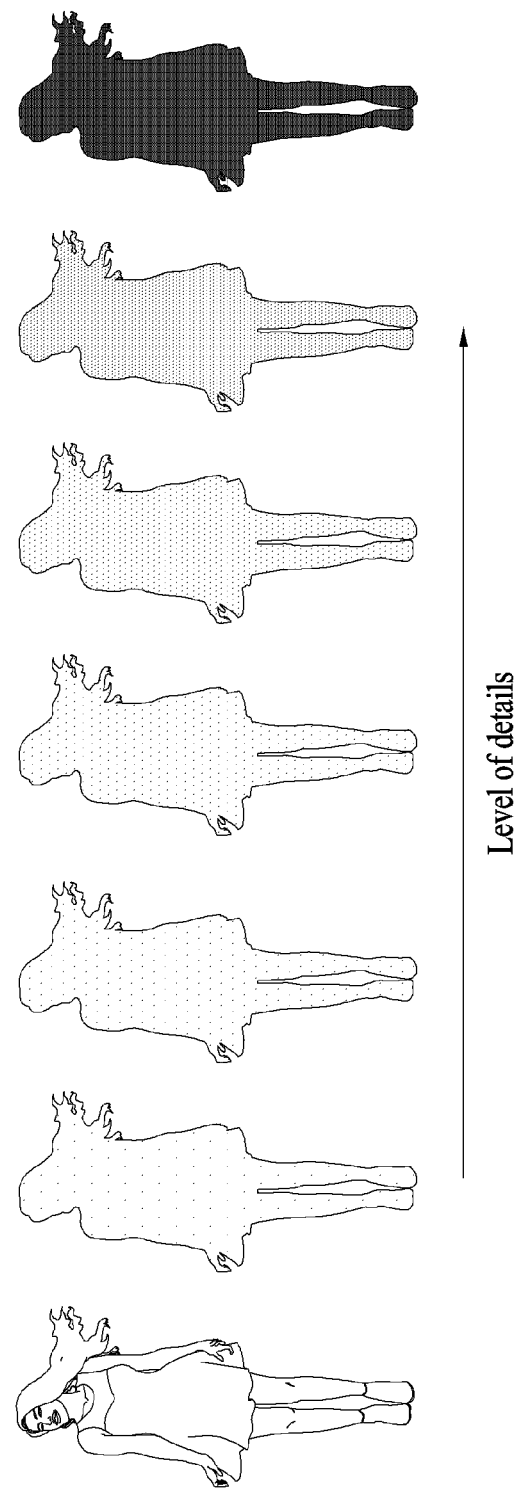
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (e.g., the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
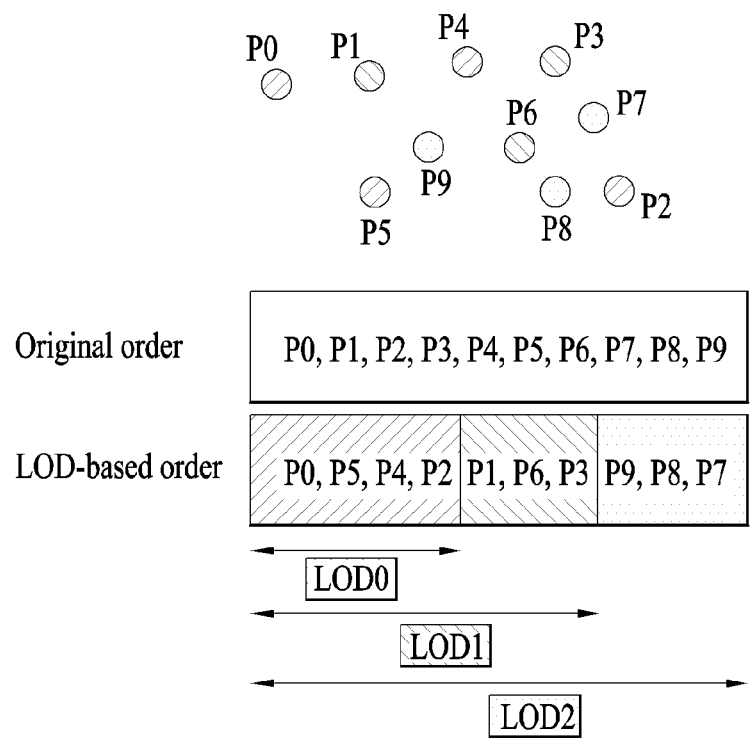
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (e.g., the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighboring points present within a set distance for each LOD, and a distance to the neighboring points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (e.g., the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

TABLE

Attribute prediction residuals quantization pseudo code
int PCCQuantization(int value, int quantStep) {
if( value >=0) {
return floor(value / quantStep + 1.0 / 3.0);
} else {
return -floor(-value / quantStep + 1.0 / 3.0);
}
}

TABLE

Attribute prediction residuals inverse quantization pseudo code
int PCCInverseQuantization(int value, int quantStep) {
if( quantStep == 0) {
return value;
} else {
return value * quantStep;
}
}

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (e.g., the arithmetic encoder 40012) may perform entropy coding on the attributes of the corresponding point without performing the above-described operation.

The point cloud encoder according to the embodiments (e.g., the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.
2) Lift prediction process: Subtract the value obtained by multiplying the attribute value of the point by the weight from the existing attribute value to calculate a predicted attribute value.
3) Create temporary arrays called updateweight and update and initialize the temporary arrays to zero.
4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.
5) Lift update process: Divide the attribute values of the update array for all predictors by the weight value of the updateweight array of the predictor index, and add the existing attribute value to the values obtained by the division.
6) Calculate predicted attributes by multiplying the attribute values updated through the lift update process by the weight updated through the lift prediction process (stored in the QW) for all predictors. The point cloud encoder (e.g., coefficient quantizer $40011$) according to the embodiments quantizes the predicted attribute values. In addition, the point cloud encoder (e.g., the arithmetic encoder $40012$) performs entropy coding on the quantized attribute values.

The point cloud encoder (e.g., the RAHT transformer $40008$) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{2x,y,z}}$ and $g_{l_{2x+1,y,z}}$ are $w1=w_{l_{2x,y,z}}$ and $w2=w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix}, T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (e.g., encoding by the arithmetic encoder $400012$). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000\,w1001} \begin{bmatrix} g_{1_{0,0,0z}} \\ g_{1_{0,0,1}} \end{bmatrix}$$

Figure 10:
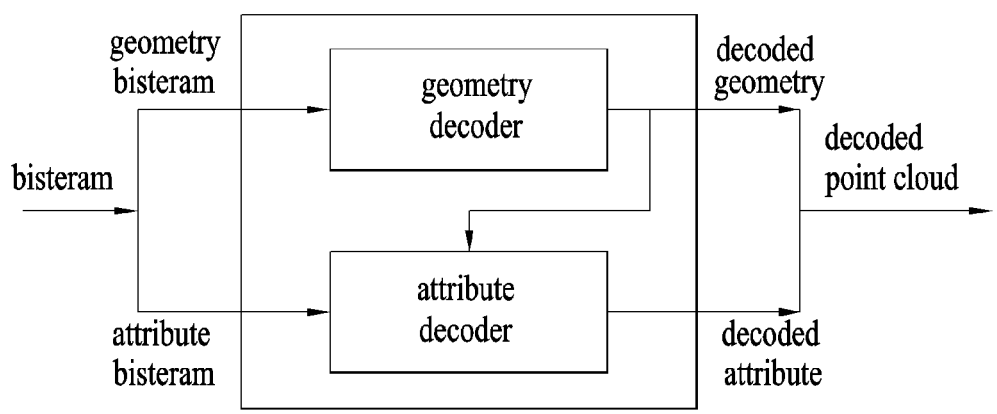
FIG. 10 illustrates a point cloud decoder according to embodiments.

FIG. 10 illustrates a point cloud decoder according to embodiments.

The point cloud decoder illustrated in FIG. 10 is an example of the point cloud video decoder $10006$ described in FIG. 1, and may perform the same or similar operations as the operations of the point cloud video decoder $10006$ illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
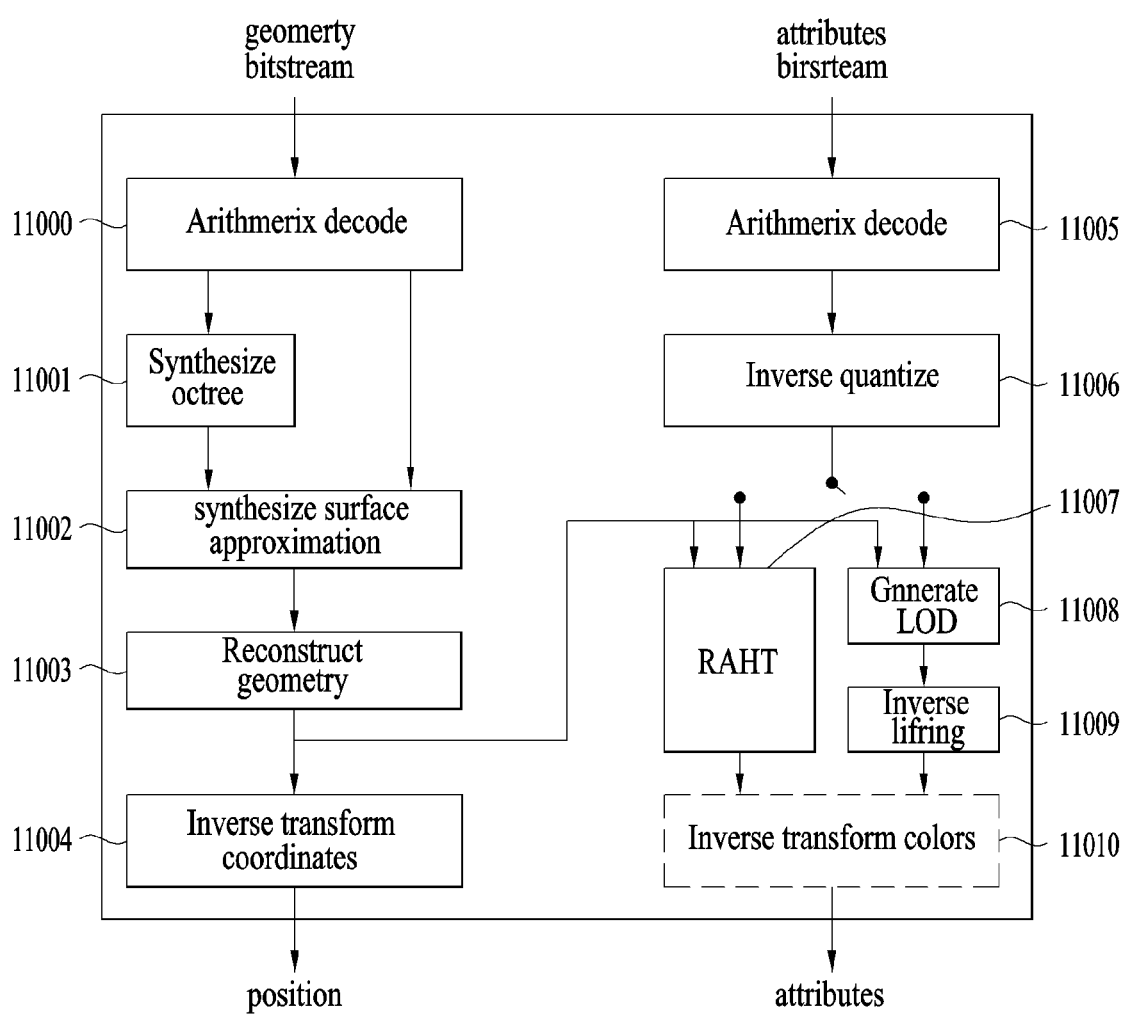
FIG. 11 illustrates a point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) $11000$, an octree synthesizer (Synthesize octree) $11001$, a surface approximation synthesizer (Synthesize surface approximation) $11002$, and a geometry reconstructor (Reconstruct geometry) $11003$, a coordinate inverse transformer (Inverse transform coordinates) $11004$, an arithmetic decoder (Arithmetic decode) $11005$, an inverse quantizer (Inverse quantize) $11006$, a RAHT transformer $11007$, an LOD generator (Generate LOD) $11008$, an inverse lifter (inverse lifting) $11009$, and/or a color inverse transformer (Inverse transform colors) $11010$.

The arithmetic decoder $11000$, the octree synthesizer $11001$, the surface approximation synthesizer $11002$, the geometry reconstructor $11003$, and the coordinate inverse transformer $11004$ may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder $11000$ according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
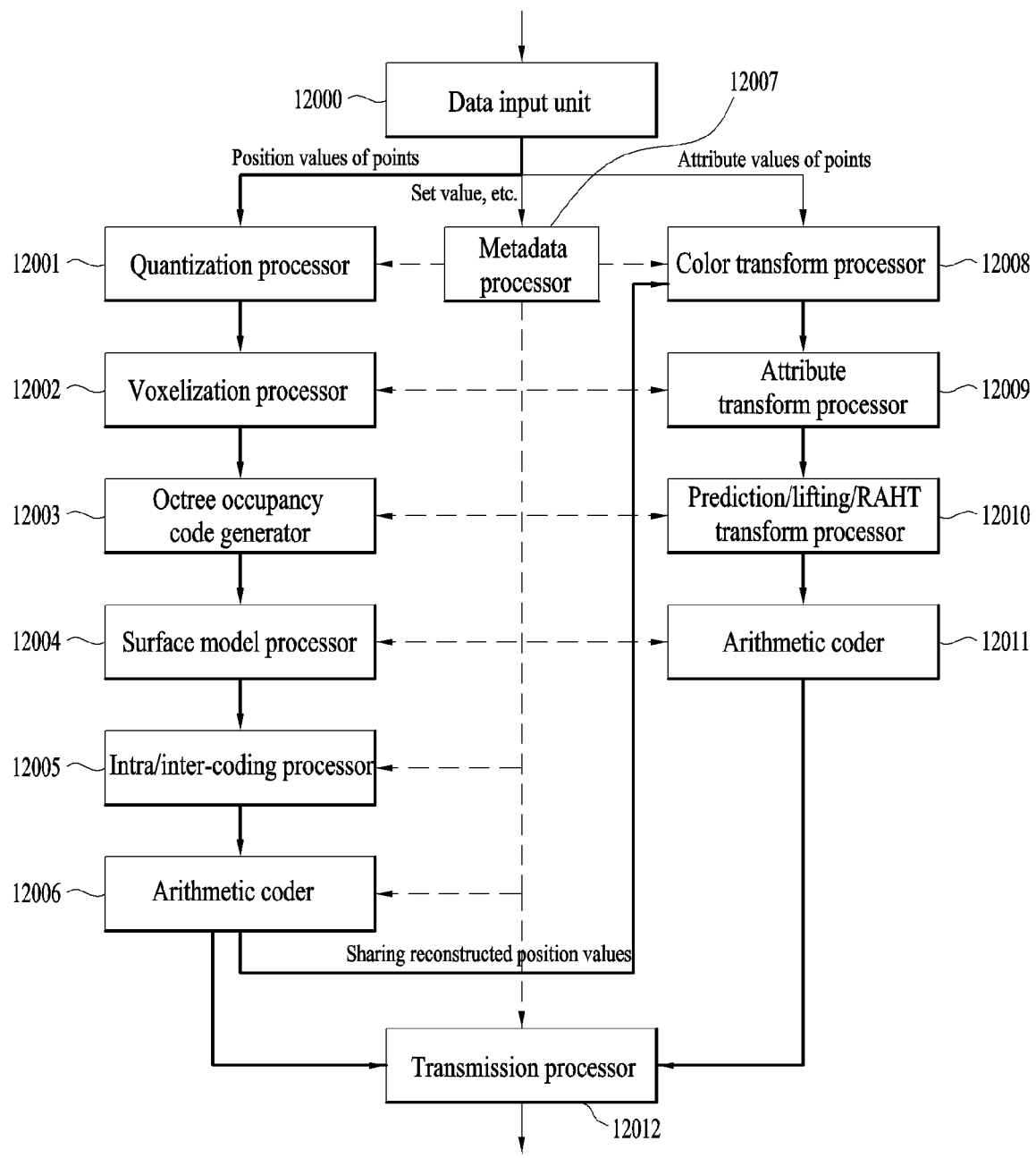
FIG. 12 illustrates a transmission device according to embodiments.

FIG. 12 illustrates a transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same as or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same as or similar to the operation and/or acquisition method of the point cloud video acquirer 1001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same as or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same as or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same as or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trigsoup geometry encoding based on a surface model to reconstruct the positions of points in a specific region (or node) on a voxel basis. The surface model processor 12004 may perform an operation and/or method the same as or similar to the operation and/or method of the point cloud encoder (e.g., the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same as or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same as or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same as or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same as or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same as or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same as or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same as or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom00 and one or more attribute bitstreams Attr00 and Attr10.

A slice refers to a series of syntax elements representing the entirety or part of a coded point cloud frame.

The TPS according to the embodiments may include information about each tile (e.g., coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same as or similar to the operation and/or transmission method of the transmitter 10003. Details are the same as those described with reference to FIGS. 1 and 2, and thus a description thereof is omitted.

Figure 13:
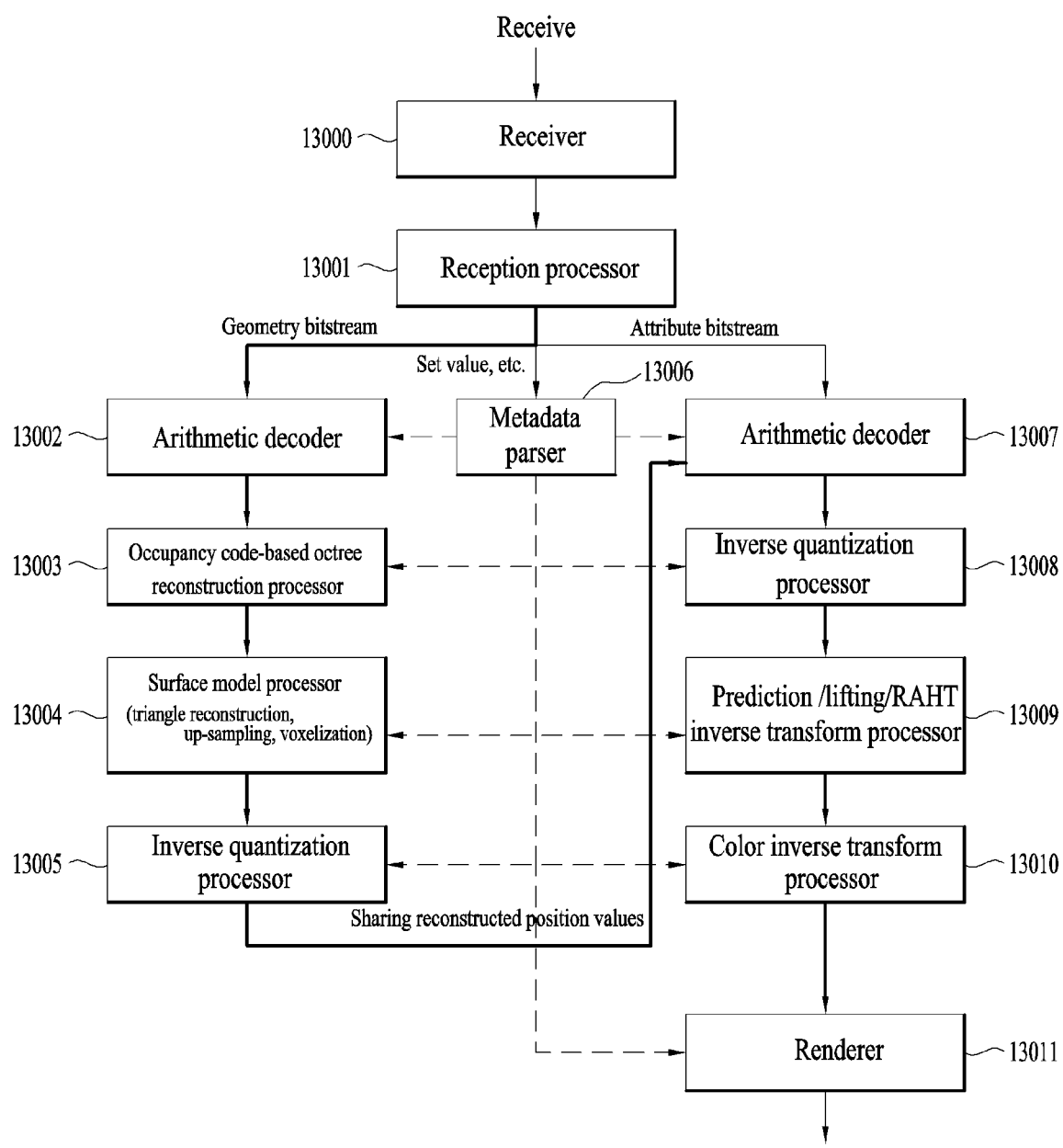
FIG. 13 illustrates a reception device according to embodiments.

FIG. 13 illustrates a reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same as or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform a reverse process of the operation of a corresponding element for encoding according to the embodiments.

The receiver 13000 according to the embodiments receives point cloud data. The receiver 13000 may perform an operation and/or reception method the same as or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 13005 may perform geometry decoding. The geometry decoding according to embodiments is the same as or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same as or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same as or similar to the operation and/or octree generation method of the octree synthesizer 11001. When the trisoup geometry encoding is applied, the surface model processor 13004 according to the embodiments may perform trisoup geometry decoding and related geometry reconstruction (e.g., triangle reconstruction, up-sampling, voxelization) based on the surface model method. The surface model processor 13004 performs an operation the same as or similar to that of the surface approximation synthesizer 11002 and/or the geometry reconstructor 11003.

The inverse quantization processor 13005 according to the embodiments may inversely quantize the decoded geometry.

The metadata parser 13006 according to the embodiments may parse metadata contained in the received point cloud data, for example, a set value. The metadata parser 13006 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same as or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same as or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same as or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 13009 performs one or more of operations and/or decoding the same as or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same as or similar to the operation and/or inverse transform coding of the color inverse transformer 11010. The renderer 13011 according to the embodiments may render the point cloud data.

Figure 14:
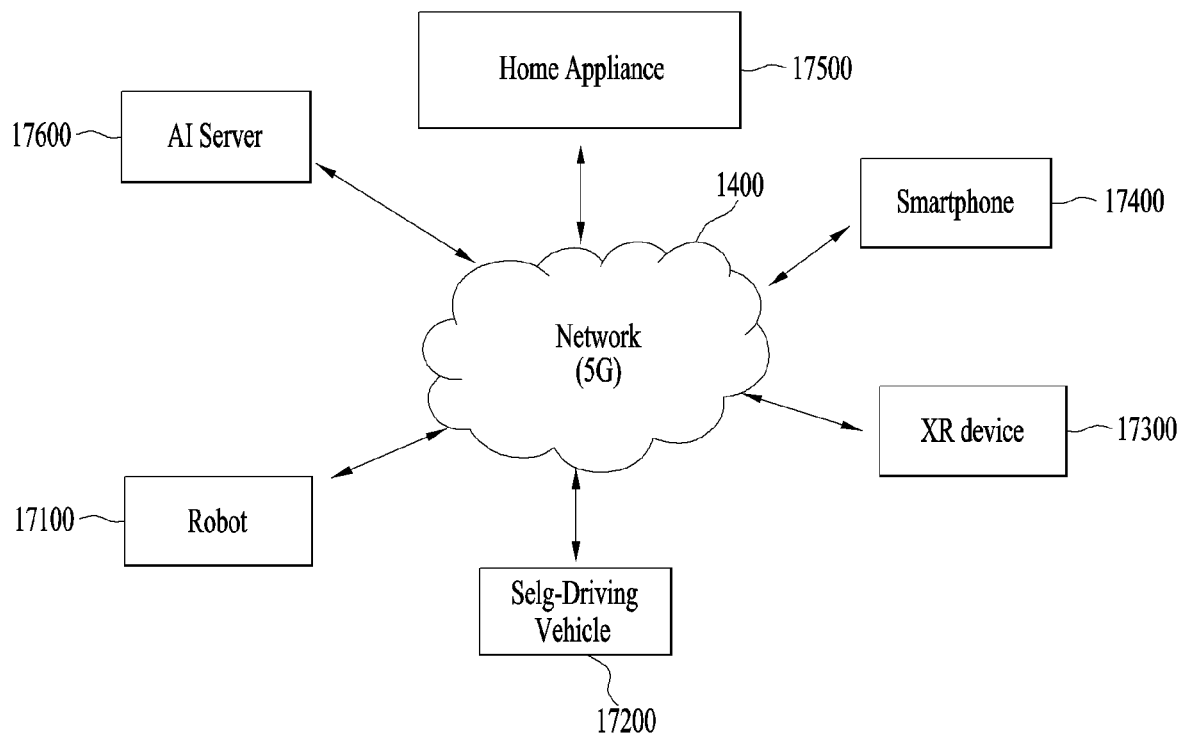
FIG. 14 illustrates an exemplary structure operable in connection with point cloud data transmission/reception methods/devices according to embodiments.

FIG. 14 illustrates an exemplary structure operable in connection with point cloud data transmission/reception methods/devices according to embodiments.

The structure of FIG. 14 represents a configuration in which at least one of a server 1460, a robot 1410, a self-driving vehicle 1420, an XR device 1430, a smartphone 1440, a home appliance 1450, and/or a head-mount display (HMD) 1470 is connected to the cloud network 1400. The robot 1410, the self-driving vehicle 1420, the XR device 1430, the smartphone 1440, or the home appliance 1450 is called a device. Further, the XR device 1430 may correspond to a point cloud data (PCC) device according to embodiments or may be operatively connected to the PCC device.

The cloud network 1400 may represent a network that constitutes part of the cloud computing infrastructure or is present in the cloud computing infrastructure. Here, the cloud network 1400 may be configured using a 3G network, 4G or Long Term Evolution (LTE) network, or a 5G network.

The server 1460 may be connected to at least one of the robot 1410, the self-driving vehicle 1420, the XR device 1430, the smartphone 1440, the home appliance 1450, and/or the HMD 1470 over the cloud network 1400 and may assist in at least a part of the processing of the connected devices 1410 to 1470.

The HMD 1470 represents one of the implementation types of the XR device and/or the PCC device according to the embodiments. The HMD type device according to the embodiments includes a communication unit, a control unit, a memory, an I/O unit, a sensor unit, and a power supply unit.

Hereinafter, various embodiments of the devices 1410 to 1450 to which the above-described technology is applied will be described. The devices 1410 to 1450 illustrated in FIG. 14 may be operatively connected/coupled to a point cloud data transmission device and reception according to the above-described embodiments.

<PCC+XR>

The XR/PCC device 1430 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1430 may analyze 3D point cloud data or image data acquired through various sensors or from an external device and generate position data and attribute data about 3D points. Thereby, the XR/PCC device 1430 may acquire information about the surrounding space or a real object, and render and output an XR object. For example, the XR/PCC device 1430 may match an XR object including auxiliary information about a recognized object with the recognized object and output the matched XR object.

<PCC+XR+Mobile Phone>

The XR/PCC device 1430 may be implemented as a mobile phone 1440 by applying PCC technology.

The mobile phone 1440 may decode and display point cloud content based on the PCC technology.

<PCC+Self-Driving+XR>

The self-driving vehicle 1420 may be implemented as a mobile robot, a vehicle, an unmanned aerial vehicle, or the like by applying the PCC technology and the XR technology.

The self-driving vehicle 1420 to which the XR/PCC technology is applied may represent a self-driving vehicle provided with means for providing an XR image, or a self-driving vehicle that is a target of control/interaction in the XR image. In particular, the self-driving vehicle 1420 which is a target of control/interaction in the XR image may be distinguished from the XR device 1430 and may be operatively connected thereto.

The self-driving vehicle 1420 having means for providing an XR/PCC image may acquire sensor information from sensors including a camera, and output the generated XR/PCC image based on the acquired sensor information. For example, the self-driving vehicle 1420 may have an HUD and output an XR/PCC image thereto, thereby providing an occupant with an XR/PCC object corresponding to a real object or an object present on the screen.

When the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap an object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Figure 15:
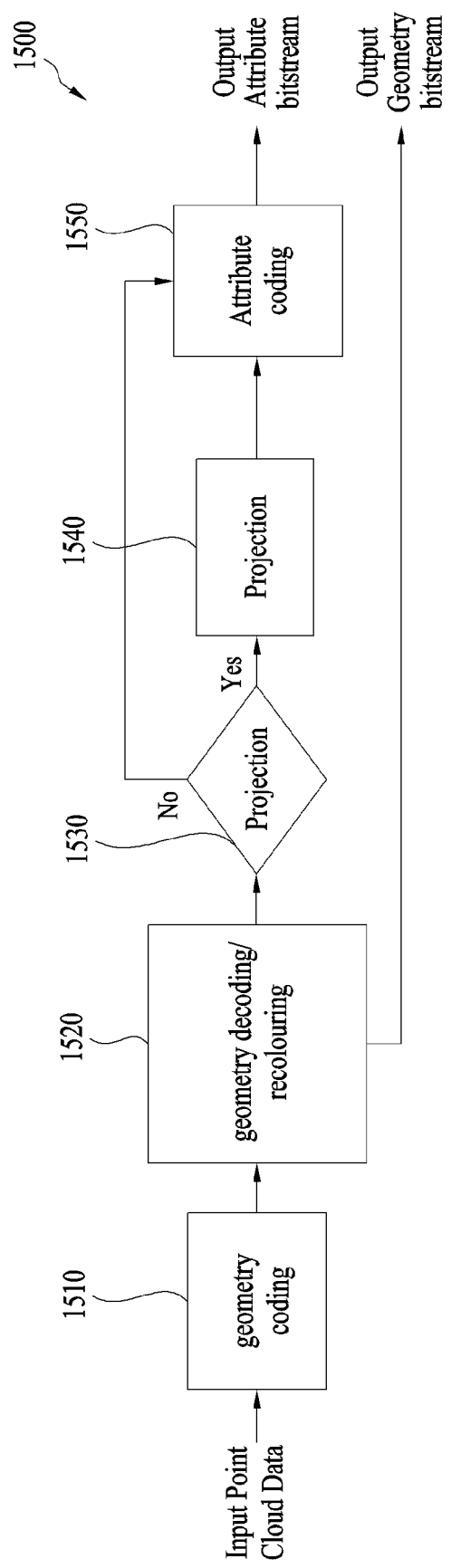
FIG. 15 is a flowchart illustrating an operation of a point cloud data transmission device according to embodiments.

FIG. 15 is a flowchart illustrating an operation of a point cloud data transmission device according to embodiments.

The flowchart 1500 of FIG. 15 shows an example of the operation of the point cloud transmission device (or referred to as a point cloud data transmission device) that performs projection to increase the compression efficiency of attribute encoding. The projection according to the embodiments is applied to geometry as a preprocessing process of attribute encoding. The density of data distribution of point cloud data (e.g., LiDAR data, etc.) acquired in a specific pattern varies according to the the acquisition pattern. As described with reference to FIGS. 1 to 14, attribute encoding is performed based on geometry encoding. When attributes are encoded based on non-uniformly distributed geometries, attribute compression efficiency may may be degraded. Accordingly, the projection according to the embodiments is applied to point cloud data for which attribute compression efficiency may be increased by position change. The prediction is an operation of converting coordinates (e.g., Cartesian coordinates composed of x-axis, y-axis, and z-axis) representing the position (geometry) of each point and transforming the converted coordinates into coordinates representing a compressible form (e.g., a cuboid space). The projection according to the embodiments may be referred to as coordinate conversion.

As described with reference to FIGS. 1 to 14, the point cloud transmission device (e.g., the transmission device of FIG. 1, the point cloud encoder of FIG. 4, and the transmission device of FIG. 12) performs coding (geometry coding) on geometry (1510). The geometry coding according to the embodiments corresponds to at least one of the operations of the coordinate transformer 40000, the quantizer 40001, the octree octree analyzer 40002, the surface approximation analyzer 40003, the arithmetic encoder 40004, and the geometry reconstructor 4005 described with reference to FIG. 4, or a combination thereof, but is not limited to the above example. In addition, the geometry coding corresponds to at least one of the operations of the data input unit 12000, the quantization processor 12001, the voxelization processor 12002, the octree occupancy code generator 12003, the surface model processor 12004, the intra/inter-coding processor 12005, the arithmetic coder 12006, and the metadata processor 12007, or a combination thereof, but is not limited to the above example. The geometry coding may be referred to as geometry encoding.

When lossy coding is performed, the point cloud transmission device according to the embodiments decodes the encoded geometry and performs recoloring (attribute transfer) (1520). The point cloud transmission device may match the reconstructed geometry and attributes, thereby minimizing attribute distortion. The point cloud transmission device may determine whether to perform projection on the reconstructed geometry (1530) and perform the projection (1540).

The point cloud transmission device according to the embodiments performs attribute coding based on the projected geometry (1550). The attribute coding according to the embodiments corresponds to at least one of the operations of the color transformer 40006, the attribute transformer 40007, the RAHT transformer 40008, the LOD generator 40009, the lifting transformer 40010, and the coefficient quantizer 40011, and/or the arithmetic encoder 40012 described with reference to FIG. 4, or a combination thereof, but is not limited to the above example. In addition, the attribute coding corresponds to at least one of the operations of the color transform processor 12008, the attribute transform processor 12009, the prediction/lifting/RAHT transform processor 12010, and the arithmetic coder 12011 described with reference to FIG. 12, or a combination thereof, but is not limited to the above example. The attribute coding may be referred to as attribute encoding. The point cloud transmission device outputs an attribute bitstream by performing the attribute coding.

The geometry coding and attribute coding according to the embodiments are the same as those described with reference to FIGS. 1 to 14, and thus a detailed description thereof is omitted.

Figure 16:
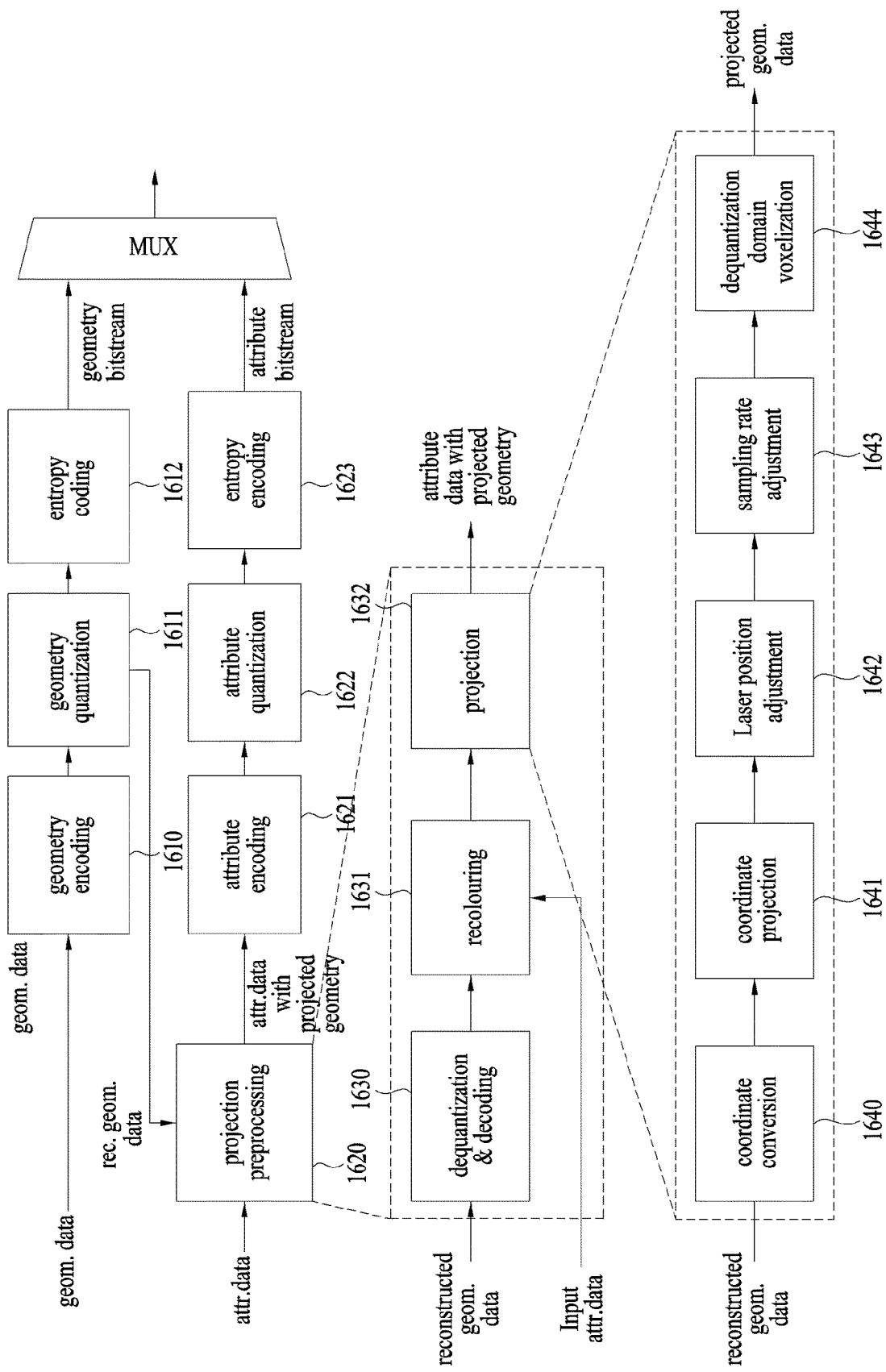
FIG. 16 illustrates an example of an operation of a point cloud data transmission device.

FIG. 16 illustrates an example of an operation of a point cloud data transmission device.

The flowchart 1600 of FIG. 16 illustrates the operation of the point cloud data transmission device (or point cloud transmission device) illustrated in the flowchart 1500 of FIG. 15 in detail. The flowchart 1600 illustrates an example of the operation of the point cloud transmission device. Accordingly, the data processing sequence of the point cloud transmission device is not limited to this example. In addition, the operations represented by the components in the flowchart 1600 may be performed by hardware, software, a process, or a combination thereof that constitutes the point cloud transmission device.

The point cloud transmission device performs geometry coding (e.g., geometry coding 1510 described with reference to FIG. 15) on geometry data and outputs a geometry bitstream. The geometry coding may include geometry encoding 1610, geometry quantization 1611, and entropy coding 1612. The geometry encoding 1610 may include at least one of octree geometry encoding, trisoup geometry encoding, and predictive geometry coding, but is not limited thereto. The geometry encoding is the same as that described with reference to FIG. 4, and thus a description thereof will be omitted.

The point cloud transmission device performs projection preprocessing (e.g., the projection described with reference to FIG. 15) based on the reconstructed geometry data (1620). The point cloud transmission device may output projected geometry and attributes by performing the projection preprocessing. The projection preprocessing 1620 may include dequantization and decoding 1630 of the reconstructed geometry, recoloring 1631 for matching of the decoded geometry and attributes, and projection 1632.

The point cloud transmission device according to the embodiments performs dequantizes and decodes the reconstructed geometry (1630). The point cloud transmission device performs recoloring to match the decoded geometry and attribute data (1631). The point cloud transmission device performs projection on the recolored point cloud data (e.g. geometry and attributes) (1632).

The projection 1632 may include at least one of coordinate conversion 1640, coordinate projection 1641, laser position adjustment 1642, sampling rate adjustment 1643 and projection domain voxelization 1644. Geometry represents the position of a point, and the position of each point is expressed in a coordinate system (e.g., a ⅔-dimensional Cartesian coordinate system, a ⅔-dimensional cylindrical coordinate system, a spherical coordinate system, etc.). To express the position of each point represented by the input geometry as a position in a 3D space, the point cloud transmission device according to the embodiments percorms the coordinate conversion 1640, which includes selecting a coordinate system and converting the geometry into information (e.g., a vector value, etc.) in the selected coordinate system. For example, the point cloud transmission device may perform coordinate conversion including Cartesian-cylindrical coordinate conversion for converting the Cartesian coordinate system into the cylindrical coordinate system and Cartesian-spherical coordinate conversion for converting the Cartesian coordinate system into the spherical coordinate system. Coordinate systems and coordinate conversion according to embodiments are not limited to the above-described examples. The point cloud transmission device according to the embodiments may generate and/or signal information about the converted coordinate system (such as, for example, the center position and range in the converted coordinate system, cylinder_center_x/y/z, cylinder_radius_max, cylinder_degree_max, cylinder_z_max, ref_vector_x/y/z, normal_vector_x/y/z, clockwise_degree_flag, etc.).

The point cloud transmission device according to embodiments performs the coordinate projection 1641, which includes projecting the geometry expressed in the converted coordinate system in a compressible form (e.g., a cuboid space). A projection type according to embodiments is indicated through signaling information such as projection_type. The signaling information is transmitted through the bitstream described with reference to FIGS. 1 to 14. The signaling information may include a range of projected data and information related to scaling in the projection operation (e.g., bounding_box_x/y/z_length, granularity_radius/angular/normal, etc.).

In order to increase projection accuracy, the point cloud transmission device performs the laser position adjustment 1642 and/or the sampling rate adjustment 1643 for correcting the projection. The laser position adjustment 1642 and the sampling rate adjustment 1643 are operations for projection correction. The adjustments may be selectively performed according to the characteristics of point cloud data and the characteristics of the point cloud data acquisition device, or may be performed concurrently, performed sequentially, or sequentially selected and performed. Alternatively, they may be skipped. As described above, when the prediction is performed on the point cloud data (e.g., LiDAR data, etc.) acquired in a specific pattern, the data may have poor accuracy due to a difference in density. The point cloud transmission device performs the laser position adjustment 1642 for correcting the projected point cloud data (e.g., projected geometry) in consideration of the position of the point cloud data acquisition device (e.g., laser). Signaling information related to the laser position adjustment 1642 (e.g., information (laser_position_adjustment_flag) indicating whether the laser position adjustment has been performed, information (e.g., num_laser, r_laser, z_laser, theta_laser, etc.) necessary for the laser position adjustment) is included in the above-described signaling information and transmitted through a bitstream.

In addition, the point cloud transmission device performs the sampling rate adjustment 1643 to correct the projected point cloud data (e.g. projected geometry) by applying a scale factor based on the mechanical characteristics of the point cloud data acquisition device (1643). The sampling rate adjustment may be applied to each axis of a coordinate system in which the point cloud data is presented, and information related to the sampling rate adjustment (e.g., signaling information such as sampling_adjustment_cubic_flag, sampling_adjustment_spread_bbox_flag, and sampling_adjustment_type) is included in the above-described signaling information and transmitted through the bitstream.

The point cloud transmission device performs the voxelization 1644 for converting the projected geometry into a domain that is efficient for compression. The projected geometry is converted into integer position information for compression through the voxelization 1644.

The point cloud transmission device outputs an attribute bitstream by performing attribute coding (e.g., the attribute coding 1550 described with reference to FIG. 15) based on the projected geometry. The attribute coding includes attribute encoding 1621, attribute quantization 1622, and entropy coding 1623. The attribute coding may be referred to as attribute encoding. The attribute encoding 1621 corresponds to at least one of RAHT coding, predictive transform coding, and lifting transform coding, or a combination of one or more thereof according to point cloud content. For example, the RAHT coding and lifting transform coding may be used for lossy coding that compresses point cloud content data to a significant size. Also, the predictive transform coding may be used for lossless coding. The above-described projection may be applied to geometry coding and/or attribute coding, and signaling information indicating whether the projected data is applied (e.g., geo_projection_enable_flag indicating that the converted data is used for the geometry coding and attr_projetion_enable_flag indicating whether the converted data is used for the attribute coding) is transmitted through the above-described bitstream. If the projection is applied only to the attribute coding, geometry information is encoded through general geometry coding, and the attribute coding is applied after the encoded geometry is projected.

As shown in the figure, the output geometry bitstream and attribute bitstream are multiplexed and transmitted.

Figure 17:
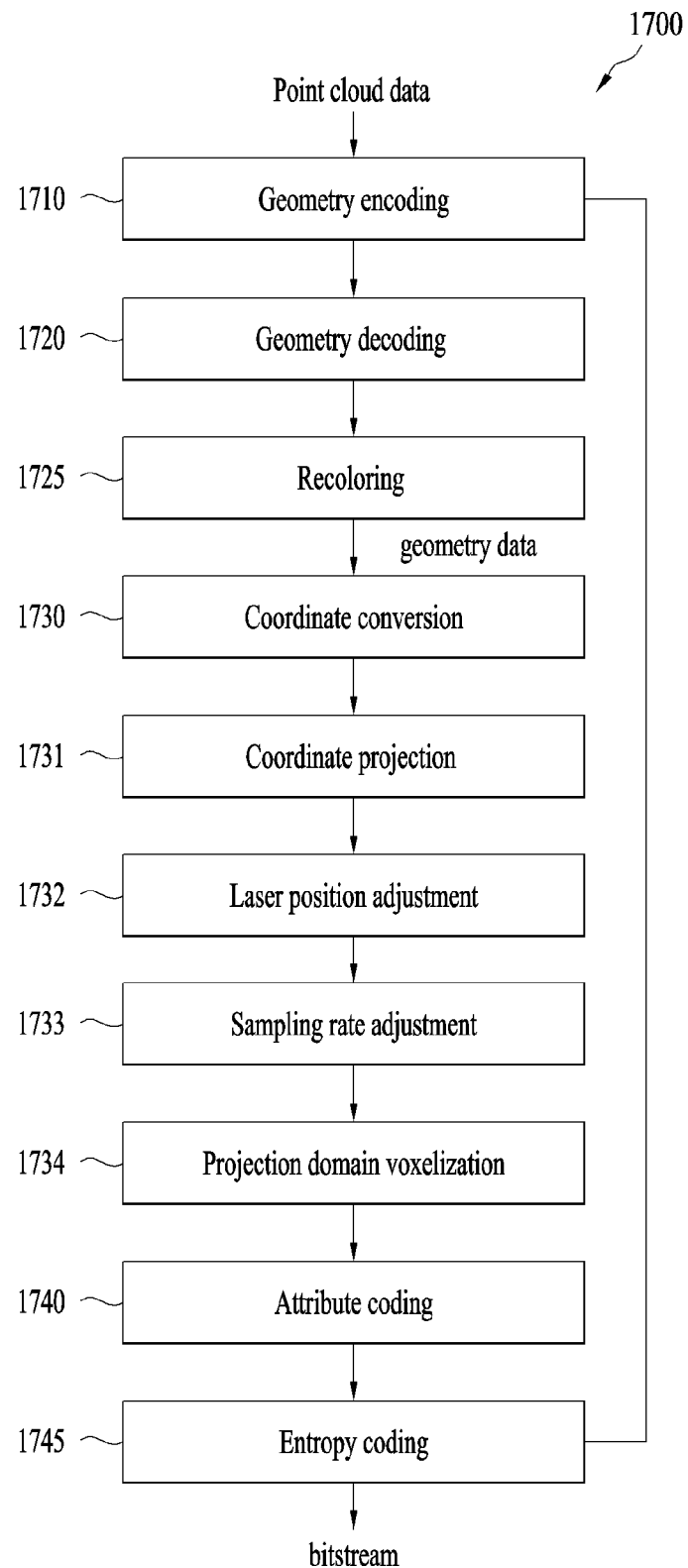
FIG. 17 illustrates an example of a processing process of a point cloud transmission device.

FIG. 17 illustrates an example of a processing process of a point cloud transmission device.

The flowchart 1700 of the figure illustrates an example of a processing procedure of the point cloud transmission device described with reference to FIGS. 15 and 16. The operation of the point cloud transmission device is not limited to this example, and operations corresponding to the respective elements may be performed in order as shown in FIG. 17 or may not be sequentially performed.

As described with reference to FIGS. 15 and 16, the point cloud transmission device receives point cloud data and performs geometry encoding on the geometry (1710). The geometry encoding 1710 is the same as the geometry coding 1510 described with reference to FIG. 15, the geometry coding described with reference to FIG. 16, and the geometry encoding 1610, geometry quantization 1611, and entropy coding 1612 in FIG. 16, and thus a detailed description thereof is omitted. The point cloud transmission device performs geometry decoding 1720 and recoloring 1725. The decoding 1720 and recoloring 1725 are the same as the geometry decoding/recoloring 1520 described with reference to FIG. 15 and the dequantization/decoding 1630 and recoloring 1631 described with reference to FIG. 16, and thus a detailed description thereof is omitted. The point cloud transmission device according to the embodiments performs projection on the recolored geometry data. The projection according to the embodiments includes coordinate conversion 1730, coordinate projection 1731, laser position adjustment 1733, sampling rate adjustment 1733, and projection domain voxelization 1734. The coordinate conversion 1730 is performed. The coordinate conversion 1730 is the same as the projection 1632 and the coordinate conversion 1640 described with reference to FIG. 16, and thus a detailed description thereof is omitted. The point cloud transmission device performs the coordinate projection 1731. The coordinate projection 1731 is the same as the projection 1632 described with reference to FIG. 16, and thus a detailed description is omitted. In order to correct the projection, the point cloud transmission device may sequentially or selectively perform the laser position adjustment 1732, the sampling rate adjustment 1733, and the projection domain voxelization 1734. The laser position adjustment 1732, the sampling rate adjustment 1733, and the projection domain voxelization 1734 are the same as the laser position adjustment 1642, the sampling rate adjustment 1643 and the voxelization 1644 described with reference to FIG. 16, and thus a detailed description thereof is omitted.

The point cloud transmission device according to the embodiments performs attribute coding 1740 and entropy coding 1745. The attribute coding 1740 and the entropy coding 1745 are the same as the attribute coding 1550 described with reference to FIG. 15 and the attribute coding described with reference to FIG. 16, for example, the attribute encoding 1621 and the entropy coding 1623, and thus a detailed description thereof is omitted.

Figure 18:
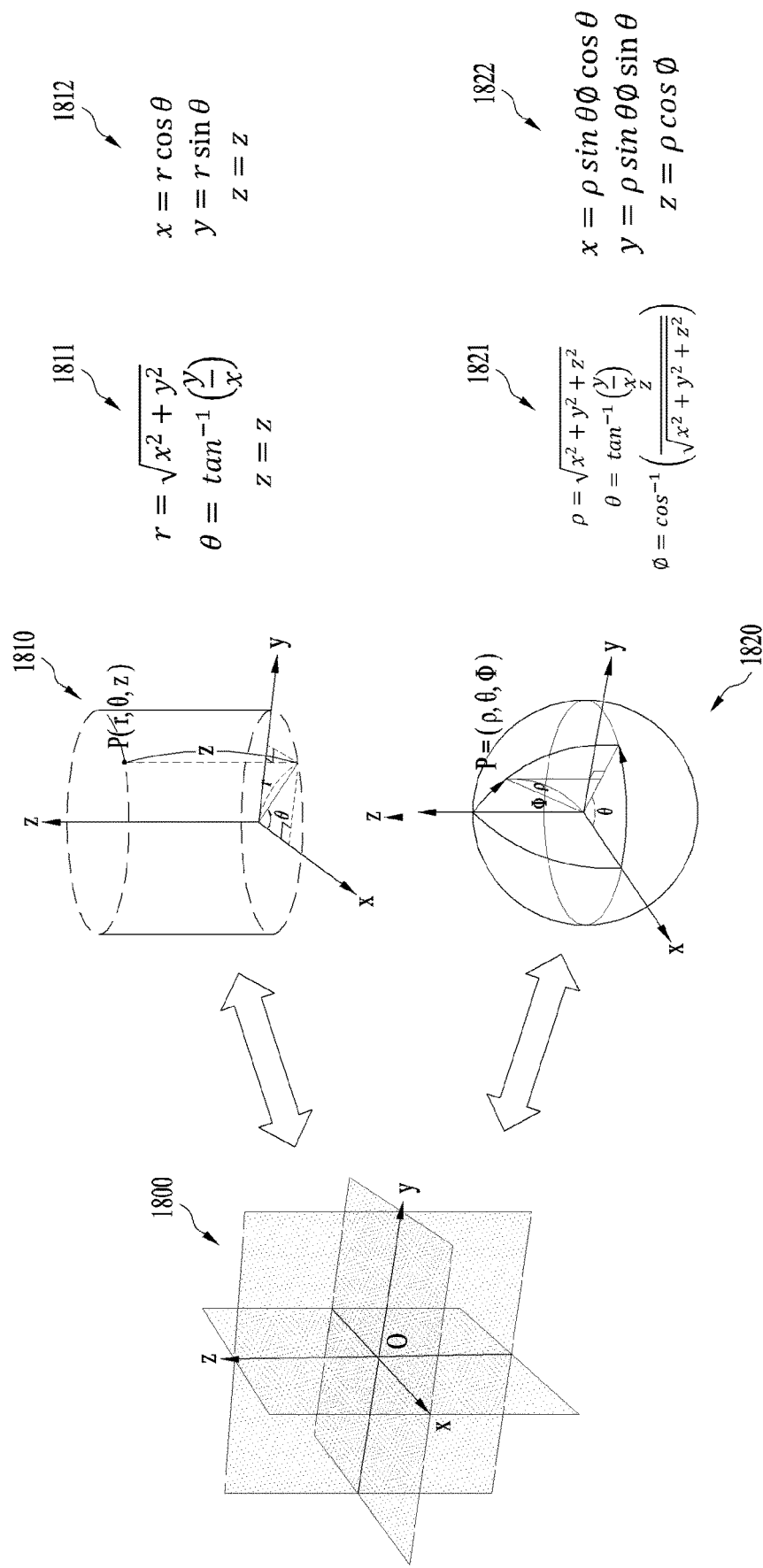
FIG. 18 illustrates an example of coordinate conversion.

FIG. 18 illustrates an example of coordinate conversion.

As described with reference to FIGS. 15 to 18, the point cloud transmission device performs coordinate conversion (e.g., the coordinate conversion 1641, the coordinate conversion 1730, etc.). Geometry is information indicating the position of a point in a point cloud. As described with reference to FIG. 4, the geometry information may be represented as values of 2-dimensional coordinates (e.g., parameters (x, y) of Cartesian coordinates composed of x-axis and y-axis, parameters (r, θ) of cylindrical coordinates) or 3-dimensional coordinates (e.g., parameters (x, y, z) of 3-dimensional orthogonal coordinates, parameters (r, θ, z) of cylindrical coordinates, parameters (ρ, θ, φ) of spherical coordinates, etc.). However, depending on the type and/or coordinates of the point cloud data, the positions of points indicated by the geometry may be expressed as having an irregular position or distribution. For example, the geometry of LiDAR data represented as Cartesian coordinates indicates that the distance between points increases as the distance from the origin increases. For example, for a geometry presented in a cylindrical coordinate system, a uniform distribution may be presented even for points far from the origin, but may not be presented for points close to the origin because the distance between the points increases. A larger amount of information, that is, geometry, is required to express the irregular positions and distribution of points, which may result in lowered efficiency of geometry coding. Therefore, the point cloud encoder according to the embodiments (e.g., the point cloud encoder described with reference to FIGS. 1, 4, 11, 14, and 15) may convert some and/or all of the coordinates of the geometry in order to increase the efficiency of geometry coding.

FIG. 18 shows a 3D orthogonal coordinate 1800, a cylindrical coordinate system 1810, and a spherical coordinate system 1820 as an example of mutually convertible coordinate systems. Coordinate systems according to embodiments are not limited to this example.

The 3D orthogonal coordinate system 1800 may be converted to the cylindrical coordinate system 1810, and vice versa.

The 3D orthogonal coordinate system 1800 may be composed of X-axis, Y-axis, and Z-axis orthogonal to each other at the origin. A point (or parameter) in the 3D orthogonal coordinate system may be expressed as (x, y, z). The X-Y plane formed by the X and Y axes, the Y-Z plane formed by the Y and Z axes, and the X-Z plane formed by the X and Z axes may perpendicularly intersect each other at the origin. The names of the X-axis, Y-axis, and Z-axis according to the embodiments are terms merely used to distinguish among the axes, and may be replaced with other names.

The cylindrical coordinate system 1810 may be composed of X-axis, Y-axis, and Z-axis orthogonal to each other at the origin. Any point (or parameter) P in the cylindrical coordinate system 1810 may be expressed as (r, θ, z). r denotes the distance from the origin to a point obtained by orthogonally projecting point P in the coordinate space onto the X-Y plane. θ denotes the angle between the positive direction of the X axis and a straight line connecting the origin to the point obtained by orthogonally projecting point P onto the X-Y plane. z denotes the distance between point P and the point obtained by projectiing point P onto the X-Y plane. The names of the X-axis, Y-axis, and Z-axis according to the embodiments are terms merely used to distinguish among the axes, and may be replaced with other names.

Equation 1811 shown in the figure represents an equation used to express geometry information represented by orthogonal coordinate as cylindrical coordinates in converting the orthogonal coordinate system into the cylindrical coordinate system according to the orthogonal-to-cylindrical coordinate conversion. That is, Equation 1811 shows that the parameters of the cylindrical coordinate system may be expressed with one or more parameters of the orthogonal coordinate system according to the coordinate conversion (e.g., $r=\sqrt{x^2+y^2}$).

Equation 1812 shown in the figure represents an equation used to express geometry information represented by cylindrical coordinates as orthogonal coordinates in converting the cylindrical coordinates into orthogonal coordinates according to the cylindrical-to-orthogonal coordinate conversion. That is, Equation 1812 shows that the parameters of the orthogonal coordinate system may be expressed with one or more parameters of the cylindrical coordinate system according to the coordinate conversion (e.g., x=r cos θ).

The 3D orthogonal coordinate system 1800 may be converted into the spherical coordinate system 1820, and vice versa.

The spherical coordinate system 1820 may be composed of X-axis, Y-axis, and Z-axis orthogonal to each other at the origin. Any point (or parameter) P in the spherical coordinate system 1820 may be expressed as (ρ, Ø, θ). ρ denotes the distance from the origin O to point P and has a value greater than or equal to 0. Ø denotes the angle between the positive direction of the Z axis and P, and has a value in a specific range (e.g., a value greater than or equal to 0 and less than or equal to π). θ denotes the angle between a point obtained by orthogonally projecting point P onto the X-Y plane and the positive direction of the X-axis, and has a value within a specific range (e.g., a value greater than or equal to 0 or less than or equal to 2π). The names of the X-axis, Y-axis, and Z-axis according to the embodiments are terms merely used to distinguish among the axes, and may be replaced with other names.

Equation 1821 shown in the figure represents an equation used to express geometry information represented by orthogonal coordinates as spherical coordinates in converting the orthogonal coordinates into spherical coordinates according to the orthogonal-to-spherical coordinate conversion. That is, Equation 1821 shows that the parameters of the spherical coordinate system may be expressed with one or more parameters of the orthogonal coordinate system according to the coordinate conversion (e.g., $\rho=\sqrt{x^2+y^2+z^2}$).

Equation 1822 shown in the figure represents an equation used to express geometry information represented by spherical coordinates as orthogonal coordinates in converting the spherical coordinates into orthogonal coordinates according to the spherical-to-orthogonal coordinate conversion. That is, Equation 1822 shows that the parameters of the orthogonal coordinate system may be expressed with one or more parameters of the spherical coordinate system according to the coordinate conversion.

Figure 19:
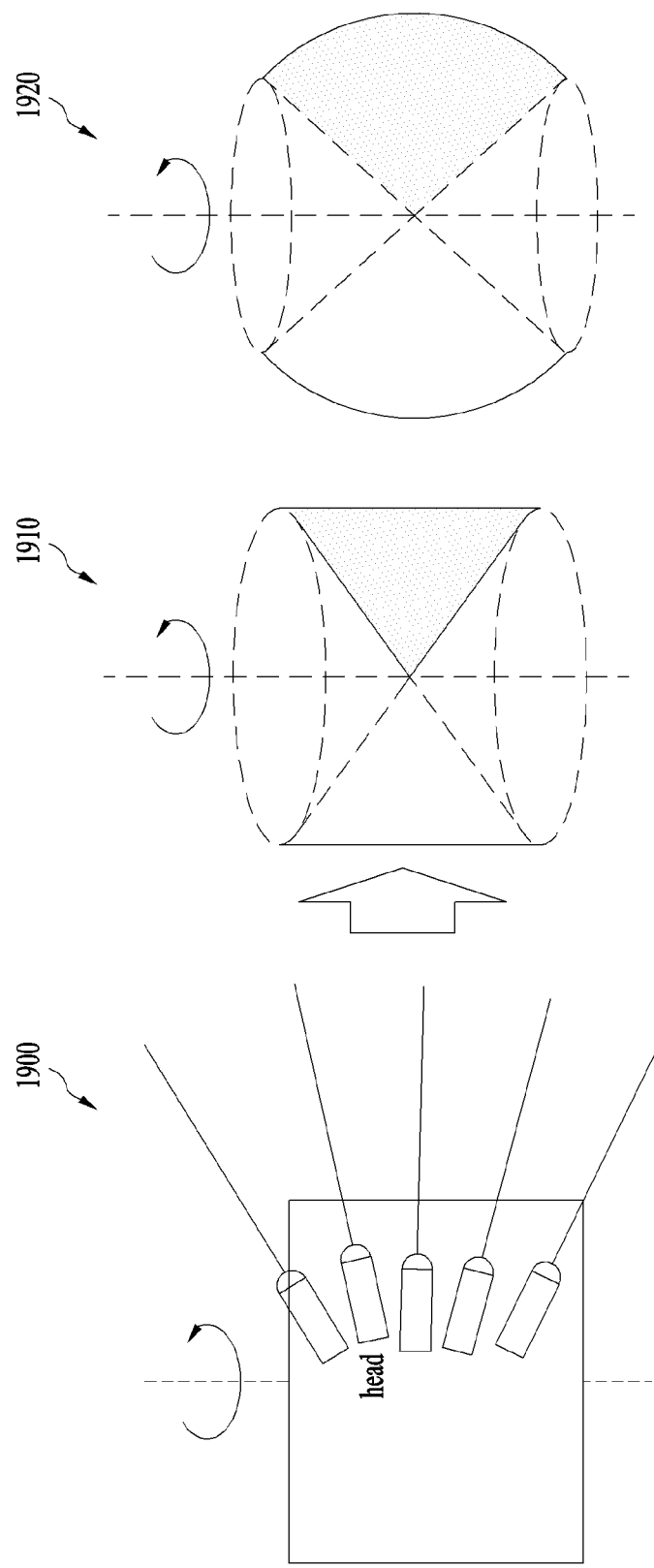
FIG. 19 illustrates an example of a coordinate system.

FIG. 19 illustrates an example of a coordinate system.

FIG. 19 illustrates an example of a coordinate system considering the arrangement of laser modules of LiDAR data. The left part of FIG. 19 shows a LiDAR (Light Detection And Ranging or Light Imaging, Detection, And Ranging) head 1900 that collects LiDAR data. LiDAR data is secured through the LiDAR method, by which the distance is measured by radiating a laser to a target. The LiDAR head 1900 includes one or more laser modules (or laser sensors) disposed at regular angular intervals in the vertical direction and rotates about the vertical axis. Times (and/or wavelengths) taken for the laser light output from the respective laser modules to be reflected from an object and return may be the same as or different from each other. Therefore, LiDAR data is a 3D representation constructed based on a difference in time and/or wavelength of laser lights returning from the object. In order to have a wider coverage, the laser modules are disposed to output the laser radially. Therefore, the coordinate system according to the embodiments includes a sectoral cylindrical coordinate system 1910 formed by rotating a sectoral plane corresponding to the shape of lasers output from the laser modules 360 degrees around the axis of the cylindrical coordinate system, and a sectoral spherical coordinate system 1920 formed by rotating a fan shape corresponding to a portion of a combination of the cylindrical coordinate system and the spherical coordinate system 360 degree around the axis of the spherical coordinate system. When the vertical direction of the cylindrical coordinate system is expressed as an elevation, the sectoral cylindrical coordinate system 1910 has a specific range. Also, when the vertical direction of the spherical coordinate system is expressed as an elevation, the sectoral spherical coordinate system 1920 has a specific range.

Figure 20:
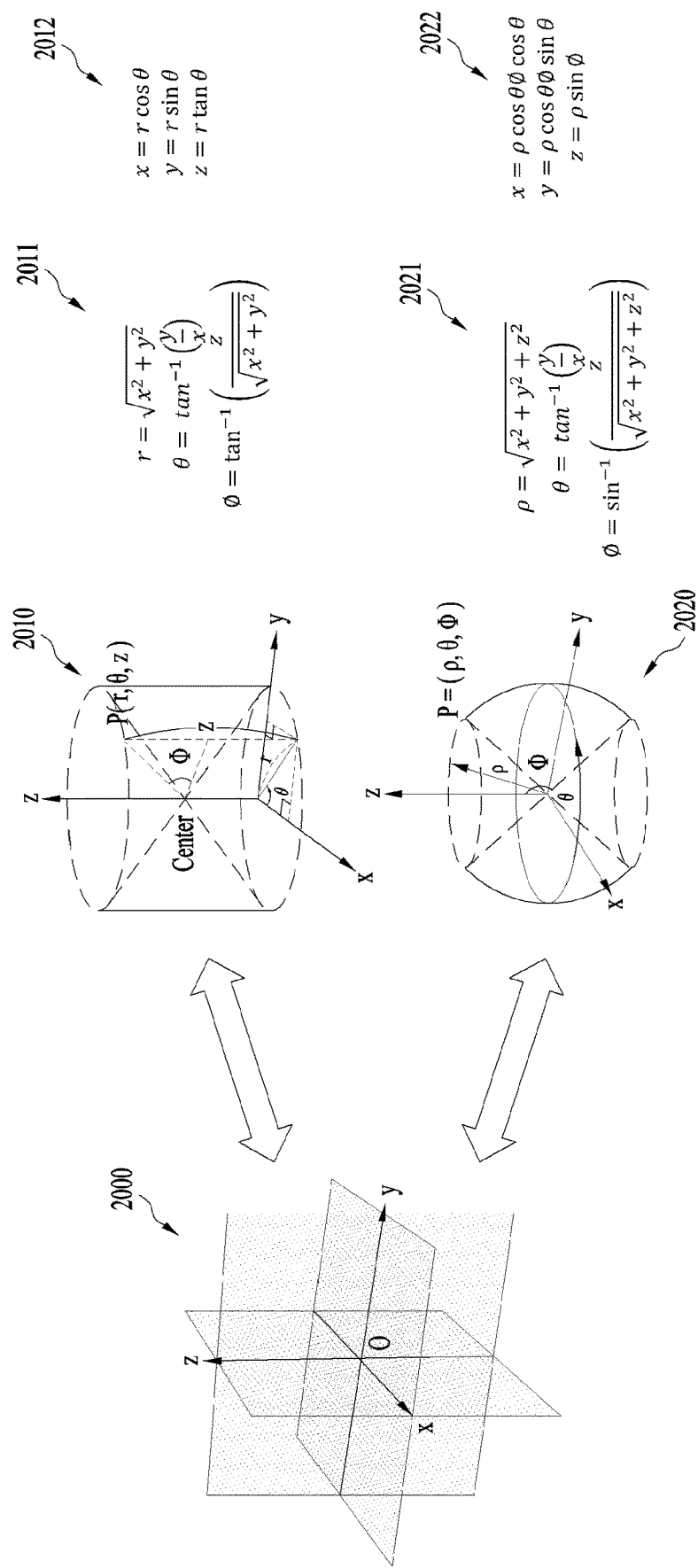
FIG. 20 illustrates an example of coordinate conversion.

FIG. 20 illustrates an example of coordinate conversion.

As described with reference to FIGS. 15 to 18, the point cloud transmission device performs coordinate conversion (e.g., the coordinate conversion 1641, the coordinate conversion 1730, etc.). FIG. 20 illustrates coordinate conversion of converting an orthogonal coordinate system 2000 (e.g., the orthogonal coordinate system 1800 described with reference to FIG. 18) into a sectoral cylindrical coordinate system 2010 (e.g., the sectoral cylindrical coordinate system 1910 described with reference to FIG. 19) and a sectoral spherical coordinate system 2020 (e.g., the sectoral spherical coordinate system 1920 described with reference to FIG. 19) based on the characteristics of the laser modules, and vice versa. Convertible coordinate systems according to embodiments are not limited to the above-described examples.

The orthogonal coordinate system 2000 may be converted into the sectoral cylindrical coordinate system 2010, and vice versa.

The orthogonal coordinate system 2000 is the same as the 3D orthogonal coordinate system 1800 described with reference to FIG. 18, and thus a detailed description thereof is omitted.

The sectoral cylindrical coordinate system 2010 may be composed of X-axis, Y-axis, and Z-axis orthogonal to each other at the origin. Any point (or parameter) P in the sectoral cylindrical coordinate system 2010 may be expressed as (r, θ, φ). r denotes the distance from the origin to a point obtained by orthogonally projecting point P in the coordinate space onto the X-Y plane. θ denotes the angle between the positive direction of the X axis and a straight line connecting the origin to the point obtained by orthogonally projecting point P onto the X-Y plane. φ denotes the angle between a straight line that passes through the center of the planar sector described with reference to FIG. 19 and is perpendicular to the straight line connecting point P and the point obtained by orthogonally projecting point P onto the X-Y plane, and the straight line connecting the center and point P (shown as a dotted line). The names of the X-axis, Y-axis, and Z-axis according to the embodiments are terms merely used to distinguish among the axes, and may be replaced with other names.

Equation 2011 shown in the figure represents an equation used to express geometry information represented by orthogonal coordinates as cylindrical coordinates in converting the orthogonal coordinate system 2000 into the sectoral cylindrical coordinate system according to the orthogonal-to-sectoral cylindrical coordinate conversion. That is, Equation 2011 shows that the parameters of the sectoral cylindrical coordinate system may be expressed with one or more parameters of the orthogonal coordinate system according to the coordinate conversion (e.g., $r=\sqrt{x^2+y^2}$).

Equation 2012 shown in the figure represents an equation used to express geometry information represented by sectoral cylindrical coordinates as orthogonal coordinates in converting the sectoral cylindrical coordinates into orthogonal coordinates according to the sectoral cylindrical-to-orthogonal coordinate conversion. That is, Equation 2012 shows that the parameters of the orthogonal coordinate system may be expressed with one or more parameters of the sectoral cylindrical coordinate system according to the coordinate conversion (e.g., x=r cos θ).

The sectoral spherical coordinate system 2020 may be composed of X-axis, Y-axis, and Z-axis orthogonal to each other at the origin. Any point (or parameter) P in the sectoral spherical coordinate system 2020 may be expressed as (ρ, θ, φ). ρ denotes the distance from the origin O to point P and has a value greater than or equal to 0. θ denotes the angle between a point obtained by projecting point P onto the X-Y plane along the curved surface and the positive direction of the X-axis, and has a value within a specific range (0≤θ2π). φ denotes the angle between the line connecting point P and the point obtained by orthogonally projecting point P onto the X-Y plane along the curved surface and the straight line connecting the origin and point P (shown as a dotted line). The names of the X-axis, Y-axis, and Z-axis according to the embodiments are terms merely used to distinguish among the axes, and may be replaced with other names.

Equation 2021 shown in the figure represents an equation used to express geometry information represented by orthogonal coordinates as sectoral spherical coordinates in converting the orthogonal coordinates into sectoral spherical coordinates according to the orthogonal-to-sectoral spherical coordinate conversion. That is, Equation 1821 shows that the parameters of the sectoral spherical coordinate system may be expressed with one or more parameters of the orthogonal coordinate system according to the coordinate conversion (e.g., $\rho=\sqrt{x^2+y^2+z^2}$).

Equation 2022 shown in the figure represents an equation used to express geometry information represented by sectoral spherical coordinates as orthogonal coordinates in converting the sectoral spherical coordinates into orthogonal coordinates according to the sectoral spherical-to-orthogonal coordinate conversion. That is, Equation 2022 shows that the parameters of the orthogonal coordinate system may be expressed with one or more parameters of the sectoral spherical coordinate system according to the coordinate conversion (e.g., z=ρ sin φ).

The point cloud data transmission device according to the embodiments (e.g., the point cloud data transmission device described with reference to FIGS. 1, 11, 14, and 15) may generate signaling information related to coordinate conversion transmit the same to a point cloud data reception device (e.g., the point cloud data transmission device described with reference to FIGS. 1, 13, 14, and 16). The signaling information related to the coordinate conversion may be signaled at a sequence level, a frame level, a tile level, a slice level, or the like. The point cloud decoder according to the embodiments (e.g., the point cloud decoder described with reference to FIGS. 1, 13, 14, and 16) may perform a decoding operation, which is the reverse process of the encoding operation of the point cloud encoder, based on the signaling information related to the coordinate conversion. Alternatively, the point cloud decoder may not receive the signaling information related to the coordinate conversion. Instead, it may perform the coordinate conversion by deriving the signaling information based on the status of coordinate conversion of a neighbor block, the size of the block, the number of points, a quantization value, and the like.

Figure 21:
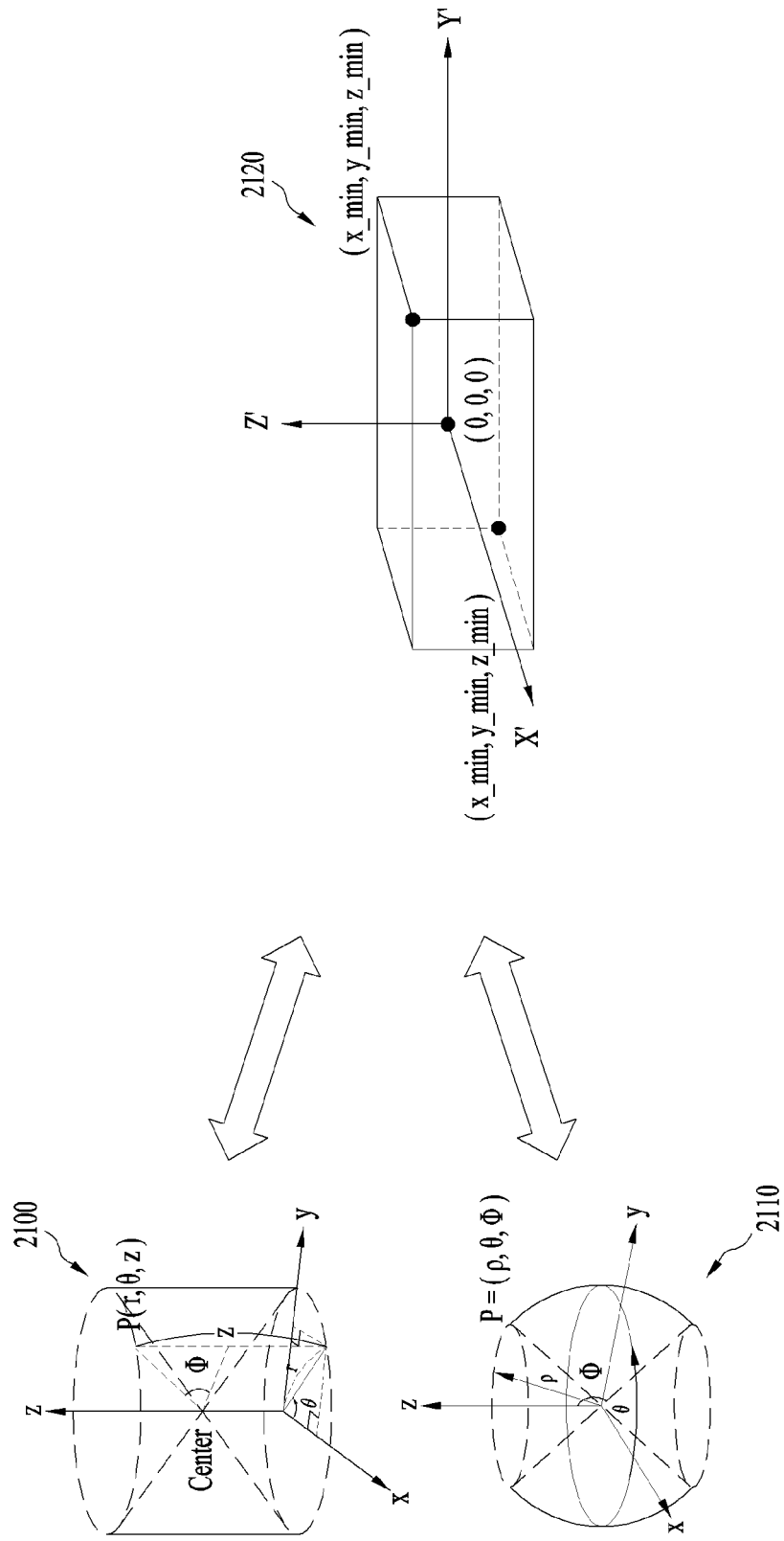
FIG. 21 illustrates an example of coordinate projection.

FIG. 21 illustrates an example of coordinate projection.

The point cloud transmission device performs coordinate projection for projecting, in a compressible form, the geometry presented in the coordinate system into which the original coordinates are converted according to the coordinate conversion described with reference to FIGS. 15 to 20. FIG. 21 illustrates an example of the coordinate projection (e.g., the coordinate projection 1641) described with reference to FIGS. 15 to 17. FIG. 21 illustrates a process of converting (projecting) a sectoral cylindrical coordinate system 2100 (e.g., the sectoral cylindrical coordinate system 1910 described with reference to FIG. 19, the sectoral cylindrical coordinate system 2010 described with reference to FIG. 20) and a sectoral spherical coordinate system 2110 (e.g., the sectoral spherical coordinate system 1920 and the sectoral spherical coordinate system 2020 described with reference to FIG.) into a cuboid space 2120, and vice versa. The cuboid space 2120 may be presented in a 3D coordinate system composed of an x-axis, a y-axis, and a z-axis (or an x'-axis, a y'-axis, and a z'-axis), and may be referred as a bounding box. In addition, each of the x'-axis, y'-axis, and z'-axis has a maximum value (x_max, y_max, z_max) and a minimum value (xmin, y_min, z_min). In the conversion process shown in FIG. 21, the parameters (r, θ, ϕ) representing a point P in the sectoral cylindrical coordinate system 2100 and the parameters (ρ, θ, ϕ) representing a point P in the sectoral spherical coordinate system 2110 are expressed as parameters of the x'-axis, y'-axis, and z'-axis, respectively. Each parameter of the parameters (r, θ, ϕ) and parameters (ρ, θ, ϕ) corresponds to one of the x'-axis, y'-axis, and z'-axis (e.g., r corresponds to the X'-axis) or may be converted and correspond thereto according to a separate conversion equation. For example, the parameter ϕ of the sectoral cylindrical coordinate system 2100 having a limited range is mapped to the z'-axis by applying a tangent function. Therefore, values mapped to the z'-axis are grouped according to the limited range, and accordingly compression efficiency may be increased.

Equations representing the projection of parameters (r, θ, ϕ) of the sectoral cylindrical coordinate system 2110 are given below.

$$f_x(r) = r = \sqrt{(x-x_c)^2 + (y-y_c)^2}, \quad \text{[Equation 1]}$$

$$f_y(\theta) = \theta = \tan^{-1}\left(\frac{y-y_c}{x-x_c}\right), \text{ and}$$

$$f_z(\phi) = \phi = \tan^{-1}\left(\frac{z-z_c}{\sqrt{(x-x_c)^2 + (y-y_c)^2}}\right).$$

That is, $f_x(r)$ represents projection of parameter r onto the x-axis, $f_y(B)$ represents projection of parameter θ onto the y-axis, and $f_z(\phi)$ represents projection of parameter ϕ onto the z-axis. Equations representing the projection obtained by minimizing the calculation of the trigonometric function in the above equation are given below.

$$f_x(r) = r^2 = (x-x_c)^2 + (y-y_c)^2, \quad \text{[Equation 2]}$$

$$f_y(\theta) = \cos^2\frac{\theta}{2} = \frac{1+\cos\theta}{2} = \left[1 + \frac{x-x_c}{\sqrt{(x-x_c)^2 + (y-y_c)^2}}\right]/2 = \frac{r+x-x_c}{2r},$$

and $$f_z(\phi) = \tan\phi = \frac{z-z_c}{\sqrt{(x-x_c)^2 + (y-y_c)^2}} = \frac{z-z_c}{r}.$$

Equations representing the projection of the parameters (ρ, θ, ϕ) of the sectoral spherical coordinate system 2110 are given below.

$$f_x(\rho) = \rho = \sqrt{(x-x_c)^2 + (y-y_c)^2 + (z-z_c)^2}, \quad \text{[Equation 3]}$$

$$f_y(\theta) = \theta = \tan^{-1}\left(\frac{y-y_c}{x-x_c}\right), \text{ and}$$

$$f_z(\phi) = \phi = \sin^{-1}\left(\frac{z-z_c}{\sqrt{(x-x_c)^2 + (y-y_c)^2 + (z-z_c)^2}}\right)$$

That is, $f_x(\rho)$ represents projection of parameter ρ onto the x-axis, $f_y(\theta)$ represents projection of parameter θ onto the y-axis, and $f_z(\phi)$ represents projection of parameter ϕ onto the z-axis. Equations representing the projection obtained by minimizing the calculation of the trigonometric function in the above equation are given below.

$$f_x(\rho) = \rho^2 = (x-x_c)^2 + (y-y_c)^2 + (z-z_c)^2, \quad \text{[Equation 4]}$$

$$f_y(\theta) = \cos^2\frac{\theta}{2} = \frac{1+\cos\theta}{2} = \left[1 + \frac{x-x_c}{\sqrt{(x-x_c)^2 + (y-y_c)^2}}\right]/2 = \frac{r+x-x_c}{2r},$$

and $$f_z(\phi) = \sin\phi = \frac{z-z_c}{\sqrt{(x-x_c)^2 + (y-y_c)^2 + (z-z_c)^2}} = \frac{z-z_c}{\rho}.$$

In the above equations, $(x_c, y_c, z_c)$ is the center position of the sectoral cylindrical coordinate system 2100 before projection, and the center is the same as the center of the planar sector described with reference to FIG. 19. Also, $(x_c, y_c, z_c)$ may represent a LiDAR head position (e.g., the origin of xyz coordinates of the world coordinate system).

FIG. 22 illustrates an example of laser position adjustment.

FIG. 22 illustrates an example of the laser position adjustment 1642 described with reference to FIG. 16 and the laser position adjustment 1732 described with reference to FIG. 17. As described with reference to FIG. 19, a LiDAR head (e.g., the LiDAR head 1900 described with reference to FIG. 19) includes one or more laser modules arranged in a vertical direction. The one or more laser modules are arranged to emit lasers radially in order to secure a large amount of data with wider coverage. The actual laser is output from the ends of the laser modules. Therefore, the position of the laser is different from the LiDAR head position corresponding to the center of the planar sector described with reference to FIGS. 19 and 20. In addition, there is a difference in position between the uppermost laser output from the laser module disposed at the top of the LiDAR head and the lowest laser output from the laser module disposed at the bottom of the LiDAR head. If the difference in position between these lasers is not reflected, the accuracy of the projection may be lowered. Accordingly, the point cloud transmission device according to the embodiments performs projection by reflecting laser position adjustment such that the starting point of each laser is at the LiDAR head position.

The upper part of FIG. 22 shows a structure 2200 of a LiDAR head including a laser module that outputs a laser. As shown in the figure, the position of the laser output from the laser module is expressed as a relative position away from the LiDAR head position by $r_L$ in the horizontal direction and by $z_L$ in the vertical direction.

The lower part of FIG. 22 shows an example 2210 of the relative position of the laser presented in a 3D coordinate system. The 3D coordinate system shown in the figure is a coordinate system for presenting the projection described with reference to FIG. 21 (e.g., the cuboid space 2120), and is composed of an x'-axis, a y'-axis, and a z'-axis. The head position described above is set the origin (0, 0, 0) of the coordinate system, and the relative position of the laser is expressed as $(x_L, y_L, z_L)$. The parameters $x_L$ and $y_L$ are expressed based on $r_L$, which is a relative distance from the head position in the horizontal direction, as follows:

$x_L = r_L \cdot \cos\theta$ and $y_L = r_L \cdot \sin\theta$.

According to embodiments, $(x_L, y_L, z_L)$ may be directly calculated by the point cloud transmission device and reception device, or may be transmitted to the point cloud transmission device and reception device through signaling.

Values applied to the laser position of the parameters $(\rho, \theta, \phi)$ of the sectoral cylindrical coordinate system (e.g., the sectoral cylindrical coordinate system 2110) are obtained as follows.

$$r_L = \sqrt{(x - x_c - x_L)^2 + (y - y_c - y_L)^2} = \sqrt{(x - x_c)^2 + (y - y_c)^2} - r_L;$$  [Equation 5]

$$\theta_L = \tan^{-1}\left(\frac{y - y_c - y_L}{x - x_c - x_L}\right);$$

$$\phi_L = \tan^{-1}\left(\frac{z - z_c - z_L}{\sqrt{(x - x_c - x_L)^2 + (y - y_c - y_L)^2}}\right).$$

Values applied to the laser position of the parameters $(\rho, \theta, \phi)$ of the sectoral spherical coordinate system (e.g., the sectoral spherical coordinate system 2110) are obtained as follows.

$$\rho_L = \sqrt{(x - x_c - x_L)^2 + (y - y_c - y_L)^2 + (z - z_c - z_L)^2};$$  [Equation 6]

$$\theta_L = \tan^{-1}\left(\frac{y - y_c - y_L}{x - x_c - x_L}\right);$$

$$\phi_L = \sin^{-1}\left(\frac{z - z_c - z_L}{\sqrt{(x - x_c - x_L)^2 + (y - y_c - y_L)^2 + (z - z_c - z_L)^2}}\right).$$

As described above, the point cloud transmission device may perform attribute coding by re-sorting points based on the Morton code. The Morton code assumes that the position information related to each point is a positive integer. Therefore, the point cloud transmission device performs voxelization (e.g., the voxelization described with reference to FIGS. 4 to 6) such that the parameters representing the position of the projected point cloud data (e.g., parameters $(x_L, y_L, z_L)$ of the coordinate system representing the cuboid space 2120 described with reference to FIGS. 21 and 22) become positive integers. When the distance between points is sufficiently long, lossless compression may be implemented even in the voxelization. However, when the distance between points is short, loss may occur in the voxelization.

Accordingly, the point cloud transmission device performs additional correction by adjusting the sampling rate (e.g., the sampling rate adjustment 1643 described with reference to FIG. 16) for the projected point cloud data (e.g., geometry).

The sampling rate adjustment is performed by defining a scale factor for each axis of the projection in consideration of a range of projection values and characteristics of the data acquisition device (e.g., LiDAR). As described with reference to FIGS. 19 to 22, parameter r of the sectoral cylindrical coordinate system (e.g., the sectoral cylindrical coordinate system 1910, the sectoral cylindrical coordinate system 2010, the sectoral cylindrical coordinate system 2100, etc.) and parameter $\rho$ of the sectoral spherical coordinate system (e.g., the sectoral spherical coordinate system 1920, the sectoral spherical coordinate system 2020, and the sectoral spherical coordinate system 2110) indicates the distance from the center of each coordinate system to the target point (e.g., point P described with reference to FIGS. 19 to 21). Therefore, parameters r and $\rho$ have a value greater than or equal to 0, and the frequency of data is determined according to the interpretation capability of the acquisition device and the resolution according to the distance of the laser. Parameter $\theta$ of the sectoral cylindrical coordinate system and the sectoral spherical coordinate system indicates an azimuthal angle by which rotation is performed about the vertical axis. Therefore, parameter $\theta$ may have a range of 0 to 360 degrees, which determines the frequency of data acquired per degree while the LiDAR head (e.g., the LiDAR head described with reference to FIGS. 20 to 22) is rotated. Parameter $\varphi$ of the sectoral spherical coordinate system indicates the elevation angle. The elevation angle is highly correlated with the angle of a single laser, and accordingly parameter $\varphi$ may range from $-\pi/2$ to $\pi/2$, and the frequency of data may be determined depending on the number of lasers, the vertical positions of the lasers, the accuracy of the lasers, and the like. Accordingly, in the sampling rate adjustment according to the embodiments, a scale factor for the projection parameters are defined based on the characteristics of each parameter as described above. Hereinafter, for simplicity, the scale factor for the projection (parameters r, $\theta$, and $\varphi$) of a sectoral cylindrical coordinate system is described, but sampling rate adjustment is not limited to the example. Therefore, the sampling rate adjustment applied to the projection (parameters $\rho$, $\theta$, and $\varphi$) of the sectoral spherical coordinate system may be equally applied to other projections as well.

Sampling rate adjustment for projection of a sectoral cylindrical coordinate system according to embodiments is expressed as follows.

$f_s(r_L) = s_r \cdot f(r_L), f_s(\theta_s) = s_\theta \cdot f(\theta_L), f_s(\phi_s) = s_\phi \cdot f(\phi_L)$ Here, $r_L$, $\theta_L$, and $\phi_L$ are parameters indicating a point on which the laser position adjustment is performed, and $f(r_L)$, $f(\theta_L)$, and $f(\phi_L)$ represent respective axes of the 3D coordinate system onto which the corresponding parameters are projected. $s_r$ is a scale factor for parameter $r_L$ and is applied to the axis (e.g., X'-axis) represented by $f(r_L)$, and so is a scale factor for $\theta_L$ and is applied to the axis (e.g., Y'-axis) represented by $f(\theta_L)$. so is a scale factor for $\phi_L$ and is applied to the axis (e.g., Z'-axis) represented by $f(\phi_L)$.

Sampling rate adjustment for projection of a sectoral cylindrical coordinate system according to embodiments may be expressed as follows.

$x' = s_r \cdot r_L, y' = s_\theta \cdot \theta_L, z' = s_\phi \cdot \tan\phi_L$.

The scale factor parameters $s_r$, so, and so may be derived from the maximum length of bounding box edges normalized to a length of a bounding box edge of each axis.

The scale factors may be defined based on mechanical characteristics of the point cloud data acquisition device. For example, when the acquisition device (e.g., the LiDAR head) provided with N vertically arranged lasers rotates in a horizontal direction, reflected laser light is detected M times per degree, and the radius of the spot created by each laser light source is D, the scale factors are defined as follows.

$s_r = k_r, s_\theta = k_\theta M$, and $s_\phi = k_\phi D$.

Here, $k_r$, $k_\theta$, and $k_\phi$ are constants.

When the minimum distance between data acquired per one laser light source is expressed in terms of the vertical direction, the horizontal direction, and the radial direction, the scale factors are expressed as follows.

$$s_r = \frac{k_r}{\min(d_r)}, s_\theta = \frac{k_\theta}{\min(d_\theta)}, \text{ and } s_\phi = \frac{k_\phi}{\min(d_\phi)}.$$

Here, $d_r$, $d_\theta$, and $d_o$ denote distances for the radial direction, the rotational angle, and the vertical angle, respectively. min( ) may denote the minimum value within the point cloud data or the minimum value according to physical characteristics.

According to the embodiments, the scale factors may be defined as a function of the density of each axis and are expressed as follows.

$s_r = k_r N_r/D_r, s_\theta = k_\theta N_\theta/D_\theta$, and $s_\phi = k_\phi N_\phi/D_\phi$.

That is, a relatively large scale factor is applied to an axis on which the density per length is high, and a relatively small scale factor is applied to an axis on which the density per length is low. Here, N denotes the maximum number of points in a direction parallel to each axis, and D denotes the length of each axis. The value obtained by dividing N by D corresponds to the density of the corresponding axis.

According to the embodiments, the scale factors may be defined according to the importance of information. For example, information close to the origin may be considered as information of relatively high importance, and information far from the origin may be considered as information of relatively low importance. Therefore, the scale factors may be defined to assign a relatively large weight to information close to the origin, front information with respect to the horizontal/vertical angles, or information close to the horizon, and are expressed as follows.

$s_r = k_r/g(r), s_r = k_r/g(r), s_\theta = k_\theta/g(\theta)$, and $s_\phi = k_\phi/g(\phi)$.

Here, $g(r)$, $g(\theta)$, and $g(\phi)$ denotes weights for the respective axes, and may be expressed as a reciprocal of a step function or an exponential function representing values set according to a range representing an important region.

The point cloud transmission device according to the embodiments may shift each axis to start from the origin such that projected point cloud data (e.g., geometry) has a positive value, or may correct the length of each axis to be a power of 2. The projected point cloud data according to the correction is expressed as follows.

$$f_s(r_L) = \frac{2^{nr} - 1}{\max_r}[s_r \cdot f(r_L) - \min_r],$$

$$f_s(\theta_s) = \frac{2^{n\theta} - 1}{\max_\theta}[s_\theta \cdot f(\theta_L) - \min_\theta], \text{ and,}$$

$$f_s(\phi_s) = \frac{2^{n\phi} - 1}{\max_\phi}[s_\phi \cdot f(\phi_L) - \min_\phi].$$

If the lengths of the three axes are corrected to be equal to each other to increase compression efficiency, the projected point cloud data according to the correction is expressed as follows.

$$f_s'(r_L) = \frac{\max}{\max_r}f_s(r_L), f_s'(\theta_L) = \frac{\max}{\max_\theta}f_s(\theta_L), \text{ and}$$

$$f_s'(\phi_L) = \frac{\max}{\max_\phi}f_s(\phi_L).$$

Here, max may denote max ($\max_r$, $\max_\theta$, $\max_\phi$). Alternatively, it may be a value corresponding to the nearest 2-1 among the numbers greater than max ($\max_r$, $\max_\theta$, $\max_\phi$).

Information about the sampling rate adjustment (including information about the scale factors) according to the embodiments may be transmitted to a point cloud reception device (e.g., the reception device 10004 of FIG. 1, the point cloud decoder of FIG. 10 and, or the reception device of FIG. 13), and the point cloud reception device obtains the information about the sampling rate adjustment and performs the sampling rate adjustment according to the information.

The table below shows the summary of the Bjønegaard Delta (BD) rate and BD PSNR of the coordinate conversion on Pred-Lift coding scheme. The overall average of the attribute gains, i.e., reflectance gains are 5.4%, 4.0%, 1.4%, and 2.7% for C1, C2, CW, and CY conditions.

| | lossless geometry, lossy attribute [all intra] | | | |
|---|---|---|---|---|
| | End to End BD-AttrRate [%] | | | |
| C1_ai | Luma | Chroma Cb | Chroma Cr | Reflectance |
| Cat1-A-average | #DIV/0! | #DIV/0! | #DIV/0! | |
| Cat1-B-average | #DIV/0! | #DIV/0! | #DIV/0! | |
| Cat3-fused average | #DIV/0! | #DIV/0! | #DIV/0! | #DIV/0! |
| Cat3-frame average | | | | −54% |
| Overall average | #DIV/0! | #DIV/0! | #DIV/0! | −54% |
| Avg. Enc. Time[%] | 97% | | | |
| Avg. Dec. Time[%] | 94% | | | |

| | lossy geometry, lossy attribute [all intra] | | | | | |
|---|---|---|---|---|---|---|
| | End to End BD-AttrRate [%] | | | | Geom.BD-tot GeomRat | |
| | | Chroma | Chroma | | | |
| C2_ai | Luma | Cb | Cr | Reflectance | D1 | D2 |
| Cat1-A-average | #DIV/0! | #DIV/0! | #DIV/0! | | #DIV/0! | #DIV/0! |
| Cat1-B-average | #DIV/0! | #DIV/0! | #DIV/0! | | #DIV/0! | #DIV/0! |
| Cat3-fused average | #DIV/0! | #DIV/0! | #DIV/0! | #DIV/0! | #DIV/0! | #DIV/0! |
| Cat3-frame average | | | | −4.0% | 0.0% | 0.0% |

-continued

| lossy geometry, lossy attribute [all intra] | | | | | | |
|---|---|---|---|---|---|---|
| End to End BD-AttrRate [%] | | | | | | |
| | | Chroma | Chroma | | Geom.BD-tot | GeomRat |
| C2_ai | Luma | Cb | Cr | Reflectance | D1 | D2 |
| Overall average | #DIV/0! | #DIV/0! | #DIV/0! | −4.0% | 0.0% | 0.0% |
| Avg. Enc. Time [%] | | | | 99% | | |
| Avg. Dec. Time [%] | | | | 94% | | |

| lossless geometry, lossless attribute [all intra] bpip ratio [%] | | | | |
|---|---|---|---|---|
| CW_ai | Geometry | Colour | Reflectance | Total |
| Cat1-A-average | #DIV/0! | #DIV/0! | #DIV/0! | |
| Cat1-B-average | #DIV/0! | #DIV/0! | #DIV/0! | |
| Cat3-fused average | #DIV/0! | #DIV/0! | #DIV/0! | #DIV/0! |
| Cat3-frame average | 100.0% | | 98.6% | 99.7% |
| Overall average | 100.0% | #DIV/0! | 98.6% | 99.7% |
| Avg. Enc. Time[%] | 96% | | | |
| Avg. Dec. Time[%] | 96% | | | |

| lossless geometry, near-lossless attribute [all intra] EtE Hausdorff BD-AttrRate [%] | | | | |
|---|---|---|---|---|
| CY_ai | Luma | Chroma Cb | Chroma Cr | Reflectance |
| Cat1-A-average | #DIV/0! | #DIV/0! | | |
| Cat1-B-average | #DIV/0! | #DIV/0! | #DIV/0! | |
| Cat3-fused average | #DIV/0! | #DIV/0! | #DIV/0! | #DIV/0! |
| Cat3-frame average | | | | −2.7% |
| Overall average | #DIV/0! | #DIV/0! | #DIV/0! | −2.7% |
| Avg. Enc. Time[%] | 96% | | | |

| lossless geometry, near-lossless attribute [all intra] EtE Hausdorff BD-AttrRate [%] | | | | |
|---|---|---|---|---|
| CY_ai | Luma | Chroma Cb | Chroma Cr | Reflectance |
| Avg. Dec. Time[%] | 96% | | | |

The projection according to the embodiments is also applied to RAHT coding. The table below shows the summary of BD rates of the coordinate conversion in RA-IT coding. It may be seen that the average improvement rate for point cloud data (e.g., Cat3 frame data) is greatly improved with gains of 15.3% and 12.5% for the C1 and C3 conditions, respectively.

| lossless geometry, lossy attribute [all intra] End to End BD-AttrRate [%] | | | | |
|---|---|---|---|---|
| C1_ai | Luma | Chroma Cb | Chroma Cr | Reflectance |
| Cat1-A-average | #DIV/0! | #DIV/0! | #DIV/0! | |
| Cat1-B-average | #DIV/0! | #DIV/0! | #DIV/0! | |
| Cat3-fused average | #DIV/0! | #DIV/0! | #DIV/0! | #DIV/0! |
| Cat3-frame average | | | | −15.3% |
| Overall average | #DIV/0! | #DIV/0! | #DIV/0! | −15.3% |
| Avg. Enc. Time[%] | 98% | | | |
| Avg. Dec. Time[%] | 98% | | | |

| lossy geometry, lossy attribute [all intra] | | | | | | |
|---|---|---|---|---|---|---|
| End to End BD-AttrRate [%] | | | | | | |
| | | Chroma | Chroma | | Geom.BD-tot | GeomRat |
| C2_ai | Luma | Cb | Cr | Reflectance | D1 | D2 |
| Cat1-A-average | #DIV/0! | #DIV/0! | #DIV/0! | | #DIV/0! | #DIV/0! |
| Cat1-B-average | #DIV/0! | #DIV/0! | #DIV/0! | | #DIV/0! | #DIV/0! |
| Cat3-fused average | #DIV/0! | #DIV/0! | #DIV/0! | #DIV/0! | #DIV/0! | #DIV/0! |
| Cat3-frame average | | | | −12.5% | 0.0% | 0.0% |
| Overall average | #DIV/0! | #DIV/0! | #DIV/0! | −12.5% | 0.0% | 0.0% |
| Avg. Enc. Time [%] | 110% | | | | | |
| Avg. Dec. Time [%] | 133% | | | | | |

Figure 23:
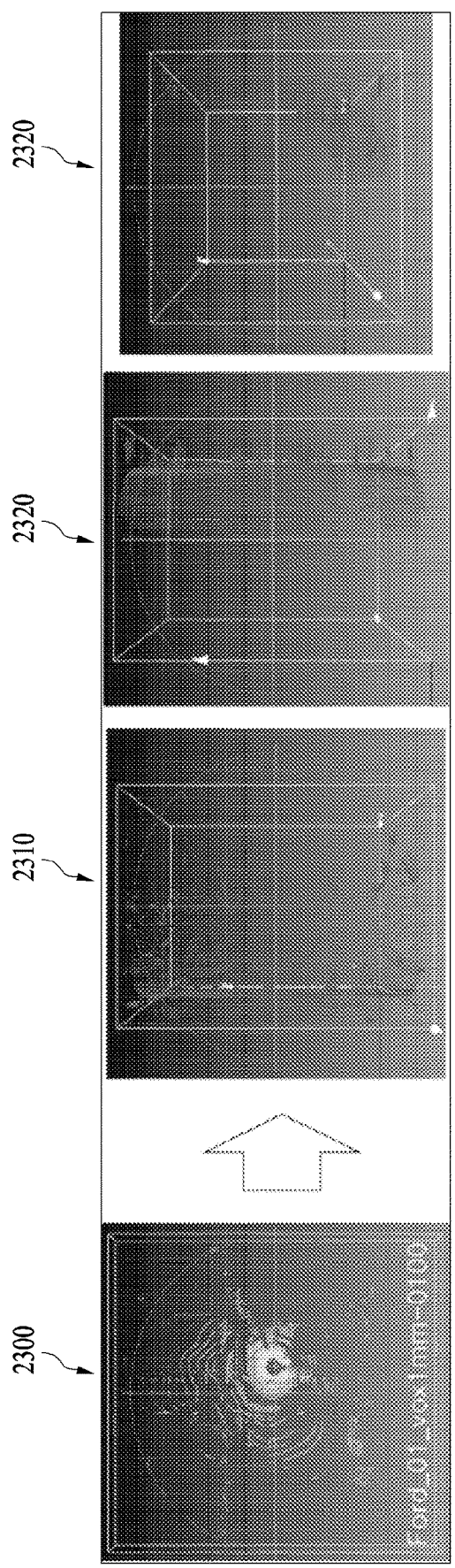
FIG. 23 illustrates an example of voxelization.

FIG. 23 illustrates an example of voxelization.

Through the processing described with reference to FIGS. 15 to 22, point cloud data (geometry) presented in a coordinate system composed of x, y, and z is converted into a compression-efficient domain such as distance and angle. The converted point cloud data is converted into integer position information through voxelization.

The left part of FIG. 23 shows an example 2300 of point cloud data as one frame of a point cloud data sequence to which projection is not applied. The right part of FIG. 23 shows an example of point cloud data projected based on a sectoral cylindrical coordinate system. Specifically, the first example 2310 shows point cloud data projected onto the r-θ plane. The second example 2320 shows point cloud data projected onto the φ-θ plane. The third example 2330 shows point cloud data projected onto the φ-r plane.

A point cloud processing device (e.g., the transmission device described with reference to FIGS. 1, 12, and 14) may transmit encoded point cloud data in the form of a bitstream. The bitstream is a sequence of bits that forms a representation of the point cloud data (or point cloud frame).

The point cloud data (or point cloud frame) may be divided into tiles and slices.

The point cloud data may be partitioned into multiple slices and encoded within the bitstream. A slice is a set of points, and is expressed as a series of syntax elements representing the entirety or a part of the encoded point cloud data. A slice may or may not have a dependency on other slices. A slice may include one geometry data unit, and may have one or more attribute data units or zero attribute data unit. As described above, the attribute encoding is performed based on the geometry encoding, and accordingly the attribute data units are based on the geometry data unit within the same slice. In other words, the point cloud data reception device (e.g., the reception device 10004 or the point cloud video decoder 10006) may process the attribute data based on the decoded geometry data. Therefore, in a slice, the geometry data unit precedes the associated attribute data units. Data units within a slice are necessarily consecutive, and the order of slices is not specified.

A tile is a (three-dimensional) rectangular cuboid within a bounding box (e.g., the bounding box described with reference to FIG. 5). The bounding box may contain one or more tiles. A tile may completely or partially overlap another tile. A tile may include one or more slices.

Accordingly, the point cloud data transmission device may provide high-quality point cloud content by processing data corresponding to tiles according to importance. That is, the point cloud data transmission device according to the embodiments may process data corresponding to a region important to the user though point cloud compression coding with better compression efficiency and appropriate latency.

A bitstream according to embodiments contains signaling information and a plurality of slices (slice 0, . . . , slice n). As shown in the figure, the signaling information precedes the slices in the bitstream. Accordingly, the point cloud data reception device may first obtain the signaling information and sequentially or selectively process the plurality of slices based on the signaling information. As shown in the figure, slice0 contains one geometry data unit (Geom0$^0$) and two attribute data units (Attr0$^0$ and Attr1$^0$). The geometry data unit precedes the attribute data units within the same slice. Accordingly, the point cloud data reception device first processes (decodes) the geometry data unit (or geometry data), and processes the attribute data units (or attribute data) based on the processed geometry data. The signaling information according to the embodiments may be referred to as signaling data, metadata, or the like, and is not limited to the examples.

According to embodiments, the signaling information includes a sequence parameter set (SPS), a geometry parameter set (GPS), and one or more attribute parameter sets (APSs). The SPS is encoding information about the entire sequence, such as a profile or a level, and may include comprehensive information (sequence level) about the entire sequence, such as a picture resolution and a video format. The GPS is information about geometry encoding applied to geometry included in the sequence (bitstream). The GPS may include information about an octree (e.g., the octree described with reference to FIG. 6) and information about an octree depth. The APS is information about attribute encoding applied to an attribute contained in the sequence (bitstream). As shown in the figure, the bitstream contains one or more APSs (e.g., APS0, APS1, . . . shown in the figure) according to an identifier for identifying the attribute.

According to embodiments, the signaling information may further include information about a tile (e.g., tile inventory). The information about the tile may include a tile identifier and information about a tile size. The signaling information is applied to a corresponding bitstream as information about a sequence, that is, a bitstream level. In addition, the signaling information has a syntax structure including a syntax element and a descriptor describing the same. A pseudo code may be used to describe the syntax. The point cloud reception device (e.g., the reception device 10004 of FIG. 1, the point cloud decoder of FIGS. 10 and 11, or the reception device of FIG. 13) may sequentially parse and process syntax elements configured in the syntax.

Although not shown in the figure, the geometry data unit includes a geometry header and the attribute data unit includes an attribute header. The geometry header and the attribute header are signaling information applied at a corresponding slice level and have the above-described syntax structure.

The geometry header contains information (or signaling information) for processing a corresponding geometry data unit. Therefore, the geometry header is at the leading position in the geometry data unit. The point cloud reception device may process the geometry data unit by parsing the geometry header first. The geometry header has an association with the GPS, which contains information about the entire geometry. Accordingly, the geometry header contains information specifying gps_geom_parameter_set_id included in the GPS. The geometry header also contains tile information (e.g., tile_id), a slice identifier, and the like related to a slice to which the geometry data unit belongs.

The attribute header contains information (or signaling information) for processing a corresponding attribute data unit. Accordingly, the attribute header is at the leading position in the attribute data unit. The point cloud reception device may process the attribute data unit by parsing the attribute header first. The attribute header has an association with the APS, which contains information about all attributes. Accordingly, the attribute header contains information specifying aps_attr_parameter_set_id included in the APS. As described above, attribute decoding is based on geometry decoding. Accordingly, the attribute header contains information specifying a slice identifier contained in the geometry header in order to determine a geometry data unit associated with the attribute data unit.

When the point cloud transmission device performs the projection described with reference to FIGS. 15 to 23, the signaling information in the bitstream may further include signaling information related to the projection. The signaling information related to the projection may be included in sequence level signaling information (e.g., SPS, APS, etc.), a slice level (e.g., attribute header, etc.), an SEI message, or the like. The point cloud reception device according to the embodiments may perform decoding including inverse projection based on the signaling information related to the projection.

FIG. 24 shows an exemplary syntax structure of signaling information related to projection.

The signaling information related to the projection according to the embodiments may be included in signaling information of various levels (e.g., sequence level, slice level, etc.). The signaling information related to the projection is transmitted to the point cloud reception device (e.g., the reception device 10004 of FIG. 1, the point cloud decoder of FIGS. 10 and 11, and the receiving device of FIG. 13).

projection_flag: When the value of projection_flag is 1, it indicates that decoded data should be inversely projected (reprojected) into the XYZ coordinate space through the decoder post-processing.

The point cloud reception device checks whether inverse projection should be performed based on projection_flag. In addition, when the value of projection_flag is 1, the point cloud reception device may secure signaling information related to projection and perform inverse projection. The signaling information related to the projection may be defined as a concept including signaling information (projection_flag) indicating whether projection is performed. Embodiments are not limited to this example.

projection_info_id: An identifier for identifying projection information.

coordinate_conversion_type: Indicates a coordinate conversion type related to the coordinate conversion described with reference to FIGS. 19 to 20. coordinate_conversion_type set to 0 indicates that the coordinate system is a cylindrical coordinate system (e.g., the cylindrical coordinate system 1810 described with reference to FIG. 18). coordinate_conversion_type set to 1 indicates that the coordinate system is a spherical coordinate system (e.g., the spherical coordinate system 1820 described with reference to FIG. 18). coordinate_conversion_type set to 2 indicates that the coordinate system is a sectoral cylindrical coordinate system (e.g., the sectoral cylindrical coordinate system 2010 described with reference to FIG. 20). coordinate_conversion_type set to 3 indicates the coordinate system is a sectoral spherical coordinate system (e.g., the sectoral spherical coordinate system 2020 described with reference to FIG. 20).

projection_type: Indicates the type of projection (e.g., the projection described with reference to FIG. 21) used according to the coordinate conversion type. As described with reference to FIGS. 20 and 21, when the value of coordinate_conversion_type is 2, the coordinate system before the projection is a sectoral cylindrical coordinate system (e.g., the sectoral cylindrical coordinate system 2010 in FIG. 20 or the sectoral cylindrical coordinate system 2100 in FIG. 21). When the value of projection_type is 0, the x, y, and z axes are matched to the parameters r, $\theta$, and $\phi$ of the sectoral cylindrical coordinate system (Equation 1), respectively. When the value of projection_type is 0, the x, y, and z axes are matched to $r^2$, $$\cos^2 \frac{\theta}{2},$$

tan $\phi$ (Equation 2), respectively. The projection types are not limited to this example and may be defined for each axis.

laser_position_adjustment_flag: Indicates whether laser position adjustment (e.g., the laser position adjustment described with reference to FIG. 22) is applied. laser_position_adjustment_flag set to 1 indicates that laser the position adjustment has been applied.

num_laser: Indicates the total number of lasers. The subsequent for loop is an element representing laser position information about each laser. Here, i, which denotes each laser, is greater than or equal to 0, and is less than the total number of lasers indicated by num_laser.

r_laser [i]: Indicates the horizontal distance from the central axis of laser i.

z_laser [i]: Indicates the vertical distance from the horizontal center of laser i.

theta_laser [i]: Indicates the angle in the vertical direction of laser i.

The laser position information is not limited to the above example. For example, the laser position may be expressed as parameters for the respective axes of the coordinate system representing the projection, such as x_laser[i], y_laser[i], and z_laser[i].

The following elements represent information related to sampling rate adjustment (e.g., the sampling rate adjustment 1643 described with reference to FIG. 16).

sampling_adjustment_cubic_flag: Indicates whether the lengths of three axes are corrected to be equal to each other in the sampling rate adjustment. sampling_adjustment_cubic_flag set to 1 indicates that the three axes should be corrected to have the same length.

sampling_adjustment_spread_bbox_flag: Indicates whether to perform sampling rate adjustment such that the distribution of point cloud data is uniform within the bounding box. When the value of sampling_adjustment_spread_bbox_flag is 1, correction for uniformly spreading the distribution within the bounding box is used in the sampling rate adjustment.

sampling_adjustment_type: Indicates the type of sampling rate adjustment. sampling_adjustment_type set to 0 indicates sampling rate adjustment based on mechanical characteristics. sampling_adjustment_type set to 1 indicates sampling rate adjustment based on the minimum axial distance between points. sampling_adjustment_type set to 2 indicates sampling rate adjustment based on the density on each axis. sampling_adjustment_type set to 3 indicates sampling rate adjustment according to the importance of the point. The types of sampling rate adjustment are not limited to this example.

geo_projection_enable_flag: Indicates whether projection is applied in geometry coding.

attr_projection_enable_flag: Indicates whether projection is applied in attribute coding.

bounding_box_x_offset, bounding_box_y_offset, and bounding_box_z_offset: Correspond to the X-axis, Y-axis, and Z-axis values representing the starting point of a range (bounding box) that includes the projected point cloud data. For example, when the value of projection_type is 0, bounding_box_x_offset, bounding_box_y_offset, and bounding_box_z_offset are expressed as (0, 0, 0). When the value of projection_type is 1, bounding_box_x_offset, bounding_box_y_offset, and bounding_box_z_offset are expressed as (−r_max1, 0, 0).

bounding_box_x_length, bounding_box_y_length, and bounding_box_z_length: May indicate a range (bounding box) that includes the projected point cloud data. For example, when the value of projection_type is 0, the values of bounding_box_x_length, bounding_box_y_length, and bounding_box_z_length are r_max, 360, and z_max, respectively. When the value of projection_type is 1, the values of bounding_box_x_length, bounding_box_y_length, and bounding_box_z_length are r_max1+r_max2, 180, and z_max, respectively.

orig_bounding_box_x_offset, orig_bounding_box_y_offset, and orig_bounding_box_z_offset: Correspond to the X-axis, Y-axis, and Z-axis values representing the starting point of a range (bounding box) that includes the point cloud data before projection.

orig_bounding_box_x_length, orig_bounding_box_y_length, orig_bounding_box_z_length: May indicate a range (bounding box) including point cloud data before coordinate conversion.

rotation_yaw, rotation_pitch, and rotation_roll: indicate rotation information used in coordinate conversion.

Next, elements representing information related to the coordinate system when the value of coordinate_conversion_type is 0 or 2, that is, when the coordinate system before the projection is a cylindrical coordinate system or a sectoral cylindrical coordinate system are disclosed below.

cylinder_center_x, cylinder_center_y, and cylinder_center_z: Correspond to X-axis, Y-axis, and Z-axis values representing the position of the center of a cylindrical column represented by the cylindrical coordinate system before the projection.

cylinder_radius_max, cylinder_degree_max, and cylinder_z_max: Indicate the maximum values of the radius, angle, and height of a cylindrical column represented by the cylindrical coordinate system before the projection.

ref_vector_x, ref_vector_y, and ref_vector_z: Indicate the direction of the vector that is a reference in projecting the cylindrical column represented by the cylindrical coordinate system, as the direction of (x, y, z) from the center. They may correspond to the x-axis of the projected cuboid space (e.g., the cuboid space 2120 described with reference to FIG. 21).

normal_vector_x, normal_vector_y, and normal_vector_z: Indicate the direction of the normal vector of the cylindrical column represented by the cylindrical coordinate system, as the direction of (x, y, z) from the center. They may correspond to the z-axis of the projected cuboid space (e.g., the cuboid space 2120 described with reference to FIG. 21).

clockwise_degree_flag: Indicates the direction in which the angle of the cylindrical column represented by the cylindrical coordinate system is obtained. clockwise_degree_flag set to 1 indicates that the direction in which the angle of the cylindrical column represented by the cylindrical coordinate system is obtained is clockwise when the cylindrical column is seen in the top view. clockwise_degree_flag set to 0 indicates that the direction in which the angle of the cylindrical column represented by the cylindrical coordinate system is obtained is counterclockwise when the cylindrical column is seen in the top view. The direction in which the angle of the cylindrical column represented by the cylindrical coordinate system is obtained may correspond to the direction of the y-axis of the projected cuboid space (e.g., the cuboid space 2120 described with reference to FIG. 21).

granularity_angular, granularity_radius, and granularity_normal: represent parameters indicating the angle, the distance from the circular plane surface of the cylindrical column to the center, and the resolution for the distance from the center in the direction of the normal vector. The parameters may correspond to the aforementioned scale factors α, β, and γ, respectively.

As shown in the figure, when the value of coordinate_conversion_type is 1 or 3, that is, when the coordinate system before the projection is the spherical coordinate system or the sectoral spherical coordinate system, the syntax structure of the signaling information related to the projection includes the same elements as the elements representing information related to a coordinate system when the value of coordinate_conversion_type is 0 or 2, that is, when the coordinate system before the projection is the cylindrical coordinate system or the sectoral cylindrical coordinate system. Details of the elements are the same as those described above, and thus a description thereof is omitted.

FIG. 25 shows an example of signaling information according to embodiments.

FIG. 25 shows an exemplary syntax structure of an SPS of a sequence level in which the signaling information related to projection is included.

profile_compatibility_flags: Indicates whether a bitstream conforms to a specific profile for decoding or another profile. The profile specifies constraints imposed on the bitstream to specify capabilities for decoding of the bitstream. Each profile is a subset of algorithmic features and constraints and is supported by all decoders conforming to the profile. profile_compatibility_flags is for decoding and may be defined according to a standard or the like.

level_idc: Indicates the level applied to the bitstream. The level is used within all profiles. In general, the level corresponds to a specific decoder processing load and memory capability.

sps_bounding_box_present_flag: Indicates whether information about a bounding box is present in the SPS. sps_bounding_box_present_flag set to 1 indicates information about the bounding box is present. sps_bounding_box_present_flag set to 0 indicates that information about the bounding box is not defined.

When the value of sps_bounding_box_present_flag is 1, the following information about the bounding box is contained in the SPS.

sps_bounding_box_offset_x: Indicates the quantized x-axis offset of a source bounding box in the Cartesian coordinate system including the x, y, and z axes.

sps_bounding_box_offset_y: Indicates the quantized y-axis offset of the source bounding box in the Cartesian coordinate system including the x, y, and z axes.

sps_bounding_box_offset_z: Indicates the quantized z-axis offset of the source bounding box in the Cartesian coordinate system including the the x, y, and z axes.

sps_bounding_box_scale_factor: Indicates a scale factor used to indicate the size of the source bounding box.

sps_bounding_box_size_width: Indicates the width of the source bounding box in the Cartesian coordinate system including the x, y, and z axes.

sps_bounding_box_size_height: Indicates the height of the source bounding box in the Cartesian coordinate system including the x, y, and z axes.

sps_bounding_box_size_depth: Indicates the depth of the source bounding box in the Cartesian coordinate system including the x, y, and z axes.

The syntax of the SPS further includes the following elements. sps_source_scale factor: Indicates a scale factor of source point cloud data.

sps_seq_parameter_set_id: An identifier of the SPS for reference by other syntax elements (e.g., seq_parameter_set_id in the GPS).

sps_num_attribute_sets: Indicates the number of attributes encoded in the bitstream. The value of sps_num_attribute_sets is in the range of 0 to 63.

The subsequent 'for' loop includes elements indicating information about each of the attributes as many as the number indicated by sps_num_attribute_sets. In the figure, i denotes each attribute (or attribute set). The value of i is greater than or equal to 0 and less than the number indicated by sps_num_attribute_sets.

attribute_dimension_minus1[i]: Indicates a value that is less than the number of components of the i-th attribute by 1. When the attribute is a color, the attribute corresponds to a three-dimensional signal representing the characteristics of light of a target point. For example, the attribute may be signaled by three components of RGB (Red, Green, Blue). The attribute may be signaled by three components of YUV, which are luma and two chromas. When the attribute is reflectance, the attribute corresponds to a one-dimensional signal representing the ratio of intensities of light reflectance of the target point.

attribute_instance_id[i]: Indicates the instant id of the i-th attribute. attribute_instance_id is used to distinguish the same attribute labels and attributes.

attribute_bitdepth_minus1[i]: Indicates a value that is less than the bit depth of the first component of the i-th attribute signal by 1. The value of this element plus 1 specifies the bit depth of the first component.

attribute_cicp_colour_primaries[i]: Indicates chromaticity coordinates of the color attribute source primaries of the i-th attribute.

attribute_cicp_transfer_characteristics[i]: Indicates a reference opto-electronic transfer characteristic function of the color attribute as a function of the source input linear optical intensity Lc with a nominal real-valued range of 0 to 1, or indicates an inverse function of the reference opto-electronic transfer characteristic function of the color attribute as a function of the output linear optical intensity Lo with a nominal real-valued range of 0 to 1.

attribute_cicp_matrix_coeffs[i]: Indicates matrix coefficients used to derive luma and chroma signals from RBG or YXZ primary colors.

attribute_cicp_video_full_range_flag[i]: Indicates the black level and range of luma and chroma signals derived from component signals having real values of E'Y, E'PB, and E'PR or E'R, E'G, and E'B.

known_attribute_label_flag[i], known_attribute_label[i], and attribute_label_fourbytes[i] are used together to identify the type of data carried in the i-th attribute. known_attribute_label_flag[i] indicates whether the attribute is identified by the value of known_attibute_label[i] or attribute_label_fourbytes[i], which is another object identifier.

As described above, the syntax of the SPS includes signaling information related to projection.

projection_flag is the same as the projection_flag described with reference to FIG. 24. When the value of projection_flag is 1, the SPS syntax further includes signaling information (projection_info( ) related to the projection described with reference to FIG. 24. The signaling information related to the projection is the same as that described with reference to FIG. 24, and thus a detailed description thereof is omitted.

sps_extension_flag: Indicates whether sps_extension_data_flag is present in the SPS. sps_extension_flag set to 0 indicates that the syntax element sps_extension_data_flag is not present in the SPS syntax structure. The value of 1 for sps_extension_flag is reserved for future use. The decoder may ignore all sps_extension_data_flag syntax elements following sps_extension_flag set to 1.

sps_extension_data_flag: Indicates whether data for future use is present and may have any value.

The SPS syntax according to embodiments is not limited to the above example, and may further include additional elements or exclude some of the elements shown in the figure for efficiency of signaling. Some of the elements may be signaled through signaling information (e.g., APS, attribute header, etc.) other than the SPS or through an attribute data unit.

FIG. 26 shows an example of signaling information according to embodiments.

FIG. 26 shows an exemplary syntax structure of a tile inventory of a tile level in which signaling information related to projection is included.

num_tiles: Indicates the number of tiles.

The following 'for' loop represents information about each tile. Here, i denotes each tile, and is greater than or equal to 0 and less than the number of tiles indicated by num_tiles.

tile_bounding_box_offset_x[i], tile_bounding_box_offset_y[i], and tile_bounding_box_offset_z[i]: Indicate offset values of the bounding box of tile i on the x-axis, y-axis, and z-axis, respectively.

tile_bounding_box_size_width[i], tile_bounding_box_size_height[i], and tile_bounding_box_size_depth[i]: Indicate the width, height, and depth of the bounding box of tile i, respectively.

The syntax of the tile inventory according to the embodiments includes signaling information related to projection.

projection_flag is the same as the projection_flag described with reference to FIG. 24. When the value of the projection_flag is 1, the SPS syntax further includes signaling information (projection_infoo) related to the projection described with reference to FIG. 24. The signaling information related to the projection is the same as that described with reference to FIG. 24, and thus a detailed description thereof is omitted.

The syntax of the tile inventory is not limited to the above example, and may further include additional elements or exclude some of the elements shown in the figure for efficiency of signaling. Some of the elements may be signaled through signaling information (e.g., SPS, APS, attribute header, etc.) other than the tile inventory or through an attribute data unit.

FIG. 27 shows an example of signaling information according to embodiments.

FIG. 27 shows an exemplary syntax structure of an attribute slice header of a slice level in which signaling information related to projection is included.

The syntax of the attribute header according to the embodiments includes the following syntax elements.

ash_attr_parameter_set_id: Has the same value as aps_attr_parameter_set_id in active SPSs.

ash_attr_sps_attr_idx: Specifies the order of attribute sets in the active SPS. ash_attr_geom_slice_id indicates the value of the slice ID (e.g., gsh_slice_id) included in the geometry header.

When the value of aps_slice_qp_delta_present_flag is 1, the syntax of the attribute slice header further includes elements given below. aps_slice_qp_delta_present_flag is information included in the attribute parameter set (APS) and indicates whether component QP offsets indicated by ash_attr_qp_offset are present in the header of the attribute data unit.

ash_qp_delta_luma: Indicates the luma value of the component QP.

ash_qp_delta_chroma: Indicates the chroma value of the component QP.

The syntax of the attribute slice header according to the embodiments includes signaling information related to projection. projection_flag is the same as the projection_flag described with reference to FIG. 24. When the value of projection_flag is 1, the SPS syntax further includes the signaling information (projection_info( )) related to the projection described with reference to FIG. 24. The signaling information related to the projection is the same as that described with reference to FIG. 24, and thus a detailed description thereof is omitted.

The syntax of the attribute slice header is not limited to the above example, and may further include additional elements or exclude some of the elements shown in the figure for efficiency of signaling. Some of the elements may be signaled through signaling information (e.g., SPS, APS, etc.) other than the attribute slice header or through an attribute data unit.

FIG. 28 shows signaling information according to embodiments.

FIG. 28 shows an exemplary syntax structure of an APS of a sequence level in which signaling information related to projection is included.

attr_coord_conv_enable_flag: Indicates whether coordinate conversion (projection) is applied in attribute coding. attr_coord_conv_enable_flag set to 1 indicates that coordinate conversion is applied. attr_coord_conv_enable_flag set to 0 indicates that coordinate conversion is not applied in the attribute coding.

The subsequent 'for' loop represents scale factor information related to each attribute. Here, i denotes the x-axis, y-axis, and z-axis of the coordinate system. Thus, the values of i are 0, 1, and 2.

attr_coord_conv_scale[i]: Indicates the scale factor of the coordinate-converted axis in units of $2^{-8}$. scaleaxis[i] according to the embodiments is derived as follows.

ScaleAxis[0]=attr_coord_conv_scale[0]
ScaleAxis[1]=attr_coord_conv_scale[1]
ScaleAxis[2]=attr_coord_conv_scale[2]

Although not shown in the figure, the syntax of the APS may include coord_conv_scale_present_flag. coord_conv_scale_present_flag indicates whether the coordinate conversion scale factors scale_x, scale_y, and scale_z are present. When the value of coord_conv_scale_present_flag is 1, the scale factors are present. When the value of coord_conv_scale_present_flag is 0, no coordinate conversion scale factor is present. The scale factors (e.g., scale_x, scale_y, and scale_z described above) may be minimum distances normalized by the maximum distances of the x-axis, y-axis, and z-axis.

The syntax of the APS is not limited to the above example, and may further include additional elements or exclude some of the elements shown in the figure for efficiency of signaling. Some elements may be signaled through signaling information (e.g., SPS, attribute slice header, etc.) other than the APS or through an attribute data unit.

Figure 29:
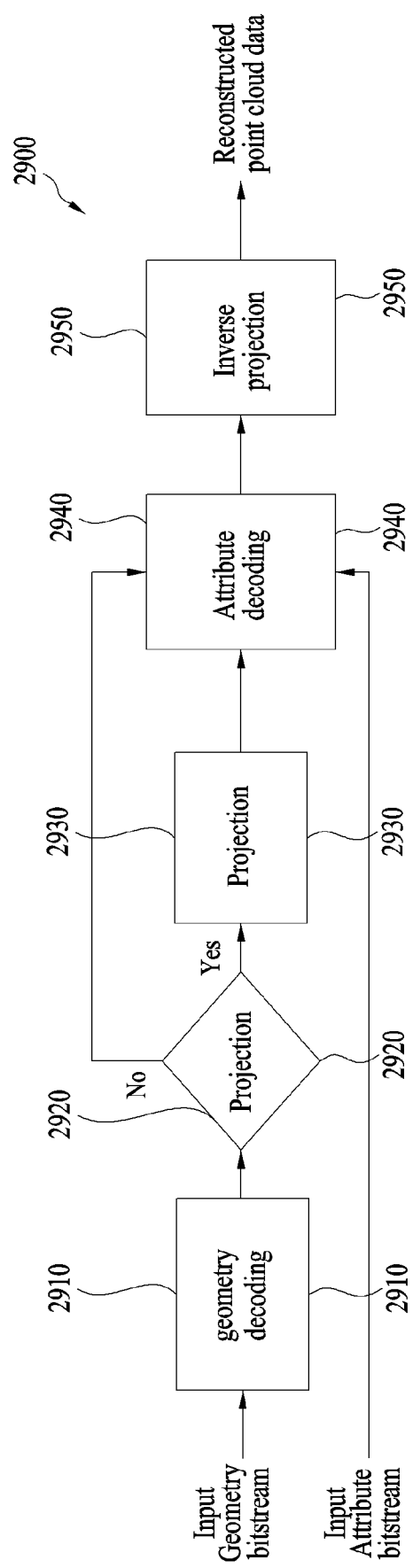
FIG. 29 is a flowchart illustrating operations of a point cloud data reception device according to embodiments.

FIG. 29 is a flowchart illustrating operations of a point cloud data reception device according to embodiments.

The flowchart 2900 of FIG. 29 illustrates example operations of a point cloud data reception device (or point cloud reception device) (e.g., the reception device 10004 of FIG. 1, the point cloud decoder of FIGS. 10 and 11, the reception device of FIG. 13) that processes point cloud data on which projection has been performed. As described with reference to FIGS. 1 to 14, the point cloud reception device performs geometry decoding on the input geometry bitstream (2910). The geometry decoding according to the embodiments may include, but is not limited to, octree geometry decoding and trisoup geometry decoding. The point cloud reception device performs at least one of the operations of the arithmetic decoder 13002, the occupancy code-based octree reconstruction processor 13003, the surface model processor (triangle reconstruction, up-sampling, voxelization) 13004, and the inverse quantization processor 13005 described with reference to FIG. 13. The point cloud reception device outputs the reconstructed geometry as a result of the geometry decoding.

The point cloud reception device determines whether to apply projection based on the signaling information described with reference to FIGS. 24 to 28. When the projection is applied, the point cloud reception device projects the decoded geometry (2930), and performs attribute decoding based on the projected geometry (2940). When the projection is not applied, the point cloud reception device performs attribute decoding based on the reconstructed geometry (2940). The attribute decoding 2940 corresponds to, but is not limited to, at least one or a combination of the operations of the arithmetic decoder 13007, the inverse quantization processor 13008, the prediction/lifting/RAHT inverse transform processor 13009, and the color inverse transform processor 13010. In addition, the attribute decoding 2940 may include at least one or a combination of RAHT coding, predictive transform coding, and lifting transform coding. When the projection is performed, the point cloud reception device performs inverse projection (2950). Since the decoded attribute is matched to the projected geometry, the point cloud data of the geometry and the attribute which are matched in the projected coordinate system (or space) should be converted back into the original coordinate system. Therefore, the point cloud reception device secures reconstructed point cloud data by performing the inverse projection. In the case where the projection has not been performed, the inverse projection 2950 is skipped. The projection 2930 may be referred to as coordinate conversion pre-processing for attribute decoding. The inverse projection 2950 may be referred to as coordinate conversion post-process for attribute decoding. The flowchart 2900 illustrates example operations of the point cloud reception device, and the order of the operations is not limited to this example. The operations represented by the elements in the flowchart 2900 may be performed by hardware, software, and/or a process that constitute the point cloud reception device, or a combination thereof.

Figure 30:
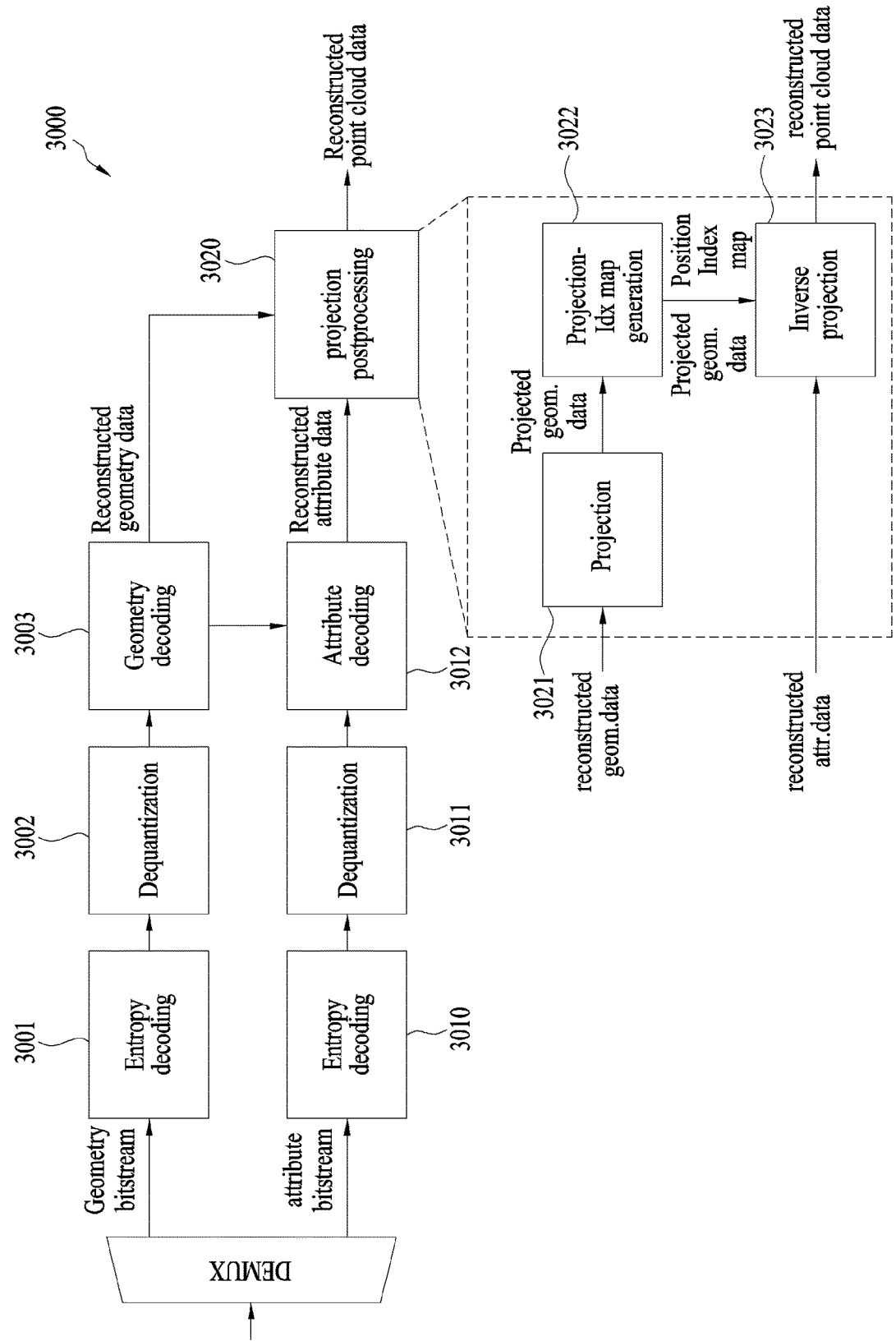
FIG. 30 illustrates an example of operations of the point cloud reception device.

FIG. 30 illustrates an example of operations of the point cloud reception device.

The flowchart 3000 of FIG. 30 specifically illustrates the operations of the point cloud data reception device of the flowchart 2900 of FIG. 29. The flowchart 3000 illustrates example operations of the point cloud reception device. The order of the operations for data processing of the point cloud reception device is not limited to this example. In addition, the operations represented by the elements in the flowchart 3000 may be performed by hardware, software, and/or a process that constitute the point cloud reception device, or a combination thereof.

The point cloud reception device outputs a geometry bitstream and an attribute bitstream by demultiplexing the bitstream. The point cloud reception device performs entropy decoding 3001, dequantization 3002, and geometry decoding 3003 on the geometry bitstream to output reconstructed geometry. The entropy decoding 3001, dequantization 3002, and geometry decoding 3003 may be referred to as geometry decoding or geometry processing, and correspond to at least one or a combination of the operations of the arithmetic decoder 13002, the occupancy code-based octree reconstruction processor 13003, the surface model processor (triangle reconstruction, up-sampling, voxelization) 13004, and the inverse quantization processor 13005 described with reference to FIG. 13.

The point cloud reception device performs entropy decoding 3010, dequantization 3011, and attribute decoding 3012 on the attribute bitstream to output a reconstructed attribute (or decoded attribute). The entropy decoding 3010, the dequantization 3011, and the attribute decoding 3012 may be referred to as attribute decoding or attribute processing, and correspond to the attribute decoding 2940 described with reference to FIG. 29. In addition, the entropy decoding 3010, the dequantization 3011, and the attribute decoding 3012 correspond to, but is not limited to, at least one or a combination of the operations of the arithmetic decoder 13007, the inverse quantization processor 13008, and the prediction/lifting/RAHT inverse transform processor 13009, and the color inverse transform processor 13010.

As described with reference to FIGS. 24 to 28, the signaling information according to the embodiments further includes signaling information (e.g., geo_projection_enable_flag, attr_projetion_enable_flag, attr_coord_conv_enable_flag, etc.) indicating whether the projection is applied to each of the geometry and/or the attribute. Accordingly, the point cloud reception device according to the embodiments performs projection post processing on the reconstructed geometry and the reconstructed attribute based on the signaling information described with reference to FIGS. 24 to 28 (3020).

The projection post processing 3020 corresponds to the projection preprocessing 1620 on the transmitting side described with reference to FIG. 16. The projection post processing 3020 corresponds to the projection 2920 and the inverse projection 2950 described with reference to FIG. 29. The boxes indicated by a dashed line at the bottom of the figure represent a detailed operation flow of the projection post processing 3020. As shown in the figure, the point cloud reception device performs the projection post processing 3020, which includes projection 3021, projection index map generation 3022, and inverse projection 3023.

The point cloud reception device performs the projection on the reconstructed geometry (3021). The projection 3021 corresponds to the reverse process of the projection 1632 described with reference to FIG. 16. In the case where the point cloud transmission device has performed the projection on the geometry, the geometry reconstructed by the point cloud reception device represents a position in the projection domain. Therefore, the point cloud reception device performs reprojection of re-converting the projected geometry into a 3D space based on the signaling information (e.g., the signaling information related to the projection described with reference to FIGS. 24 to 28, coord_conversion_type, bounding_box_x_offset, etc.). The point cloud reception device may secure a range of reprojected data, scaling information (e.g., bounding_box_x/y/z_length, granularity_radius/angular/normal, etc.), and the like from the signaling information related to the projection described with reference to FIGS. 24 to 28.

The point cloud reception device according to the embodiments may check whether the laser position adjustment described with reference to FIG. 22 (the laser position adjustment 1642) has been performed at the transmitting side based on the signaling information (e.g., laser_position_adjustment_flag, etc.) related to the projection described with reference to FIGS. 24 to 28, and secure information related to the laser position adjustment. In addition, the point cloud reception device may check whether the sampling rate adjustment (e.g., the sampling rate adjustment 1643) has been performed at the transmitting side based on the signaling information (e.g., sampling_adjustment_cubic_flag, etc.) related to the projection described with reference to FIGS. 24 to 28, and secure related information. The point cloud reception device according to the embodiments may perform reprojection based on the laser position adjustment and the sampling rate adjustment. The projection, laser position adjustment, and sampling rate adjustment according to the embodiments are the same as those described with reference to FIGS. 21 to 23, and thus a detailed description thereof is omitted.

The point cloud reception device may convert the coordinate system (e.g., the cylindrical coordinate system 1810 and the spherical coordinate system 1820 described with reference to FIG. 18) of the reprojected point cloud data (geometry) into the original coordinate system (e.g., the xyz coordinate system 1800) based on the signaling information (e.g., projection_type) related to the projection described with reference to FIGS. 24 to 28. As described above, the signaling information related to the projection described with reference to FIGS. 24 to 28 includes an output range of the data in the original coordinate system (e.g., orig_bounding_box_x_offset), and information related to the converted coordinate system (e.g., cylinder_center_x, etc.). The point cloud reception device may use the inverse transform equations for Equations 1 to 6. However, as described with reference to FIGS. 15 to 18, an error may occur in the position of a point while the point cloud transmission device performs voxelization (e.g., the projection domain voxelization 1644) and rounding. Thus, even when the point cloud reception device performs projection based on the signaling information, it may be difficult to reconstruct the geometry without loss. That is, even when the attribute is losslessly reconstructed, an unintended error may occur because the geometry and the attribute fail to be accurately matched to each other due to loss of the reconstructed geometry. When the projection is applied only in the attribute coding, appropriate matching may be implemented by connecting the reconstructed geometry to the reconstructed attribute corresponding thereto even when the reconstructed attribute is not losslessly reconstructed. Thereby, the reconstructed point cloud data with reduced errors may be secured.

Accordingly, the point cloud reception device according to the embodiments performs the projection index map generation 3022 to generate an index map indicating the index of the position information in order to connect the projected geometry to the position given before the projection. The point cloud reception device sorts the points represented by the reconstructed geometry in a specific order (e.g., Morton code order, x-y-z zigzag order, etc.) for the reconstructed geometry, and assigns indexes according to the order. The point cloud reception device may generate an index to a decoded position (geometry) map and a decoded position (geometry) to the index map based on the relationship between the position given before the projection and the index. The point cloud reception device performs projection on the geometry to which an index is assigned, and generates a decoded position to the projected position (geometry) map. In addition, the point cloud reception device generates the projection position to the index map based on the relationship between the decoded position and the index (e.g., the index to the generated decoded position (geometry) map and the decoded position (geometry) to the index map).

As described with reference to FIGS. 15 to 17, the point cloud transmission device performs attribute encoding based on the projected geometry. Accordingly, the reconstructed attribute is represented as an attribute for the geometry represented in the projection domain described with reference to FIGS. 15 to 23.

Once attribute decoding is performed, each point in the projection domain has an attribute. Accordingly, the point cloud reception device may perform the inverse projection 3023 and reconstruct the original geometry for the projected geometry based on the projected position to the index map and the index to the position map. Then, it may match the reconstructed original geometry to the reconstructed attribute. The projection index map generation 3022 may be included in the inverse projection 3023.

Figure 31:
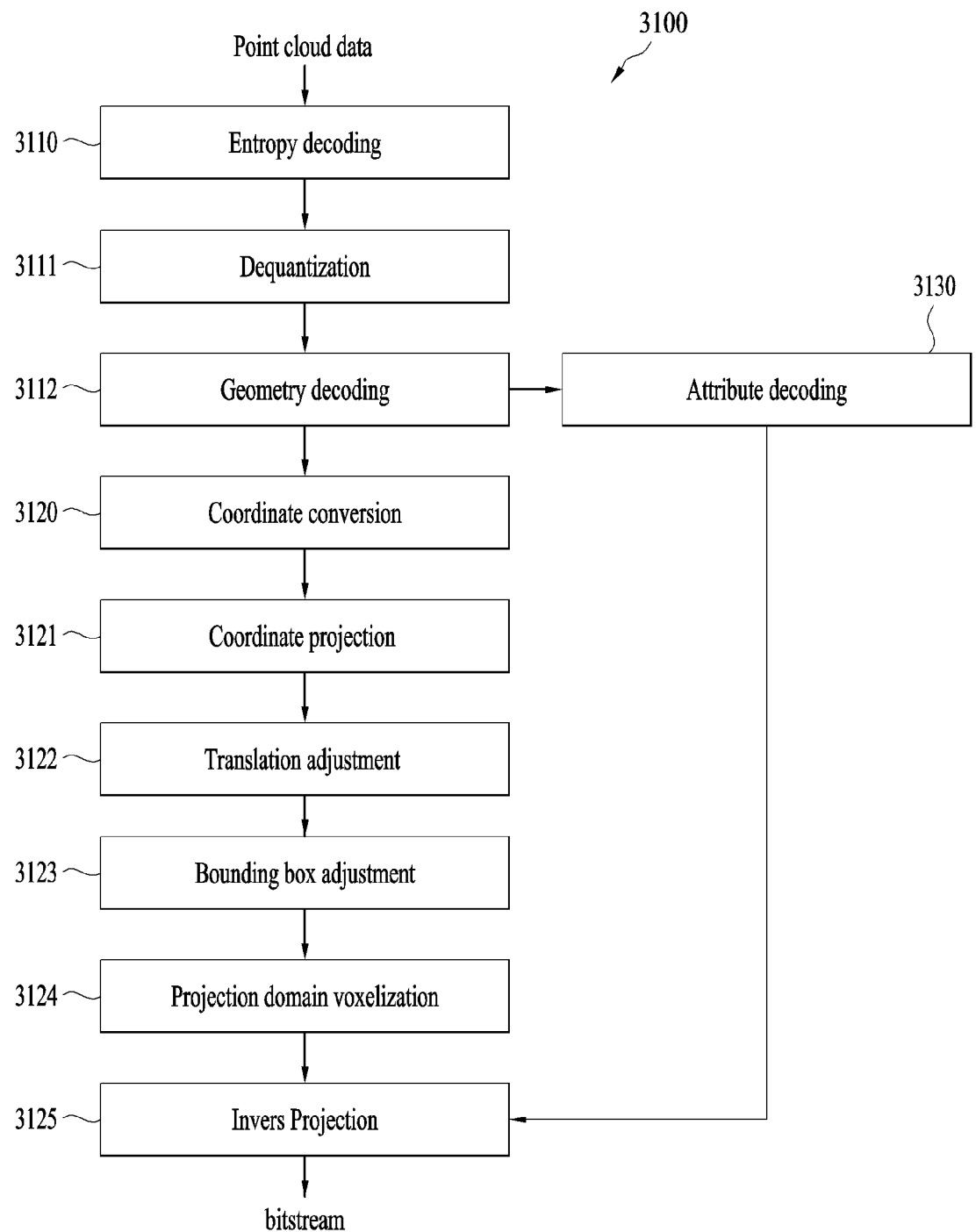
FIG. 31 illustrates an example of a processing procedure of the point cloud reception device.

FIG. 31 illustrates an example of a processing procedure of the point cloud reception device.

The flowchart 3100 shown in the figure illustrates an example of the processing procedure of the point cloud reception device described with reference to FIGS. 29 to 30. The operations of the point cloud reception device are not limited to this example. The operations corresponding to the respective elements may be performed in the order shown in FIG. 31 or may not be performed sequentially.

As described with reference to FIGS. 29 to 30, the point cloud reception device receives a point cloud bitstream as an input and performs entropy decoding 3110, dequantization 3111, and geometry decoding 3112 on the geometry bitstream. The entropy decoding 3110, the dequantization 3111, and the geometry decoding 3112 correspond to the geometry processing described with reference to FIG. 30, and a detailed description thereof is omitted. As described with reference to FIG. 30, the point cloud reception device determines whether projection is performed, based on the signaling information described with reference to FIGS. 24 to 28, and performs attribute decoding 3130 when the projection is skipped. When the projection is performed, the point cloud reception device performs projection post processing (e.g., the projection post processing 3020 described with reference to FIG. 30). The projection post processing according to the embodiments is an example of the projection post processing 3020 described with reference to FIG. 30, and includes coordinate conversion 3120, coordinate projection 3121, translation adjustment 3122, bounding box adjustment 3123, projection domain voxelization 3124, and inverse projection 3125. The coordinate conversion 3120, the coordinate projection 3121, the translation adjustment 3122, the bounding box adjustment 3123, and the projection domain voxelization 3124 may correspond to the projection 3021 described with reference to FIG. 30. As described with reference to FIG. 30, the point cloud reception device may perform the translation adjustment 3122, the bounding box adjustment 3123, and the like based on the information related to laser position adjustment (e.g., the laser position adjustment 1642), sampling rate adjustment (e.g., the sampling rate adjustment 1643), and the like included in the signaling information described with reference to FIGS. 24 to 28. The point cloud reception device performs inverse projection 3125. The inverse projection 3125 is the same as the inverse projection 3023 described with reference to FIG. 30, and thus a detailed description thereof is omitted.

Figure 32:
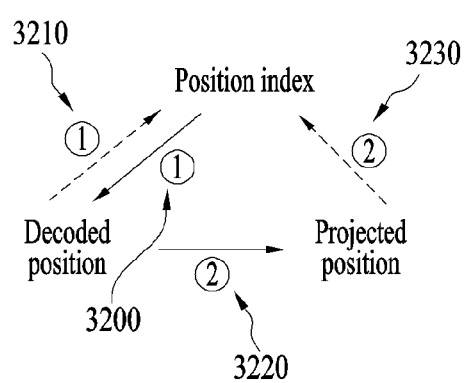
FIG. 32 illustrates an example of inverse projection.

FIG. 32 illustrates an example of inverse projection.

FIG. 32 illustrates the projection index map generation 3022 as an example of the inverse projection described with reference to FIGS. 30 to 31. A solid line 3200 shown in the figure represents an operation of generating an index to a decoded position map based on the relationship between the position given before the projection and the index. A dotted line 3210 shown in the figure represents an operation of generating a decoded position to the index map. A solid line 3220 shown in the figure represents an operation of the point cloud reception device performing projection on the index assigned geometry and generating a decoded position to the projected position map for the projected position (geometry) map. In addition, a dotted line 3230 shown in the figure represents an operation of the point cloud reception device generating a projection position to the index map based on the relationship between the decoded position and the index (e.g., the index to the decoded position (geometry) map and the decoded position (geometry) to the index map). Inverse projection is the same as that described with reference to FIG. 30, and thus a description thereof is omitted.

Figure 33:
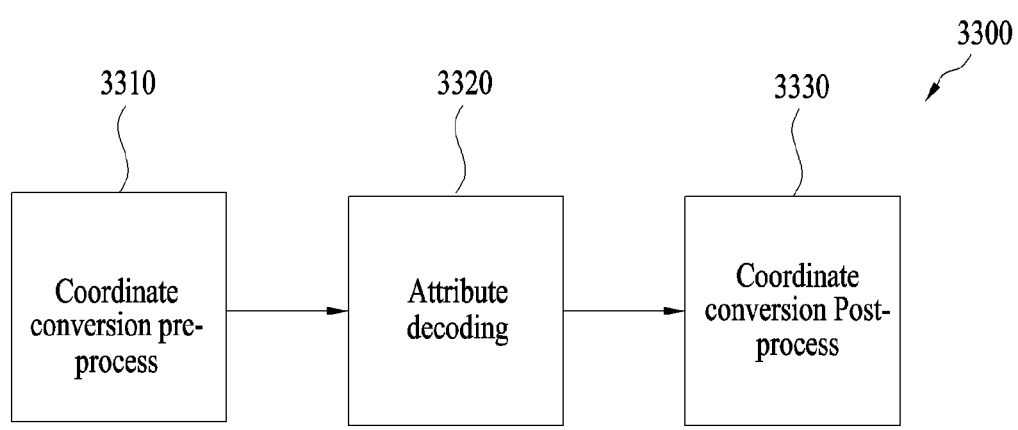
FIG. 33 illustrates an example of a processing procedure of the point cloud reception device according to embodiments.

FIG. 33 illustrates an example of a processing procedure of the point cloud reception device according to embodiments.

The flowchart 3300 shown in the figure illustrates an example of the processing procedure of the point cloud reception device described with reference to FIGS. 29 to 31. The operations of the point cloud reception device are not limited to this example. The operations corresponding to the respective elements may be performed in the order shown in FIG. 33 or may not be performed sequentially.

As described with reference to FIGS. 29 and 30, when the value of attr_coord_conv_enabled_flag described with reference to FIG. 28 is 1, the point cloud reception device may perform coordinate conversion pre-process 3310 as pre-processing for attribute decoding. The coordinate conversion pre-process 3310 may correspond to the projection 3021 described with reference to FIG. 30. The operations represented by the elements of the flowchart 3300 may be performed by hardware, software, and/or a process that constitute the point cloud reception device, or a combination thereof. The point cloud reception device performs the coordinate conversion pre-process 3310 based on the signaling information related to projection described with reference to FIGS. 24 to 28. The position (geometry) of a point output in the coordinate system conversion pre-process 3310 is used in the subsequent attribute decoding 3320. The input (or input data) of the coordinate conversion pre-process 3310 is configured as follows. The input according to the embodiments includes variables that are secured from the signaling information related to projection described with reference to FIGS. 24 to 28 or derived based on the signaling information related to projection described with reference to FIGS. 24 to 28.

array PointPos: A variable specifying the point position represented in the Cartesian coordinate attr_coord_conv_enabled_flag (e.g., attr_coord_conv_enabled_flag described with reference to FIG. 28): An indicator specifying the use of coordinate conversion in the attribute coding process.

number_lasers (e.g. numb_laser described with reference to FIG. 24): A variable specifying the number of lasers LaserAngle: A variable specifying the tangent of the elevation angles of lasers geomAngularOrigin: A variable specifying the coordinates (x,y,z) of the origin of the lasers ScaleAxis: A variable specifying the scale factors for coordinate conversion of each axis LaserCorrection: A variable specifying the correction of the laser position relative to the geomAngularOrigin.

Outputs of the coordinate conversion pre-process 3310 are corrected array PointPos and PointPosCart that specifies the linkage between the positions before and after the coordinate conversion.

The coordinate conversion pre-process 3310 may include a process to determine the laser index.

The process to determine the laser index according to the embodiments is a process of determining the laser index laserIndex[pointIdx] with pointIdx indicating a point in the range of 0 to PointCount-1 for a point that undergoes coordinate conversion. This process is performed only when the value of attr_coord_conv_enabled_flag is 1.

First, the estimated laserIndexEstimate[pointIdx] is computed by determining a node angle PointTheta and then determining the closest laser angle LaserAngle[laserIndexEstimate[pointIdx]] to this point. The following describes the process of determining the node angle.

sPoint=(PointPos[pointIdx][0]−geomAngularOrigin[0]) <<8 tPoint=(PointPos[pointIdx][1]−geomAngularOrigin[1]) <<8 r2=sPoint×sPoint+tPoint×tPoint rInvLaser=1÷Sqrt(r2)

PointTheta=((PointPos [pointIdx][2]−geomAngularOrigin[2])×rInvLaser)>>14

The following describes the process of determining the closest laser angle.

```
start = 0
end = number_lasers - 1
for (int t = 0; t <= 4; t++) {
    mid = (start + end) >> 1
    if (LaserAngle[mid] > PointTheta)
        end = mid
    else
        start = mid
}
minDelta = Abs(LaserAngle[start] - PointTheta)
laserIndex [pointIdx] = start
for (j = start + 1; j <= end; j++) {
    delta = Abs(LaserAngle[j] - PointTheta)
    if (delta < minDelta) {
        minDelta = delta
        laserIndex [pointIdx] = j
    }
}
```

The coordinate conversion pre-process 3310 may include a coordinate conversion process.

In the beginning of the coordinate conversion process, the position in the array of point positions in the Cartesian coordinates is copied to PointPosCart[pointIdx] with pointIdx in the range of 0 to PointCOunt-1. PointPosCart [pointIdx] is given as follows.

PointPosCart[pointIdx][0]=PointPos[pointIdx][0]
PointPosCart[pointIdx][1]=PointPos[pointIdx][1]
PointPosCart[pointIdx][2]=PointPos[pointIdx][2]

The following process applies to a point to convert the coordinate axis from the Cartesian coordinate to the cylindrical coordinate. ConvPointPos[pointIdx] specifies the point position in the converted cylindrical coordinate with pointIdx in the range of 0 to PointCount-1.

ConvPointPos[pointIdx][0]=Sqrt(r2)>>8;
ConvPointPos[pointIdx][1]=(atan2(tPoint, sPoint)+3294199)>>8;
ConvPointPos[pointIdx][2]=((PointPos[pointIdx][2]−geomAngularOrigin[2]−LaserCorrection[laserIndex [pointIdx]])×rInvLaser)>>22.

The updated PointPos is specified by multiples of the scale factor on each axis. If ScaleAxis is a non-zero positive value, the updated PointPos is derived as follows.

PointPos[pointIdx][0]=((ConvPointPos[pointIdx][0]−MinPointPos[0])×ScaleAxis[0])>>8;
PointPos [pointIdx][1]=((ConvPointPos [pointIdx][1]−MinPointPos[1])×ScaleAxis[1])>>8;
PointPos [pointIdx][2]=((ConvPointPos [pointIdx][2]−MinPointPos [2])×ScaleAxis[2])>>8, where MinPointPos indicates the minimum point position among ConvPointPos[PointIdx] specified with PointIdx in the range of 0 to PointCount-1.

If at least one of the elements of ScaleAxis is equal to zero, ScaleAxis is derived by the bound box. Let MaxPointPos be the maximum point position of the given ConvPointPos. The length of the bounding box along the axis of LengthBbox may be defined as follows.

LengthBbox[0]=MaxPointPos[0]−MinPointPos[0];
LengthBbox[1]=MaxPointPos[1]−MinPointPos[1];
LengthBbox[2]=MaxPointPos[2]−MinPointPos[2].

Also, the maximum length among the three elements is defined as follows.

MaxLengthBbox=Max(LengthBbox[0], Max(LengthBbox[1], LengthBbox[2]))

Then, the ScaleAxis is derived as follows.

ScaleAxis[0]=MaxLengthBbox÷LengthBbox[0];
ScaleAxis[1]=MaxLengthBbox÷LengthBbox[1];
ScaleAxis[2]=MaxLengthBbox÷LengthBbox[2].

As described with reference to FIGS. 29 to 30, the point cloud reception device performs attribute decoding 3320. The attribute decoding 3320 is the same as the attribute decoding 2940 of FIG. 29 and the attribute decoding or attribute processing described with reference to FIG. 30, and thus a detailed description thereof is omitted. The point cloud reception device performs attribute decoding and performs a coordinate conversion post process to match attributes using a point position in the Cartesian coordinate system (3330). The input (or input data) of the coordinate conversion post process 3330 is configured as follows. The input according to the embodiments includes variables that are secured from the signaling information related to projection described with reference to FIGS. 24 to 28 or are derived based on the signaling information related to projection described with reference to FIGS. 24 to 28.

attr_coord_conv_enabled_flag (e.g., attr_coord_conv_enabled_flag described with reference to FIG. 28): An indicator specifying the use of coordinate convertion in the attribute coding The array PointsAttr with elements PointsAttr[pointIdx] [cIdx] with pointIdx in the range of 0 to PointCount-1, and cIdx in the range of 0 to AttrDim-1

The array PointPosCart with elements PointPosCart [pointIdx] with pointIdx in the range of 0 to PointCount-1

The output of the coordinate conversion post process 3330 is the array PointsAttr with elements PointsAttr [pointIdx][cIdx], where each element with index pointIdx of PointsAttr is associated with a position given by the array PointPosCart with the same index pointIdx.

The projection described with reference to FIGS. 15 to 33 may be applied to all three axes of the coordinate system representing the position of each point, or selectively applied to at least one of the axes. Information indicating the projection type according to the embodiments (e.g., projection_type described with reference to FIGS. 24 to 28) may be defined for each axis. For example, information indicating the projection type on the x-axis is defined as projection_type x, information indicating the projection type on the y-axis is defined as projection_type y, and information indicating the projection type on the z-axis is defined as projection_type z. Signaling information including projection_type x, projection_type y, and projection_type z (e.g., the signaling information described with reference to FIGS. 24 to 28 according to the embodiments) is transmitted to the point cloud data reception device through a bitstream. The signaling information according to the embodiments may or may not include projection_type.

When the value of projection_type x is 0, projection_type x indicates that projection is not performed on the x-axis and the value of x is used without conversion. When the value of projection_type x is 1, projection_type x indicates that a conversion value by a coordinate system (e.g., a cylindrical coordinate system, a spherical coordinate system, a sectoral cylindrical coordinate system, a sectoral spherical coordinate system, etc.) indicated by coordinate_conversion_type (e.g., the radius in the cylindrical coordinate system) is used. When the value of projection_type x is 2, projection_type x indicates that a simplified conversion value (e.g., the value of x*x+y*y simplified by removing the square root for the radius in the cylindrical coordinate system) is used. When the value of projection_type x is 3, projection_type x indicates that a simplified sum of distances (e.g., the sum of position information about each axis, x+y, x+y+z, etc.) is used. When the value of projection_type x is 4, projection_type x indicates that a conversion value (e.g., $\log_2(x)$) according to a predetermined function is used.

When the value of projection_type y is 0, projection_type y indicates that projection is not performed on the y-axis and the value of x is used without conversion. When the value of projection_type y is 1, projection_type y indicates that a conversion value by a coordinate system (e.g., a cylindrical coordinate system, a spherical coordinate system, a sectoral cylindrical coordinate system, a sectoral spherical coordinate system, etc.) indicated by coordinate_conversion_type (e.g., an azimuthal angle by the cylindrical coordinate system) is used. When the value of projection_type y is 2, projection_type y indicates that a simplified conversion value (e.g., a tangent value calculated to reduce the inverse tangent operation to obtain an angle as an angle value, assuming tan_phi=phi) is used. When the value of projection_type y is 3, projection_type y indicates that a simplified sum of distances (e.g., the difference in position information between the axes, x-y, y-x-z, or the like) is used. When the value of projection_type y is 4, projection_type y indicates that a conversion value (e.g., $\log_2(y)$) according to a predetermined function is used.

When the value of projection_type y is 0, projection_type z indicates that projection is not performed on the z-axis and the value of x is used without conversion. When the value of projection_type z is 1, projection_type z indicates that a conversion value by a coordinate system (e.g., a cylindrical coordinate system, a spherical coordinate system, a sectoral cylindrical coordinate system, a sectoral spherical coordinate system, etc.) indicated by coordinate_conversion_type (e.g., an elevation angle by the cylindrical coordinate system) is used. When the value of projection_type z is 2, projection_type z indicates that a simplified conversion value (e.g., a tangent value calculated to reduce the inverse tangent operation to obtain an angle as an angle value, or a laser index derived to be used to acquire data based on the number of lasers and the positions of the uniformly distributed lasers, etc.) is used. When the value of projection_type z is 3, projection_type z indicates that a simplified sum of distances (e.g., the difference in position information between the axes, z-x-y, or the like) is used. When the value of projection_type z is 4, projection_type z indicates that a conversion value (e.g., $\log_2(z)$) according to a predetermined function is used.

The information indicating the projection type applied to each axis (projection_type x, projection_type y, and projection_type z described above) according to the embodiments may be defined for one coordinate conversion, or may indicate different coordinate conversions for the respective axes.

For example, when coordinate_conversion_type is set to 1 and projection_type_x, projection_type_y, and projection_type_z are all set to 1, projection_type_x, projection_type_y, and projection_type_z indicate the radius, azimuth angle, and elevation angle of the cylindrical coordinate system, respectively.

When coordinate_conversion_type is set to 2 and projection_type_x, projection_type_y, and projection_type_z are all set to 1, projection_type_x, projection_type_y, and projection_type_z indicate the radius, azimuth angle, and elevation angle of the spherical coordinate system, respectively.

When coordinate_conversion_type is set to 1 and projection_type_x, projection_type_y, and projection_type_z are all set to 0, projection_type_x, projection_type_y, and projection_type_z indicate that no projection has occurred (or there is only a scaling change on each axis by granularity_radius, granularity_angular, and granularity_normal).

When coordinate_conversion_type is set to 2, projection_type_x and projection_type_y are all set to 0, and projection_type_z is set to 1, projection_type_x, projection_type_y, and projection_type_z indicate that conversion is performed to the x-axis, y-axis and the elevation angle of the cylindrical coordinate system, respectively.

When coordinate_conversion_type is set to 1, projection_type_x and projection_type_y are all set to 0, and projection_type_z is set to 2, projection_type_x, projection_type_y, and projection_type_z indicate that conversion is performed to the x-axis, y-axis and laser index, respectively.

When coordinate_conversion_type is set to 1 and projection_type_x, projection_type_y, and projection_type_z are all set to 2, projection_type_x, projection_type_y, and projection_type_z indicate that conversion is performed to the simplified radius, simplified azimuth angle, and laser index for the cylindrical coordinate system, respectively.

The coordinate_conversion_type and projection type according to the embodiments may indicate a coordinate conversion type for each sequence. The coordinate_conversion_type and projection type may indicate a coordinate conversion type according to a sequence type. For example, the coordinate_conversion_type and projection type (projection_type_x, projection_type_y, and projection_type_z) may indicate that cylindrical coordinate conversion and the conversion values of radius, azimuth angle, and elevation angle are applied to a sequence of type A. For example, the coordinate_conversion_type and projection type (projection_type_x, projection_type_y, and projection_type_z) may indicate that cylindrical coordinate conversion and the conversion values of x-axis, y-axis, and laser index are applied to a sequence of type B. For example, the coordinate_conversion_type and projection type (projection_type_x, projection_type_y, and projection_type_z) may indicate that spherical coordinate conversion, and the conversion values of radius, azimuth angle, and elevation angle are applied to a sequence of type C.

Figure 34:
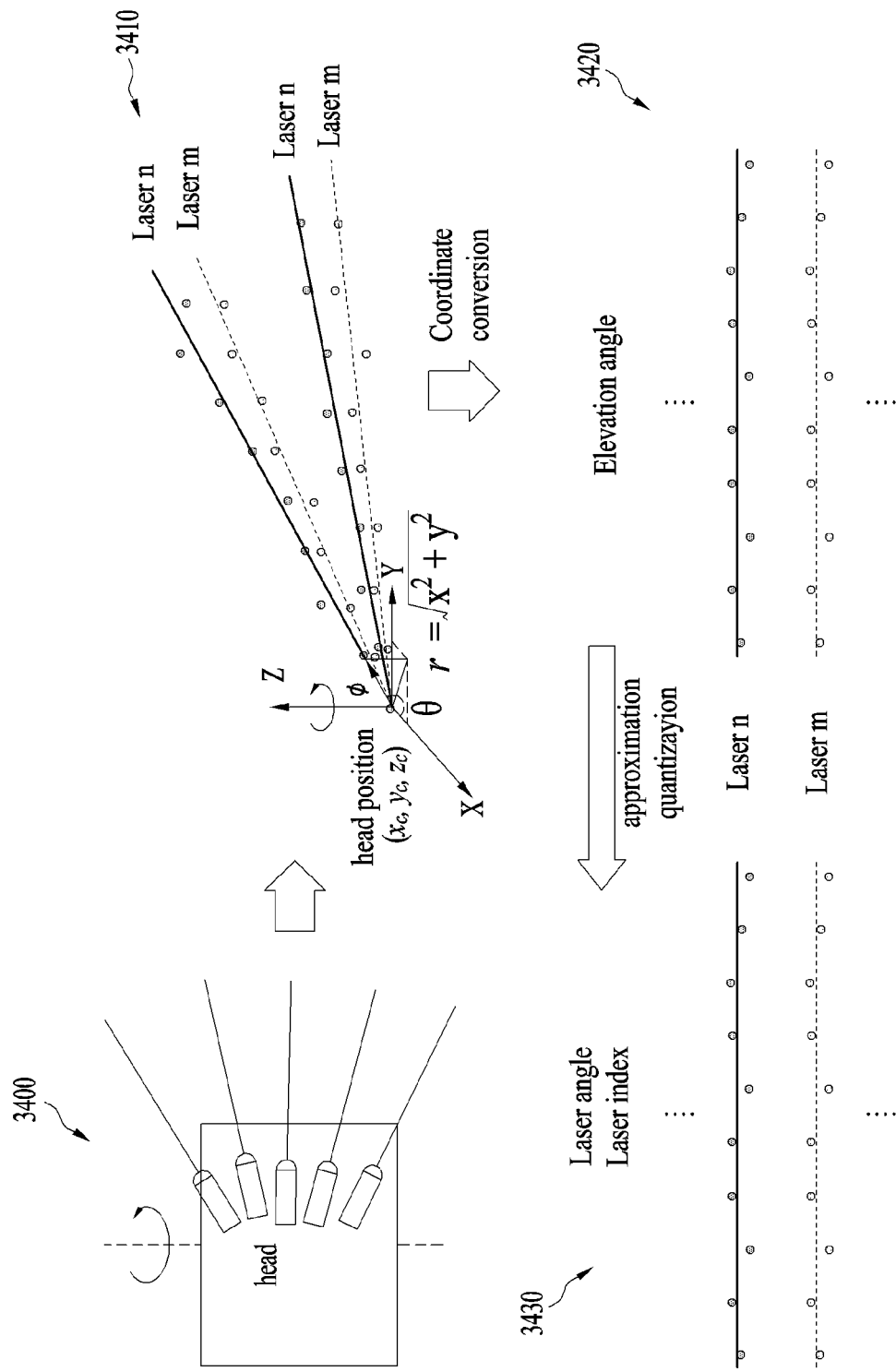
FIG. 34 illustrates an example of points arranged based on a laser index according to embodiments.

FIG. 34 illustrates an example of points arranged based on a laser index according to embodiments.

In the figure, an example 3400 in the upper left part represents a LiDAR head (e.g., the LiDAR head 1900 described with reference to FIG. 19) configured to output one or more lasers. As described with reference to FIG. 19, LiDAR data is secured through the LiDAR method, by which the distance is measured by radiating a laser to a target. The LiDAR head 3400 includes one or more laser modules (or laser sensors) disposed at regular angular intervals in the vertical direction and rotates about the vertical axis. Times (and/or wavelengths) taken for the laser light output from the respective laser modules to be reflected from an object and return may be the same as or different from each other. Therefore, LiDAR data is a 3D representation constructed based on a difference in time and/or wavelength of laser lights returning from the object. In order to have a wider coverage, the laser modules are disposed to output the laser radially.

In the figure, an example 3410 in the upper right part is an example of use of a laser index as a simplified conversion value of an elevation angle when the value of projection_type z according to the embodiments is 2. As described above, the LiDAR head 3400 outputs one or more lasers (Laser n and Laser m) while rotating horizontally around the header position (or origin). As shown in the figure, the trajectory of the laser is represented by a dotted line or a solid line. Here, the dotted line and the solid line are examples used to distinguish different lasers. Accordingly, the position of an object is estimated based on the difference in emission and/or reception time when laser beams distributed at different angles in the vertical direction are reflected on the object. One or more points located on a line (the above-described dotted line or solid line) representing the trajectory of laser n shown in the figure are points obtained to represent the object when lasers reflected on the object are received. Accordingly, the one or more points may be present on a straight line corresponding to the trajectory of laser n. However, due to the influence of noise and the like, the actual points may not be located on the trajectory of the laser, but may be located around the trajectory (and expressed as +/−displacement from the trajectory). The position of each point is expressed as a elevation angle. The elevation angle may be expressed as a positive/negative (+/−) value relative to the angle of the laser.

An example 3420 at the bottom right of the figure shows the actual positions of points located around the trajectory of each laser. As shown in the figure, the elevation angle of each point corresponds to the a value (+/−) added to or subtracted from the elevation angle (or laser angle, for example, #. in the figure) of the laser. The laser angle and the laser index according to the embodiments may be included in the signaling information described with reference to FIGS. 24 to 28.

The point cloud transmission device according to the embodiments (e.g., the point cloud transmission device described with reference to FIGS. 1 to 33) may perform approximation quantization on the position (i.e., the elevation angle) of each point in consideration of the associated laser angle or the index of the corresponding laser. An example 3430 at the bottom left of the figure shows a result of approximate quantization. The point cloud transmission device performs approximate quantization for estimating a point on a laser trajectory without considering a difference in elevation angle of each point. That is, as shown in the figure, all points are estimated to be located on the corresponding laser trajectory. Therefore, the elevation angle of each point has the same value as the elevation angle (or laser angle) of the corresponding laser. For example, the elevation angle of points corresponding to laser n is estimated to be the same as the elevation angle of laser n. Also, the points are sorted according to the index of the corresponding laser. For example, points corresponding to laser n are sorted according to laser index n.

Figure 35:
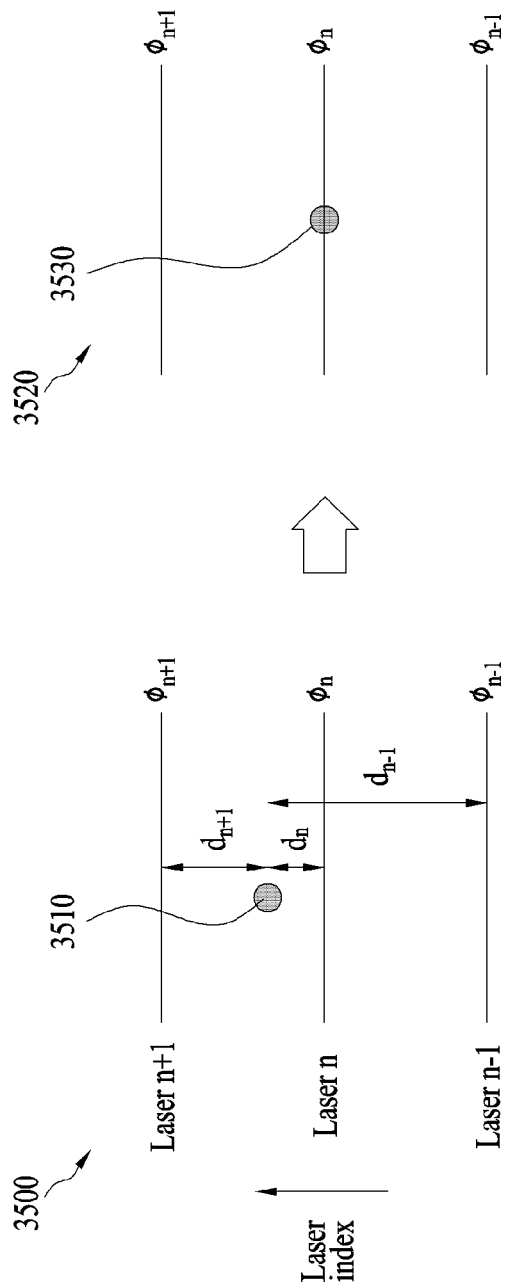
FIG. 35 illustrates an example of points arranged based on a laser index according to embodiments.

FIG. 35 illustrates an example of points arranged based on a laser index according to embodiments.

An example 3500 on the left side in the figure shows straight lines representing trajectories of one or more lasers (Laser n−1, Laser n, and Laser n+1) described with reference to FIG. 34. The arrow shown on the left indicates an increasing direction of the laser index. The laser angle of laser n, which is the n-th laser, is represented by $\phi_n$, and the laser angle of laser n−1, which is the n−1-th laser, is represented by $\phi_{n-1}$. The laser angle of laser n+1, which is the n+1-th laser, is expressed as $\phi_{n+1}$. The example 3500 shows a point 3510 located between laser n and laser n+1.

As described with reference to FIG. 34, the elevation angle of a point located around a laser trajectory may be estimated to have the same value as the elevation angle of a corresponding laser. Conditions for the point 3510 shown in the example 3500 to satisfy to correspond to laser n is represented as the following equation.

$$0.5*\phi_n+0.5*\phi_{n-1} \leq \phi < 0.5*\phi_n+0.5*\phi_{n+1}, \text{ where } d_n=|\phi-\phi_n|, d_{n+1}=|\phi-\phi_{n+1}|, \text{ and } d_{n-1}=|\phi-\phi_{n-1}|.$$ [Equation 7]

Here, φ denotes the elevation angle of point 3510. $d_n$ denotes the difference between the elevation angle of point 3510 and the elevation angle of laser n, $d_{n+1}$ denotes the difference between the elevation angle of point 3510 and the elevation angle of laser n+1, and $d_{n-1}$ denotes the difference between the elevation angle of point 3510 and the elevation angle of laser n−1. When the value of $d_n$ is the least value, point 3510 corresponds to laser n. When the value of $d_{n-1}$ is the least value, point 3510 corresponds to laser n−1.

An example 3520 on the right side in the figure shows a point 3530 located on the trajectory of laser n according to the estimated position of the point 3510 (the elevation angle of laser n) when the above conditions are satisfied.

When the total number of lasers is N, points determined to correspond to adjacent lasers according to the above equation are divided into N groups. That is, points each having an elevation angle are approximated to laser angles or laser indices and quantized into N groups. At least one of scale factors (or scaling factors) of the respective axes represented by granularity_angular, granularity_radius, and granularity_normal described with reference to FIG. 24 may be used as a discriminator for discriminating the N quantized groups. For example, for LiDAR data to which coordinate conversion using a radius, an azimuthal angle, and a laser index as conversion values is applied, when the scaling factor is 1, distance 1 on the radius has the same meaning as distance 1 between lasers. Therefore, when a neighbor point search is performed for points, it is determined that the distance between adjacent lasers is excessively smaller than the actual one, and thus the possibility of searching for points corresponding to the cross laser index as neighbor points increases. Therefore, in order to address this issue, a distance between lasers represented by laser indices may be kept constant based on a value indicated by granularity_normal, and a neighbor point search in between one or more lasers may be prevented. The granularity_normal according to the embodiments is expressed by the following equation.

$$\text{granularity\_normal} >= \text{minimum inter-laser distance} >= \quad \text{[Equation 8]}$$

maximum k-th neighbor distance in a laser plane:

$$\left( \sqrt{(x_k(n) - x_l(n))^2 + (y_k(n) - y_l(n))^2 + (z_k(n) - z_l(n))^2} \right),$$

where $(x_k(n), y_k(n), z_k(n))$ and $(x_l(n), y_l(n), z_l(n))$ represent the position values (xyz values) of adjacent points belonging to laser n. A laser plane according to the embodiments represents a plane to which points associated with one laser belong or a plane scanned by one laser. The maximum k-th neighbor distance in a laser plane denotes the longest distance among the distances to the k-th neighbor point in performing a neighbor search for points in the laser plane when k neighbors are obtained. The maximum k-th neighbor distance in a laser plane may be measured for each sequence by the point cloud transmission device (e.g., the point cloud transmission device or the encoder described with reference to FIGS. 1 to 34), or may be signaled to the point cloud reception device (e.g., the point cloud reception device or the decoder described with reference to FIGS. 1 to 34), or may be pre-stored in the point cloud reception device. The maximum k-th neighbor distance in a laser plane is used to independently compress points in the laser plane of each laser while maintaining a distance between at least two lasers to be greater than or equal to a specific value, or to determine the surrounding characteristics of the laser. The minimum inter-laser distance denotes the minimum distance between at least two lasers. The minimum inter-laser distance may be greater than or equal to the maximum k-th neighbor distance in a laser plane.

In the embodiments, granularity_normal, which is a scale factor, may be defined based on the value of Maximum k-th neighbor distance in a laser plane as in the above equation, and may be adaptively defined as a different value according to each laser plane.

Figure 36:
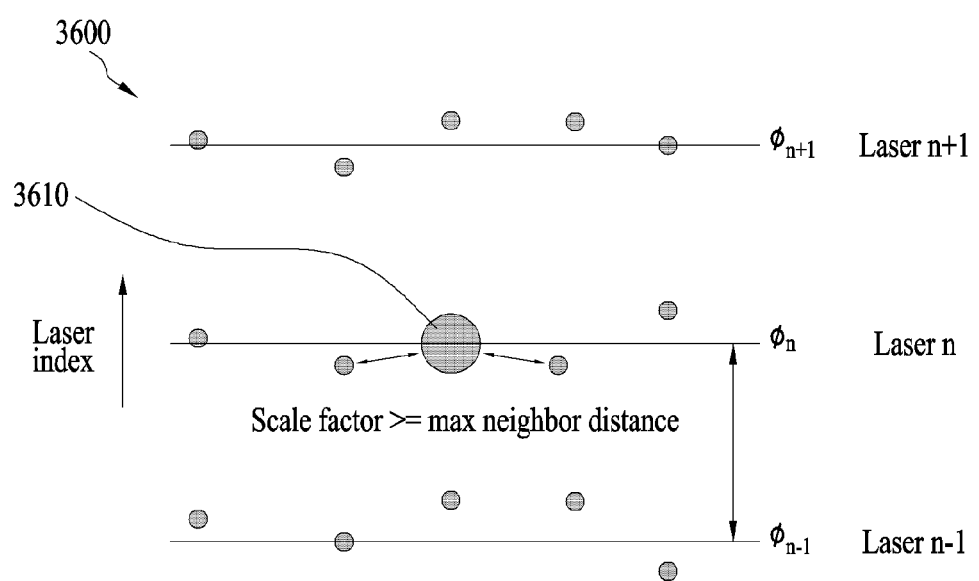
FIG. 36 illustrates an example of a distance between one or more lasers according to embodiments.

FIG. 36 illustrates an example of a distance between one or more lasers according to embodiments.

FIG. 36 shows an example 3600 in which points are arranged according to indices of one or more lasers (laser n−1, laser n, and laser n+1) whose distance is maintained based on a scale factor. According to the embodiments, the scale factor may be determined based on the maximum k-th neighbor distance in a laser plane described above. The maximum k-th neighbor distance in a laser plane may be a preset value and be transmitted to the point cloud reception device through a bitstream. According to the embodiments, the scale factor may be determined after measuring the distances between a point 3610 on the trajectory of a laser represented by the laser index (e.g., laser n shown in the figure) and neighbor points, determined, and may be signaled for each sequence to which the points of the corresponding laser belong.

Figure 37:
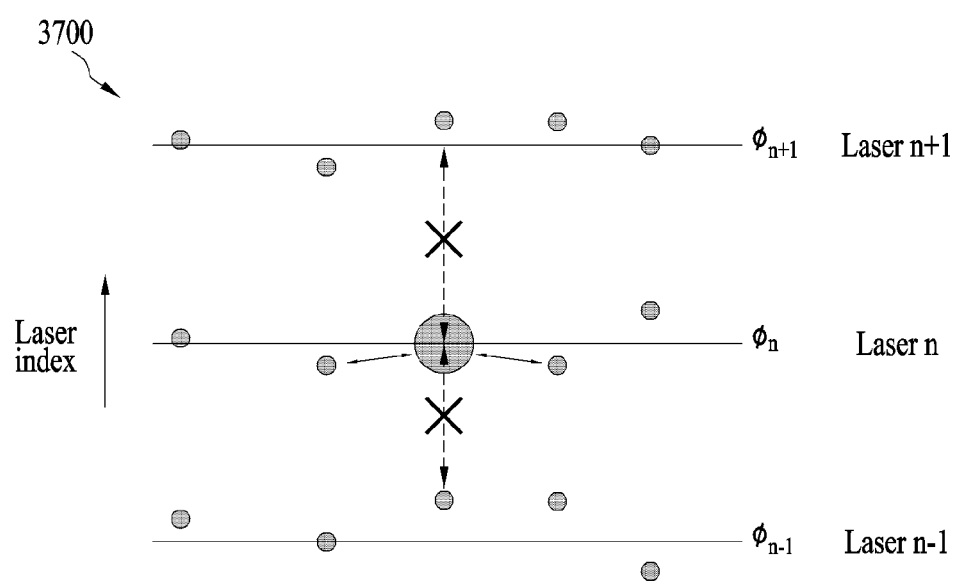
FIG. 37 illustrates an example of neighbor point search according to embodiments.

FIG. 37 illustrates an example of neighbor point search according to embodiments.

The neighbor point search is performed based on the distance between points or based on the Morton codes of points. The point cloud transmission device according to the embodiments may perform the neighbor point search only for points having the same laser index or laser angle (nearest neighbor=minimum distanced point within the same laser index). FIG. 37 shows an example 3700 in which points to which coordinate conversion using a radius, an azimuthal angle, and a laser index as conversion values is applied are arranged in the elevation direction with respect to the radius/azimuth plane according to the laser index. Arrows shown in the figure indicate directions in which neighbor points are searched for based on vertical and horizontal distances of points belonging to laser n. The point cloud transmission device according to the embodiments does not select points belonging to other laser indices (e.g., laser n+1 and laser n−1) or points having other laser angles as neighbor points. In sorting the points, the point cloud transmission device according to the embodiments may group and sort points belonging to the same laser index. In addition, the point cloud transmission device may perform the neighbor point search shown in FIG. 37 for attribute coding (e.g., predictive lifting coding, etc.).

The point cloud data transmission device according to the embodiments (the point cloud transmission device described with reference to FIGS. 1 to 36, for example, the transmission device or point cloud encoder described with reference to FIGS. 1, 12 and 14) may signal information related to the laser index or laser angle together with position information (position information represented by parameters x, y, and z) about each point of the input data, or perform conversion of at least one axis (e.g., the coordinate conversion described with reference to FIGS. 15 to 33). In addition, the point cloud data reception device (e.g., the receiver of FIG. 1, the receiver of FIG. 13, etc.) may match each point to a laser index based the signaling information (e.g., the signaling information described with reference to FIGS. 24 to 28, projection_type x, projection_type y, and projection_type z described with reference to FIG. 33). In addition, when there is no signaling information such as a direct laser index and laser angle, the point cloud data reception device performs may infer the matching relationship between the points and the laser indices based on information such as the laser head position and the relative laser position.

Figure 38:
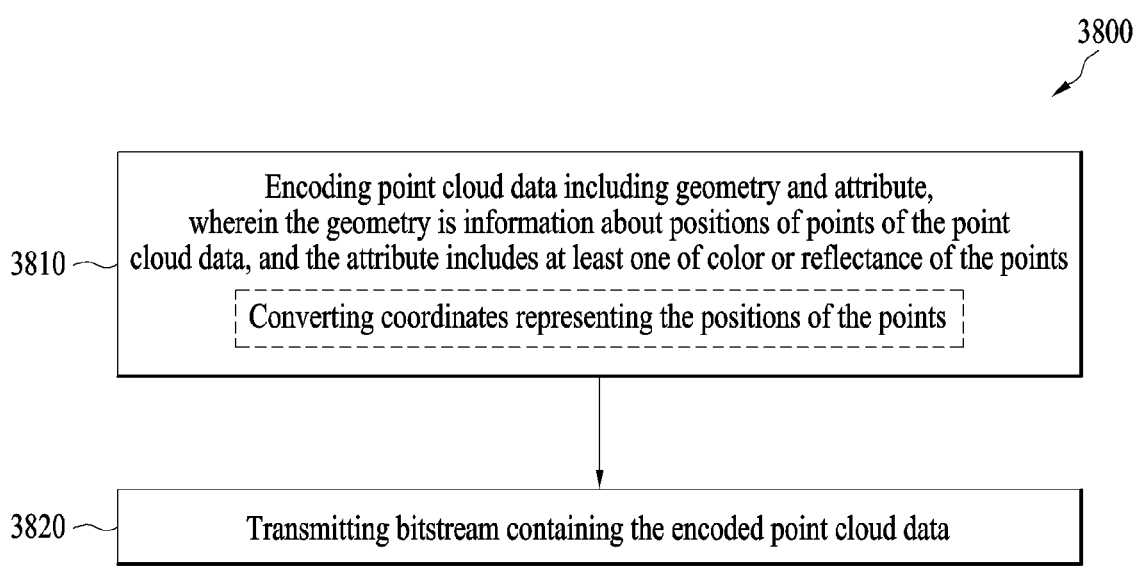
FIG. 38 is a flow diagram illustrating a point cloud data transmission method according to embodiments.

FIG. 38 is a flow diagram illustrating a point cloud data transmission method according to embodiments.

The flow diagram 3400 of FIG. 38 illustrates a point cloud data transmission method for the point cloud data processing device (or point cloud transmission device) described with reference to FIGS. 1 to 33 (e.g., the transmission device or point cloud encoder described with reference to FIGS. 1, 12 and 14). The point cloud data transmission device encodes point cloud data including geometry and an attribute (3410). The geometry is information indicating positions of points of the point cloud data, and the attribute includes at least one of color and reflectance of the points. The point cloud data transmission device encodes the geometry. As described with reference to FIGS. 1 to 33, the attribute encoding depends on the geometry encoding. The point cloud transmission device according to the embodiments may perform coordinate conversion (e.g., the projection described with reference to FIGS. 15 to 17) on geometry and/or the attribute. Details of the projection are the same as those described with reference to FIGS. 15 to 33, and thus a description thereof is omitted. When the point cloud data is acquired by one or more lasers, the point cloud transmission device may adjust the position of each laser based on the center position of a laser head outputting the one or more lasers and the position of each laser relative to the center position. The adjusted position of the laser may include a vertical angle (or elevation angle) expressed in a coordinate system representing the positions of the points. The laser position adjustment is the same as that described with reference to FIGS. 15 to 22, and thus a detailed description thereof is omitted. The projection according to the embodiments may be applied differently according to each axis representing a coordinate of a point. Details are the same as those described with reference to FIGS. 34 to 37, and thus a description thereof is omitted.

As described with reference to FIGS. 34 to 37, points of LiDAR data correspond to at least one of one or more lasers. Also, each of the one or more lasers may be represented by a laser index. Due to noise or the like, the point cloud data processing device according to the embodiments may perform approximation quantization such that the elevation angles of points located around the corresponding laser trajectory are equal to the vertical angle (or elevation angle) of the laser corresponding to the points. The laser index-based approximation quantization and neighbor point search are the same as those of FIGS. 34 to 37, and thus a description thereof is omitted. The point cloud data processing method is not limited to this example.

Figure 39:
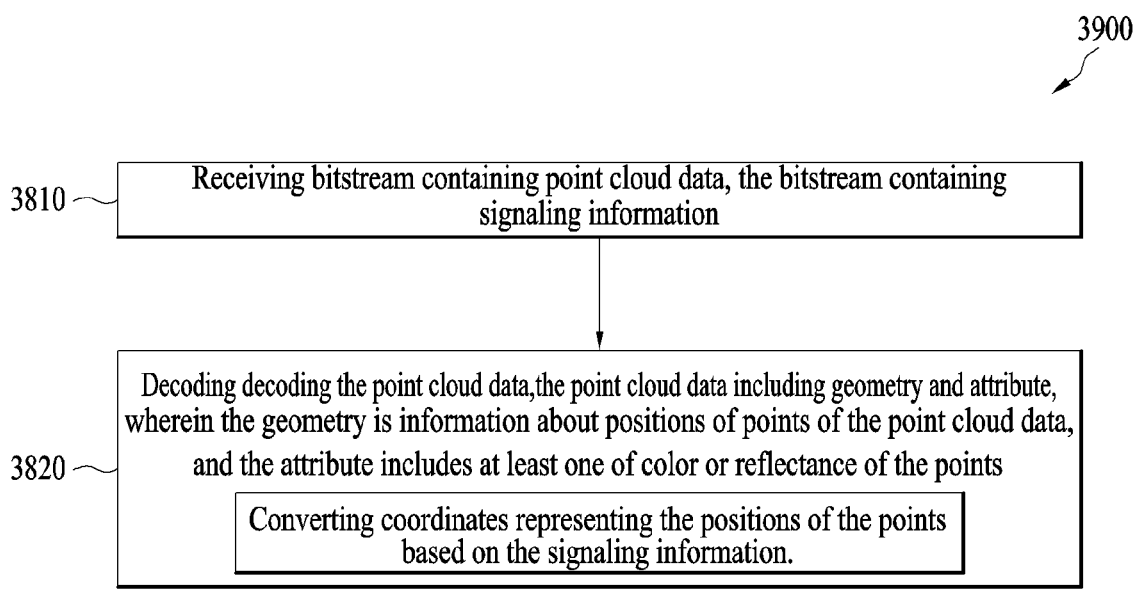
FIG. 39 is a flow diagram illustrating a point cloud data processing method according to embodiments.

FIG. 39 is a flow diagram illustrating a point cloud data processing method according to embodiments.

The flow diagram 3900 of FIG. 39 illustrates a point cloud data processing method for the point cloud data processing device (or point cloud data reception device) described with reference to FIGS. 1 to 33 (e.g., the reception device 10004 or the point cloud video decoder 10006).

The point cloud data reception device (e.g., the receiver of FIG. 1 or the receiver of FIG. 13) receives a bitstream containing point cloud data (3910). The bitstream contains signaling information (e.g., SPS, APS, attribute header, etc.) necessary for decoding of the point cloud data. As described with reference to FIGS. 24 to 28, the point cloud transmission device according to the embodiments transmits signaling information related to projection performs projection (e.g., the projection described with reference to FIGS. 15 to 33) through the signaling information (e.g., SPS, APS, attribute header, etc.) contained in the bitstream. As described above, the signaling information (e.g., SPS, APS, attribute header, etc.) in the bitstream may include projection-related information at a sequence level or a slice level.

The point cloud data reception device (e.g., the decoder of FIG. 10) decodes the point cloud data based on the signaling information (3920). The point cloud data reception device (e.g., the geometry decoder of FIG. 10) decodes geometry included in the point cloud data. The point cloud data includes the geometry and an attribute. The geometry is information indicating positions of points of the point cloud data, and the attribute includes at least one of color and reflectance of the points.

The point cloud reception device according to the embodiments may perform coordinate conversion (e.g., the coordinate conversions 3310 and 3330 described with reference to FIGS. 15 to 33) for the geometry and/or attribute. Details of the coordinate conversion are the same as those described with reference to FIGS. 15 to 33, and thus a description thereof is omitted.

The bitstream according to the embodiments contains signaling information related to the projection described with reference to FIGS. 24 to 28. For example, the signaling information may include information (e.g., laser_position_adjustment_flag described with reference to FIG. 24) indicating whether the position of each laser has been adjusted and information (e.g., num_laser described with reference to FIG. 24) indicating the number of one or more lasers, and information related to laser adjustment. In addition, the bitstream may include information (e.g., attr_coord_conv_enable_flag described with reference to FIG. 28) indicating whether coordinate conversion is applied to decode the attribute and information about scale factors of the converted coordinate axes (e.g., attr_coord_conv_scale[i] described with reference to FIG. 28). The point cloud reception device may adjust the position of each laser based on the information related to the laser adjustment. The position of the laser is a position adjusted based on the center position of the laser head outputting one or more lasers and the position of each laser relative to the center position, and includes an elevation angle expressed in a coordinate system in which points are presented. The point cloud data processing method is not limited to this example.

The projection according to the embodiments may be applied differently according to each axis representing a coordinate of a point. Details are the same as those described with reference to FIGS. 34 to 37, and thus a description thereof is omitted.

As described with reference to FIGS. 34 to 37, points of LiDAR data correspond to at least one of one or more lasers. Also, each of the one or more lasers may be represented by a laser index. Due to noise or the like, the point cloud data processing device according to the embodiments may perform approximation quantization such that the elevation angles of points located around the corresponding laser trajectory are equal to the vertical angle (or elevation angle) of the laser corresponding to the points. The laser index-based approximation quantization and neighbor point search are the same as those of FIGS. 34 to 37, and thus a description thereof is omitted. The point cloud data processing method is not limited to this example.

The components of the point cloud data processing devices according to the embodiments described with reference to FIGS. 1 to 39 may be implemented as hardware, software, firmware, or a combination thereof including one or more processors coupled with a memory. The components of the devices according to the embodiments may be implemented as a single chip, for example, a single hardware circuit. Alternatively, the components of the point cloud data processing devices according to the embodiments may be implemented as separate chips. In addition, at least one of the components of the point cloud data processing devices according to the embodiments may include one or more processors capable of executing one or more programs, wherein the one or more programs may include are instructions that execute or are configured to execute one or more of the operations/methods of the point cloud data processing devices described with reference to FIGS. 1 to 39.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Descriptions of methods and devices may be applied so as to complement each other. For example, the point cloud data transmission method according to the embodiments may be carried out by the point cloud data transmission device or components included in the point cloud data transmission device according to the embodiments. Also, the point cloud data reception method according to the embodiments may be carried out by the point cloud data reception device or the components included in the point cloud data reception device according to the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/"and"," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A, 2) only B, and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Related details have been described in the best mode for carrying out the invention.

It will be apparent to those skilled in the art that various changes or modifications can be made to the embodiments within the scope of the embodiments. Thus, it is intended that the embodiments cover the modifications and variations of the present disclosure provided they come within the scope of the appended claims and their equivalents.

What is claimed is:

1. A method of encoding point cloud data, the method comprising:
    encoding point cloud data including a geometry and an attribute; and
    transmitting a bitstream including the point cloud data,
    wherein the geometry is information about positions of points of the point cloud data,
    wherein the attribute includes at least one of color or reflectance of the points, and
    wherein the encoding includes converting coordinates representing the positions of the points,
    wherein the bitstream includes parameter information for the point cloud data,
    wherein the point cloud data is acquired based on a laser index and a laser angle,
    wherein the point cloud data is encoded based on searching a neighbor point,
    wherein the neighbor point is searched in a laser plane related to the laser index,
    wherein a distance between each laser index is set based on a neighbor distance.

2. The method of claim 1,
    wherein the converting is based on a center position of a laser head and a relative position of a laser;
    wherein the converted coordinates of the points include an elevation value.

3. The method of claim 2,
    wherein the elevation value is represented by the laser index.

4. The method of claim 3,
    wherein the coordinates of the points use scaling parameters which are derived based on point distribution.

5. A device for encoding point cloud data, the device comprising:
    a memory; and
    at least one processor configured to encode point cloud data including a geometry and an attribute,
    wherein the geometry is information about positions of points of the point cloud data,
    wherein the attribute includes at least one of color or reflectance of the points, and
    convert coordinates representing the positions of the points; and
    transmit a bitstream including the point cloud data,
    wherein the bitstream includes parameter information for the point cloud data,
    wherein the point cloud data is acquired based on a laser index and a laser angle,
    wherein the point cloud data is encoded based on searching a neighbor point, wherein the neighbor point is searched in a laser plane related to the laser index, wherein a distance between each laser index is set based on a neighbor distance.

6. The device of claim 5, wherein the at least one processor is configured to convert the coordinates of the points based on a center position of a laser head and a relative position of a laser, and wherein the converted coordinates of the points include an elevation value.

7. The device of claim 6, wherein the elevation value is represented by the laser index.

8. The device of claim 7, wherein the coordinates of the points use scaling parameters which are derived based on point distribution.

9. A method of decoding point cloud data, the method comprising:

receiving a bitstream including point cloud data and signaling information; and decoding the point cloud data including a geometry and an attribute, wherein the geometry is information about positions of points of the point cloud data, wherein the attribute includes at least one of color or reflectance of the points, wherein coordinates representing the positions of the points are converted, wherein the bitstream includes parameter information for the point cloud data, wherein the point cloud data is acquired based on a laser index and a laser angle, wherein the point cloud data is decoded based on searching a neighbor point, wherein the neighbor point is searched in a laser plane related to the laser index, wherein a distance between each laser index is set based on a neighbor distance.

10. The method of claim 9, wherein the signaling information includes information for a conversion of the coordinates related to a position of a laser, wherein the signaling information includes information for a number of lasers, wherein the converting the coordinates is based on a center position of a laser head and a relative position of a laser, wherein the converted coordinates of the points include an elevation value.

11. The method of claim 10, wherein the elevation value is represented by the laser index.

12. The method of claim 11, wherein the coordinates of the points use scaling parameters which are derived based on point distribution.

13. A device for decoding point cloud data, the device comprising:

a memory; and at least one processor configured to receive a bitstream including point cloud data and signaling information; and decode the point cloud data including a geometry and an attribute, wherein the geometry is information about positions of points of the point cloud data, wherein the attribute includes at least one of color or reflectance of the points, and convert coordinates representing the positions of the points based on the signaling information, wherein the bitstream includes parameter information for the point cloud data, wherein the point cloud data is acquired based on a laser index and a laser angle, wherein the point cloud data is decoded based on searching a neighbor point, wherein the neighbor point is searched in a laser plane related to the laser index, wherein a distance between each laser index is set based on a neighbor distance.

14. The device of claim 13, wherein the signaling information includes information for a correction of the coordinates related to a position of a laser, wherein the signaling information includes information for a number of lasers, wherein the at least one processor configured to convert the coordinates of the points based on a center position of a laser head and a relative position of a laser, wherein the converted coordinates of the points include an elevation value.

15. The device of claim 14, wherein the elevation value is represented by the laser index.

16. The device of claim 15, wherein the coordinates of the points use scaling parameters which are derived based on point distribution.

* * * * *